US010230266B1

(12) United States Patent
Leabman et al.

(10) Patent No.: US 10,230,266 B1
(45) Date of Patent: Mar. 12, 2019

(54) WIRELESS POWER RECEIVERS THAT COMMUNICATE STATUS DATA INDICATING WIRELESS POWER TRANSMISSION EFFECTIVENESS WITH A TRANSMITTER USING A BUILT-IN COMMUNICATIONS COMPONENT OF A MOBILE DEVICE, AND METHODS OF USE THEREOF

(71) Applicant: ENERGOUS CORPORATION, San Jose, CA (US)

(72) Inventors: Michael A. Leabman, San Ramon, CA (US); Gregory Scott Brewer, Livermore, CA (US)

(73) Assignee: Energous Corporation, San Jose, CA (US)

( * ) Notice: Subject to any disclaimer, the term of this patent is extended or adjusted under 35 U.S.C. 154(b) by 21 days.

(21) Appl. No.: 14/587,367

(22) Filed: Dec. 31, 2014

Related U.S. Application Data

(63) Continuation-in-part of application No. 14/173,936, filed on Feb. 6, 2014.

(51) Int. Cl.
*H02J 7/00* (2006.01)
*H02J 17/00* (2006.01)
*H02J 7/02* (2016.01)

(52) U.S. Cl.
CPC .............. *H02J 17/00* (2013.01); *H02J 7/025* (2013.01)

(58) Field of Classification Search
CPC ....................... H02J 7/025; H02J 5/005; H02J 50/00–50/90; B60L 11/182; B60L 11/1829; B60L 11/1831
(Continued)

(56) References Cited

U.S. PATENT DOCUMENTS

| 787,412 A | 4/1905 | Tesla |
| 3,167,775 A | 1/1965 | Guertler |

(Continued)

FOREIGN PATENT DOCUMENTS

| CN | 203826555 U | 9/2014 |
| CN | 104090265 A | 10/2014 |

(Continued)

OTHER PUBLICATIONS

International Search Report and Written Opinion of the International Searching Authority, or the Declaration dated Mar. 11, 2016 in International Application No. PCT/US15/67271, 10 pages.

(Continued)

*Primary Examiner* — Drew A Dunn
*Assistant Examiner* — Zixuan Zhou
(74) *Attorney, Agent, or Firm* — Morgan, Lewis & Bockius LLP

(57) ABSTRACT

An example mobile device includes a built-in communications component and a receiver. The receiver includes a first radio frequency (RF) antenna element that interfaces with a constructive interference formed by wireless RF power transmission waves emitted from a far-field transmitter. The first RF antenna element is configured to transform energy from the constructive interference into an alternating current (AC) voltage. The receiver also includes a rectifier configured to convert the AC voltage into a DC voltage. The receiver further includes a power converter configured to changed the DC voltage into a constant DC voltage to provide electrical energy to the mobile device. The receiver uses the communications component to transmit, to the far-field transmitter, communication signals containing status data indicating a power transmission effectiveness of the power transmission waves. The mobile device also utilizes (Continued)

the communications component to communicate with electronic devices other than the far-field transmitter.

22 Claims, 26 Drawing Sheets

(58) Field of Classification Search
USPC .......................... 320/108; 307/104; 455/572
See application file for complete search history.

(56) References Cited

U.S. PATENT DOCUMENTS

| | | | |
|---|---|---|---|
| 3,434,678 A | 3/1969 | Brown et al. | |
| 3,696,384 A | 10/1972 | Lester | |
| 3,754,269 A | 8/1973 | Clavin | |
| 4,101,895 A | 7/1978 | Jones, Jr. | |
| 4,360,741 A | 11/1982 | Fitzsimmons et al. | |
| 4,944,036 A | 7/1990 | Hyatt | |
| 4,995,010 A | 2/1991 | Knight | |
| 5,200,759 A | 4/1993 | McGinnis | |
| 5,211,471 A | 5/1993 | Rohrs | |
| 5,548,292 A | 8/1996 | Hirshfield et al. | |
| 5,556,749 A | 9/1996 | Mitsuhashi et al. | |
| 5,568,088 A | 10/1996 | Dent et al. | |
| 5,646,633 A | 7/1997 | Dahlberg | |
| 5,697,063 A | 12/1997 | Kishigami et al. | |
| 5,712,642 A | 1/1998 | Hulderman | |
| 5,936,527 A | 8/1999 | Isaacman et al. | |
| 5,982,139 A | 11/1999 | Parise | |
| 6,046,708 A | 4/2000 | MacDonald, Jr. et al. | |
| 6,127,799 A | 10/2000 | Krishnan | |
| 6,127,942 A | 10/2000 | Welle | |
| 6,163,296 A | 12/2000 | Lier et al. | |
| 6,289,237 B1 | 9/2001 | Mickle et al. | |
| 6,329,908 B1 | 12/2001 | Frecska | |
| 6,421,235 B2 | 7/2002 | Ditzik | |
| 6,437,685 B2 | 8/2002 | Hanaki | |
| 6,456,253 B1 | 9/2002 | Rummeli et al. | |
| 6,476,795 B1 | 11/2002 | Derocher et al. | |
| 6,501,414 B2 | 12/2002 | Amdt et al. | |
| 6,583,723 B2 | 6/2003 | Watanabe et al. | |
| 6,597,897 B2 | 7/2003 | Tang | |
| 6,615,074 B2 | 9/2003 | Mickle et al. | |
| 6,650,376 B1 | 11/2003 | Obitsu | |
| 6,664,920 B1 | 12/2003 | Mott et al. | |
| 6,798,716 B1 | 9/2004 | Charych | |
| 6,853,197 B1 | 2/2005 | McFarland | |
| 6,856,291 B2 | 2/2005 | Mickle et al. | |
| 6,911,945 B2 | 6/2005 | Korva | |
| 6,960,968 B2 | 11/2005 | Odendaal et al. | |
| 6,967,462 B1 * | 11/2005 | Landis .................. | H02J 17/00 320/101 |
| 6,988,026 B2 | 1/2006 | Breed et al. | |
| 7,003,350 B2 | 2/2006 | Denker et al. | |
| 7,027,311 B2 | 4/2006 | Vanderelli et al. | |
| 7,068,234 B2 | 6/2006 | Sievenpiper | |
| 7,068,991 B2 | 6/2006 | Parise | |
| 7,183,748 B1 | 2/2007 | Unno et al. | |
| 7,191,013 B1 | 3/2007 | Miranda et al. | |
| 7,196,663 B2 | 3/2007 | Bolzer et al. | |
| 7,205,749 B2 | 4/2007 | Hagen et al. | |
| 7,222,356 B1 | 5/2007 | Yonezawa et al. | |
| 7,274,334 B2 | 9/2007 | o'Riordan et al. | |
| 7,274,336 B2 | 9/2007 | Carson | |
| 7,351,975 B2 | 4/2008 | Brady et al. | |
| 7,359,730 B2 | 4/2008 | Dennis et al. | |
| 7,392,068 B2 | 6/2008 | Dayan | |
| 7,403,803 B2 | 7/2008 | Mickle et al. | |
| 7,443,057 B2 | 10/2008 | Nunally | |
| 7,451,839 B2 | 11/2008 | Perlman | |
| 7,463,201 B2 | 12/2008 | Chiang et al. | |
| 7,471,247 B2 | 12/2008 | Saily | |
| 7,535,195 B1 | 5/2009 | Horovitz et al. | |
| 7,614,556 B2 | 11/2009 | Overhultz et al. | |
| 7,639,994 B2 | 12/2009 | Greene et al. | |
| 7,643,312 B2 | 1/2010 | Vanderelli et al. | |
| 7,652,577 B1 | 1/2010 | Madhow et al. | |
| 7,679,576 B2 | 3/2010 | Riedel et al. | |
| 7,702,771 B2 | 4/2010 | Ewing et al. | |
| 7,786,419 B2 | 8/2010 | Hyde et al. | |
| 7,812,771 B2 | 10/2010 | Greene et al. | |
| 7,830,312 B2 | 11/2010 | Choudhury et al. | |
| 7,844,306 B2 | 11/2010 | Shearer et al. | |
| 7,868,482 B2 | 1/2011 | Greene et al. | |
| 7,898,105 B2 | 3/2011 | Greene et al. | |
| 7,904,117 B2 | 3/2011 | Doan et al. | |
| 7,911,386 B1 | 3/2011 | Ito et al. | |
| 7,925,308 B2 | 4/2011 | Greene et al. | |
| 7,948,208 B2 | 5/2011 | Partovi et al. | |
| 8,055,003 B2 | 11/2011 | Mittleman et al. | |
| 8,070,595 B2 | 12/2011 | Alderucci et al. | |
| 8,072,380 B2 | 12/2011 | Crouch | |
| 8,092,301 B2 | 1/2012 | Alderucci et al. | |
| 8,099,140 B2 | 1/2012 | Arai | |
| 8,115,448 B2 | 2/2012 | John | |
| 8,159,090 B2 | 4/2012 | Greene et al. | |
| 8,159,364 B2 | 4/2012 | Zeine | |
| 8,180,286 B2 | 5/2012 | Yamasuge | |
| 8,228,194 B2 | 7/2012 | Mickle | |
| 8,234,509 B2 | 7/2012 | Gioscia et al. | |
| 8,264,101 B2 | 9/2012 | Hyde et al. | |
| 8,264,291 B2 | 9/2012 | Morita | |
| 8,276,325 B2 | 10/2012 | Clifton et al. | |
| 8,278,784 B2 | 10/2012 | Cook et al. | |
| 8,284,101 B2 | 10/2012 | Fusco | |
| 8,310,201 B1 | 11/2012 | Wright | |
| 8,338,991 B2 | 12/2012 | Von Novak et al. | |
| 8,362,745 B2 | 1/2013 | Tinaphong | |
| 8,380,255 B2 | 2/2013 | Shearer et al. | |
| 8,410,953 B2 | 4/2013 | Zeine | |
| 8,411,963 B2 | 4/2013 | Luff | |
| 8,432,062 B2 | 4/2013 | Greene et al. | |
| 8,432,071 B2 | 4/2013 | Huang et al. | |
| 8,446,248 B2 | 5/2013 | Zeine | |
| 8,447,234 B2 | 5/2013 | Cook et al. | |
| 8,451,189 B1 | 5/2013 | Fluhler | |
| 8,452,235 B2 | 5/2013 | Kirby et al. | |
| 8,457,656 B2 | 6/2013 | Perkins et al. | |
| 8,461,817 B2 | 6/2013 | Martin et al. | |
| 8,467,733 B2 | 6/2013 | Leabman | |
| 8,497,601 B2 | 7/2013 | Hall et al. | |
| 8,497,658 B2 | 7/2013 | Von Novak et al. | |
| 8,552,597 B2 | 8/2013 | Song et al. | |
| 8,558,661 B2 | 10/2013 | Zeine | |
| 8,560,026 B2 | 10/2013 | Chanterac | |
| 8,604,746 B2 | 12/2013 | Lee | |
| 8,614,643 B2 | 12/2013 | Leabman | |
| 8,621,245 B2 | 12/2013 | Shearer et al. | |
| 8,626,249 B2 | 1/2014 | Kuusilinna et al. | |
| 8,629,576 B2 | 1/2014 | Levine | |
| 8,653,966 B2 | 2/2014 | Rao et al. | |
| 8,674,551 B2 | 3/2014 | Low et al. | |
| 8,686,685 B2 | 4/2014 | Moshfeghi | |
| 8,712,355 B2 | 4/2014 | Black et al. | |
| 8,712,485 B2 | 4/2014 | Tam | |
| 8,718,773 B2 | 5/2014 | Wills et al. | |
| 8,729,737 B2 | 5/2014 | Schatz et al. | |
| 8,736,228 B1 | 5/2014 | Freed et al. | |
| 8,760,113 B2 | 6/2014 | Keating | |
| 8,770,482 B2 | 7/2014 | Ackermann et al. | |
| 8,772,960 B2 | 7/2014 | Yoshida | |
| 8,823,319 B2 | 9/2014 | Von Novak, III et al. | |
| 8,832,646 B1 | 9/2014 | Wendling | |
| 8,854,176 B2 | 10/2014 | Zeine | |
| 8,860,364 B2 | 10/2014 | Low et al. | |
| 8,897,770 B1 | 11/2014 | Frolov et al. | |
| 8,903,456 B2 | 12/2014 | Chu et al. | |
| 8,917,057 B2 | 12/2014 | Hui | |
| 8,923,189 B2 | 12/2014 | Leabman | |
| 8,928,544 B2 | 1/2015 | Massie et al. | |
| 8,937,408 B2 | 1/2015 | Ganem et al. | |
| 8,946,940 B2 | 2/2015 | Kim et al. | |
| 8,963,486 B2 | 2/2015 | Kirby et al. | |
| 8,970,070 B2 | 3/2015 | Sada et al. | |

(56) References Cited

U.S. PATENT DOCUMENTS

| | | |
|---|---|---|
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,806,564 B2 | 10/2017 | Leabman |
| 9,819,230 B2 | 11/2017 | Petras et al. |
| 9,866,279 B2 | 1/2018 | Bell et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1* | 6/2002 | Sheppard, Jr. ......... A61B 1/041 607/60 |
| 2002/0095980 A1 | 7/2002 | Breed et al. |
| 2002/0103447 A1 | 8/2002 | Terry |
| 2002/0133592 A1 | 9/2002 | Matsuda |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1* | 7/2004 | Lyon ..................... H02J 7/025 320/108 |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | Kenknight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |

(56) References Cited

U.S. PATENT DOCUMENTS

| | | |
|---|---|---|
| 2007/0222681 A1 | 9/2007 | Greene et al. |
| 2007/0257634 A1 | 11/2007 | Leschin et al. |
| 2007/0273486 A1 | 11/2007 | Shiotsu |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0291634 A1 | 11/2009 | Saarisalo |
| 2009/0299175 A1 | 12/2009 | Bernstein et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1* | 7/2010 | Huggins ............... H02J 17/00 320/108 |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1* | 12/2010 | Zeine .................. H02J 7/025 320/137 |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |

(56) References Cited

U.S. PATENT DOCUMENTS

| | | |
|---|---|---|
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | Delaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1* | 6/2012 | Terada .................... H02J 7/025 455/66.1 |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1* | 7/2012 | Choi .................... H04B 5/0037 320/108 |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0326660 A1 | 12/2012 | Lu et al. |
| 2013/0002550 A1 | 1/2013 | Zalewski |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |

(56) References Cited

U.S. PATENT DOCUMENTS

| | | |
|---|---|---|
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1* | 9/2013 | Moshfeghi ............ H02J 7/025 320/107 |
| 2013/0241474 A1 | 9/2013 | Moshfeghi |
| 2013/0249478 A1 | 9/2013 | Hirano |
| 2013/0249479 A1 | 9/2013 | Partovi |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0103869 A1 | 4/2014 | Radovic |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |

(56) References Cited

U.S. PATENT DOCUMENTS

| | | |
|---|---|---|
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabamn |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0236520 A1 | 8/2015 | Baarman |
| 2015/0244070 A1 | 8/2015 | Cheng et al. |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0263534 A1 | 9/2015 | Lee et al. |
| 2015/0263548 A1 | 9/2015 | Cooper |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |

(56) References Cited

U.S. PATENT DOCUMENTS

| | | | |
|---|---|---|---|
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0299210 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110887 A1 | 4/2017 | Bell et al. |
| 2017/0110914 A1 | 4/2017 | Bell |
| 2017/0134686 A9 | 5/2017 | Leabman |
| 2017/0163076 A1 | 6/2017 | Park et al. |
| 2017/0179763 A9 | 6/2017 | Leabman |

FOREIGN PATENT DOCUMENTS

| | | | |
|---|---|---|---|
| DE | 2000216655 U1 | 2/2002 |
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 | 9/2011 |
| GB | 2404497 A | 2/2005 |
| JP | 2006157586 A | 6/2006 |
| JP | 2007043432 A | 2/2007 |
| JP | 2008167017 A | 7/2008 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 1020130026977 A | 3/2013 |
| WO | 9952173 A2 | 10/1999 |
| WO | WO 200111716 A1 | 2/2001 |
| WO | 2004077550 A1 | 9/2004 |
| WO | 2003091943 A1 | 11/2006 |
| WO | WO 2006122783 | 11/2006 |
| WO | 2008156571 A2 | 12/2008 |
| WO | 2010022181 A1 | 2/2010 |
| WO | WO 2010039246 A1 | 4/2010 |
| WO | WO 2010138994 A1 | 12/2010 |
| WO | 2011112022 A2 | 9/2011 |
| WO | WO 2012177283 A1 | 12/2012 |
| WO | 2013035190 A1 | 3/2013 |
| WO | WO 2013031988 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

International Search Report dated Sep. 12, 2014 corresponding to International Patent Application No. PCT/US2014/037072, 3 pages.
International Search Report dated Jan. 27, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
Energous Corp., Written Opinion, PCT/US2014/037170 , dated Sep. 15, 2014, 7 pgs.
Energous Corp., IPRP, PCT/US2014/037170, dated Nov. 10, 2015, 8 pgs.
Energous Corp., Written Opinion, PCT/US2014/041534, dated Oct. 13, 2014, 6 pgs.
Energous Corp., IPRP, PCT/US2014/041534, dated Dec. 29, 2015, 7 pgs.
Energous Corp., IPRP, PCT/US2014/046956, dated Jan. 19, 2016, 7 pgs.
Energous Corp., Written Opinion, PCT/US2014/037072, dated Sep. 12, 2014, 5 pgs.
Energous Corp., IPRP, PCT/US2014/037072, Nov. 10, 2015, 6 pgs.
Energous Corp., ISRWO, PCT/US2014/068568, dated Mar. 20, 2015, 10 pgs.
Energous Corp., IPRP, PCT/US2014/068568, dated Jun. 14, 2016, 8 pgs.
Energous Corp., ISRWO, PCT/US2014/055195, dated Dec. 22, 2014, 11 pgs.
Energous Corp., IPRP, PCT/US2014/055195, dated Mar. 22, 2016, 9 pgs.
Energous Corp., ISRWO, PCT/US2015/067291, dated Mar. 4, 2016, 10 pgs.
Energous Corp., IPRP, PCT/US2015/067291, dated Jul. 4, 2017, 4 pgs.
Energous Corp., ISRWO, PCT/US2015/067242, dated Mar. 16, 2016, 9 pgs.
Energous Corp., IPRP, PCT/US2015/067242, dated Jun. 27, 2017, 7 pgs.
Energous Corp., ISRWO, PCT/US2015/067243, dated Mar. 10, 2016, 11 pgs.
Energous Corp., IPRP, PCT/US2015/067243, dated Jun. 27, 2017, 7 pgs.
Energous Corp., ISRWO, PCT/US2014/037109, dated Apr. 8, 2016, 12 pgs.

(56) References Cited

OTHER PUBLICATIONS

Energous Corp., IPRP, PCT/US2014/037109, dated Apr. 12, 2016, 9 pgs.
Energous Corp., ISRWO, PCT/US2015/067275, dated Mar. 3, 2016, 8 pgs.
Energous Corp., IPRP, PCT/US2015/067275, dated Jul. 4, 2017, 7 pgs.
Energous Corp., ISRWO, PCT/US2015/067245, dated Mar. 17, 2016, 8 pgs.
Energous Corp., IPRP, PCT/US2015/067245, dated Jun. 27, 2017, 7 pgs.
Energous Corp., ISRWO, PCT/US2014/041546, dated Oct. 16, 2014, 12 pgs.
Energous Corp., IPRP, PCT/US2014/041546, dated Dec. 29, 2015, 9 pgs.
Energous Corp., ISRWO, PCT/US2015/67250, dated Mar. 30, 2016, 11 pgs.
Energous Corp., IPRP, PCT/US2015/67250, dated Mar. 30, 2016, 10 pgs.
Energous Corp., ISRWO, PCT/US2015/067325, dated Mar. 10, 2016, 9 pgs.
Energous Corp., IPRP, PCT/US2015/067325, dated Jul. 4, 2017, 8 pgs.
Energous Corp., ISRWO, PCT/US2014/040697, dated Oct. 1, 2014, 12 pgs.
Energous Corp., IPRP, PCT/US2014/040697, dated Dec. 8, 2015, 9 pgs.
Energous Corp., ISRWO, PCT/US2014/040705, dated Sep. 23, 2014, 8 pgs.
Energous Corp., IPRP, PCT/US2014/040705, dated Dec. 8, 2015, 6 pgs.
Energous Corp., ISRWO, PCT/US2015/067249, dated Mar. 29, 2016, 8 pgs.
Energous Corp., IPRP, PCT/US2015/067249, dated Jun. 27, 2017, 7 pgs.
Energous Corp., ISRWO, PCT/US2015/067246, dated May 11, 2016, 18 pgs.
Energous Corp., IPRP, PCT/US2015/067246, dated Jun. 27, 2017, 9 pgs.
Energous Corp., ISRWO, PCT/US2014/059317, dated Feb. 24, 2015, 13 pgs.
Energous Corp., IPRP, PCT/US2014/059317, dated Apr. 12, 2016, 10 pgs.
Energous Corp., ISRWO, PCT/US2014/049669, dated Nov. 13, 2014, 10 pgs.
Energous Corp., IPRP, PCT/US2014/049669, dated Feb. 9, 2016, 8 pgs.
Energous Corp., ISRWO, PCT/US2014/041323, dated Oct. 1, 2014, 10 pgs.
Energous Corp., IPRP, PCT/US2014/041323, dated Dec. 22, 2015, 8 pgs.
Energous Corp., IPRP, PCT/US2014/048002, dated Feb. 12, 2015 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, dated Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014, 16 pgs.
Energous Corp., IPRP, PCT/US2014/046961, dated Jan. 19, 2016, 8 pgs.
Energous Corp., ISRWO, PCT/US2015/067279, dated Mar. 11, 2015, 13 pgs.
Energous Corp., IPRP, PCT/US2015/067279, dated Jul. 4, 2017, 7 pgs.
Energous Corp., ISRWO, PCT/US2014/041342, dated Jan. 27, 2015, 10 pgs.
Energous Corp., IPRP, PCT/US2014/041342, dated Dec. 15, 2015, 8 pgs.
Energous Corp., ISRWO, PCT/US2014/046941, dated Nov. 6, 2014, 11 pgs.
Energous Corp., IPRP, PCT/US2014/046941, dated Jan. 19, 2016, 9 pgs.
Energous Corp., ISRWO, PCT/US2014/062661, dated Jan. 27, 2015, 12 pgs.
Energous Corp., IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016, 9 pgs.
Energous Corp., ISRWO, PCT/US2014/045102, dated Oct. 28, 2014, 14 pgs.
Energous Corp., IPRP, PCT/US2014/045102, dated Jan. 12, 2016, 11 pgs.
Energous Corp., ISRWO, PCT/US2014/059340, dated Jan. 15, 2015, 13 pgs.
Energous Corp., IPRP, PCT/US2014/059340, dated Apr. 12, 2016, 11 pgs.
Energous Corp., ISRWO, PCT/US2015/067282, dated Jul. 5, 2016, 7 pgs.
Energous Corp., IPRP, PCT/US2015/067282, dated Jul. 4, 2017, 6 pgs.
Energous Corp., ISRWO, PCT/US2014/041558, dated Oct. 10, 2014, 8 pgs.
Energous Corp., IPRP, PCT/US2014/041558, dated Dec. 29, 2015, 6 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO PCT/US2014/045237, dated Oct. 13, 2014, 16 pgs.
Energous Corp., IPRP, PCT/US2014/045237, dated Jan. 12, 2016, 12 pgs.
Energous Corp., ISRWO, PCT/US2014/054897, dated Feb. 17, 2015, 10 pgs.
Energous Corp., IPRP, PCT/US2014/054897, dated Mar. 15, 2016, 8 pgs.
Energous Corp., ISRWO, PCT/US2015/067334, dated Mar. 3, 2016, 6 pgs.
Energous Corp., IPRP, PCT/US2015/067334, dated Jul. 4, 2017, 5 pgs.
Energous Corp., ISRWO, PCT/US2014/047963, dated Nov. 7, 2014, 13 pgs.
Energous Corp., IPRP, PCT/US2014/047963, dated Jan. 26, 2016, 10 pgs.
Energous Corp., ISRWO, PCT/US2014/054891, dated Dec. 18, 2014, 12 pgs.
Energous Corp., IPRP, PCT/US2014/054891, dated Mar. 15, 2016, 10 pgs.
Energous Corp., ISRWO, PCT/US2014/054953, dated Dec. 4, 2014, 7 pgs.
Energous Corp., IPRP, PCT/US2014/054953, dated Mar. 22, 2016, 5 pgs.
Energous Corp., ISRWO, PCT/US2015/067294, dated Mar. 29, 2016, 7 pgs.
Energous Corp., IPRP, PCT/US2015/067294, dated Jul. 4, 2017, 6 pgs.
Energous Corp., ISRWO, PCT/US2014/062672 dated Jan. 26, 2015, 11 pgs.
Energous Corp., IPRP, PCT/US2014/062672 dated May 10, 2016, 8 pgs.
Energous Corp., ISRWO, PCT/US2014/044810 dated Oct. 21, 2014, 12 pgs.
Energous Corp., IPRP, PCT/US2014/044810, dated Jan. 5, 2016, 10 pgs.

(56) References Cited

OTHER PUBLICATIONS

Energous Corp., ISRWO, PCT/US2015/067271, dated Mar. 11, 2016, 6 pgs.
Energous Corp., IPRP, PCT/US2015/067271, dated Jul. 4, 2017, 5 pgs.
Energous Corp., ISRWO, PCT/US2014/040648, dated Oct. 10, 2014, 11 pgs.
Energous Corp., IPRP, PCT/US2014/040648, dated Dec. 8, 2015, 8 pgs.
Energous Corp., ISRWO, PCT/US2014/049673, dated Nov. 18, 2014, 10 pgs.
Energous Corp., IPRP, PCT/US2014/049673, dated Feb. 9, 2016, 6 pgs.
Energous Corp., ISRWO, PCT/US2014/068282, dated Mar. 19, 2015, 13 pgs.
Energous Corp., IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Energous Corp., ISRWO, PCT/US2016/068504, dated Mar. 30, 2017, 8 pgs.
Energous Corp., ISRWO, PCT/US2016/068495, dated Mar. 30, 2017, 9 pgs.
Energous Corp., ISRWO, PCT/US2015/067287, dated Feb. 2, 2016, 8 pgs.
Energous Corp., IPRP, PCT/US2015/067287, dated Jul. 4, 2017, 6 pgs.
Energous Corp., ISRWO, PCT/US2016/068551, dated Mar. 17, 2017, 8 pgs.
Energous Corp., ISRWO, PCT/US2016/068498, dated May 17, 2017, 8 pgs.
Energous Corp., ISRWO, PCT/US2016/068993, dated Mar. 13, 2017, 12 pgs.
Energous Corp., ISRWO, PCT/US2016/068565, dated Mar. 8, 2017, 11 pgs.
Energous Corp., ISRWO, PCT/US2016/068987, dated May 8, 2017, 10 pgs.
Energous Corp., ISRWO, PCT/US2016/069316 , dated Mar. 16, 2017, 15 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.8, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.

Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334, Oct. 3, 2013.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.
Li et al. High-Efficiency Switching-Mode Charger System Design Conisderations with Dynamnic Power Path Management, Mar./Apr. 2012 Issue, 8 pgs.
European Search Report, EP15876036, dated May 3, 2018, 9 pgs.
Energous Corp., ISRWO, PCT/US2018/012806 , dated Mar. 23, 2018, 9 pgs.
Energous Corp., ISRWO, PCT/US2017/046800 , dated Sep. 11, 2017, 13 pgs.
Energous Corp., ISRWO, PCT/US2017/065886, dated Apr. 6, 2018, 13 pgs.
Order Granting Reexamination Request Control No. 90013793 Aug. 31, 2016, 23 pgs.
*Ossia Inc.* vs *Energous Corp.*, PGR2016-00023—Institution Decision, Nov. 29, 2016, 29 pgs.
*Ossia Inc.* vs *Energous Corp.*, PGR2016-00024—Institution Decision, Nov. 29, 2016, 50 pgs.
*Ossia Inc.* vs *Energous Corp.*, PGR2016-00024—Judgement-Adverse, Jan. 20, 2017, 3 pgs.
ReExam Ordered Control No. 90013793 Feb. 2, 2017, 8 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.

\* cited by examiner

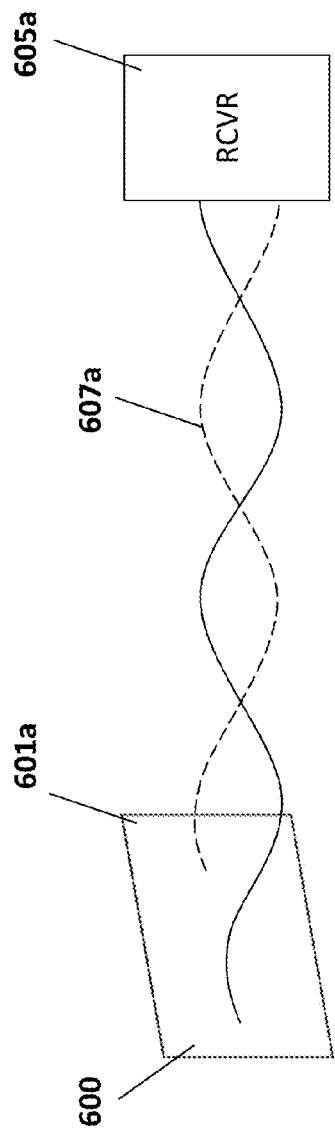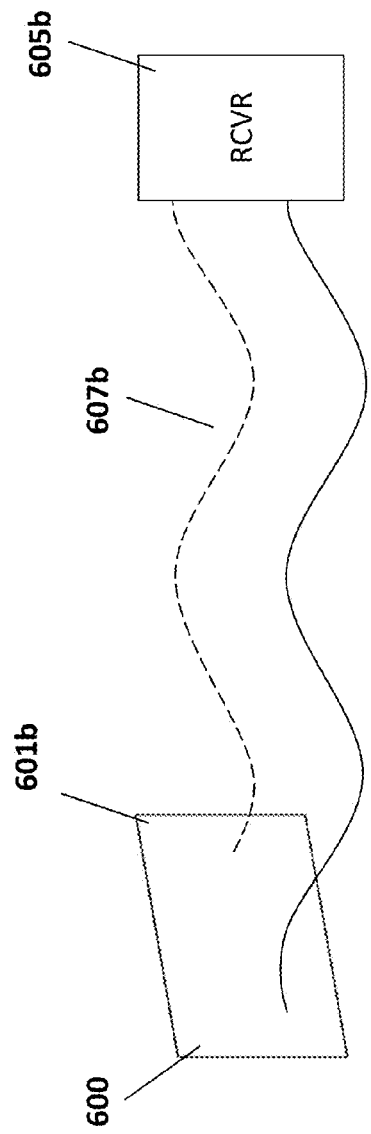

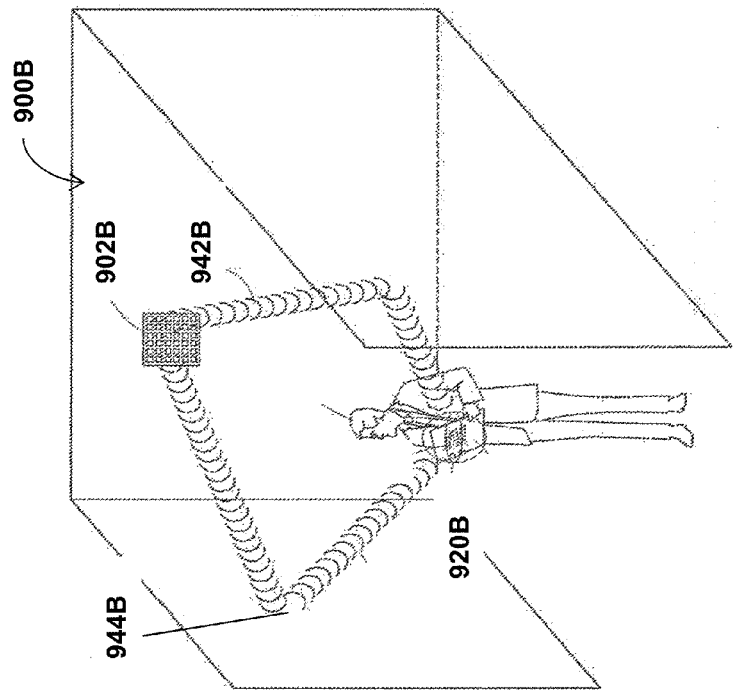
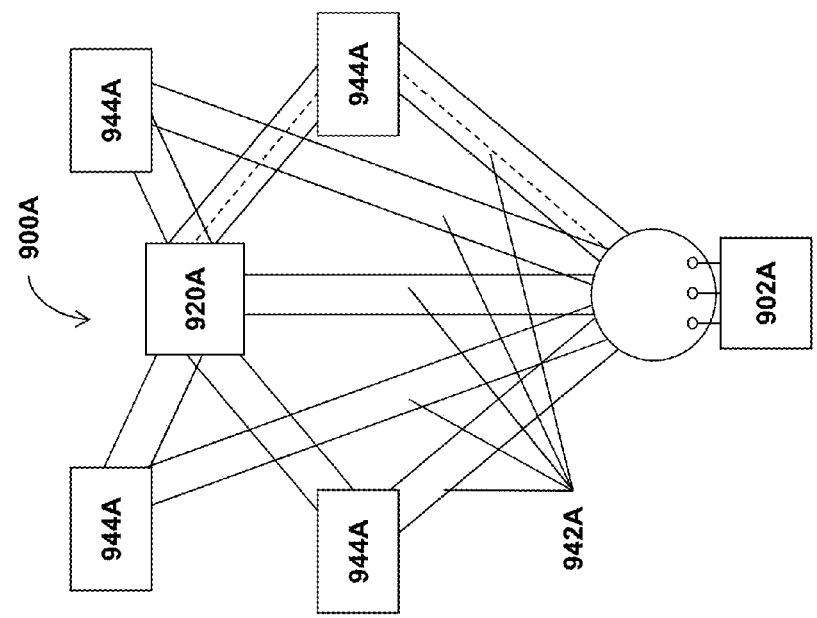
FIG. 9B
FIG. 9A

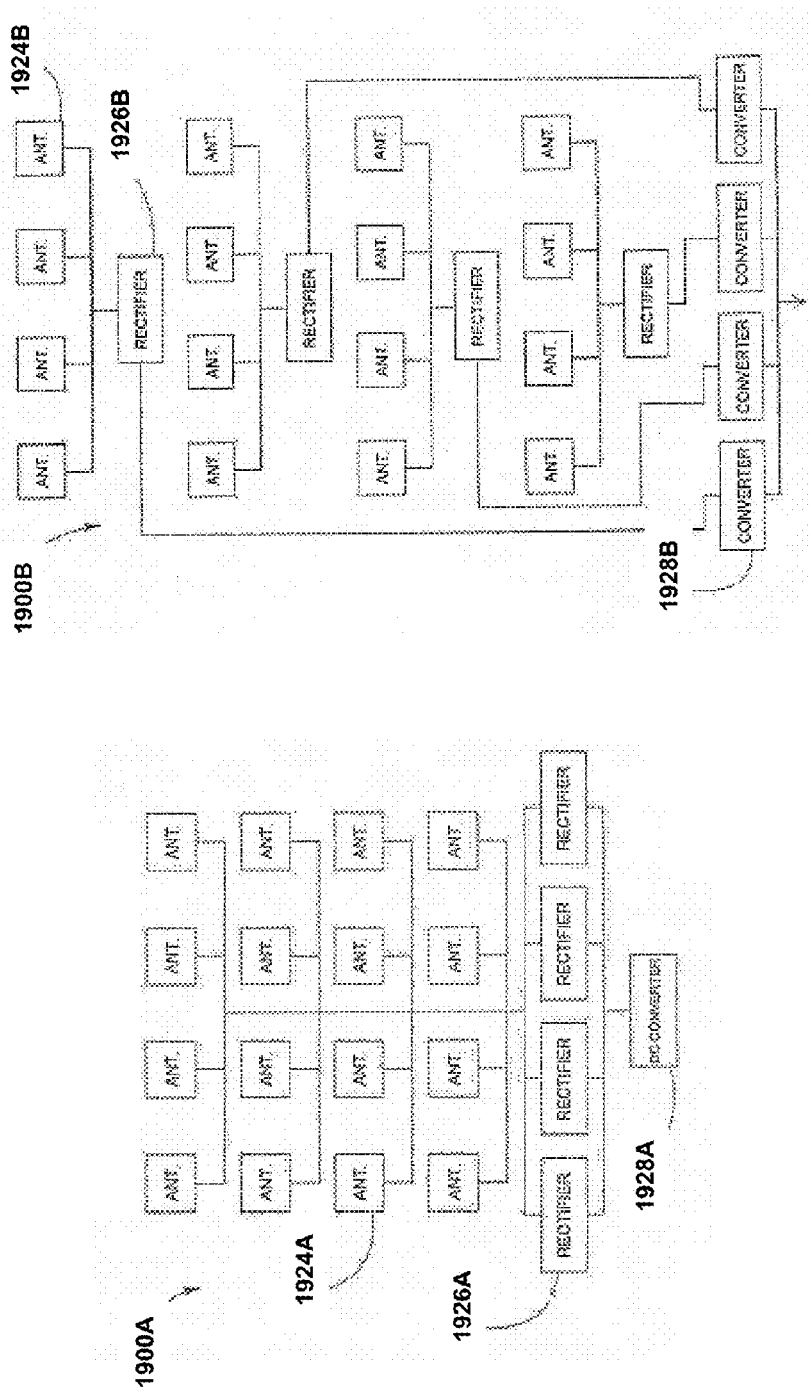

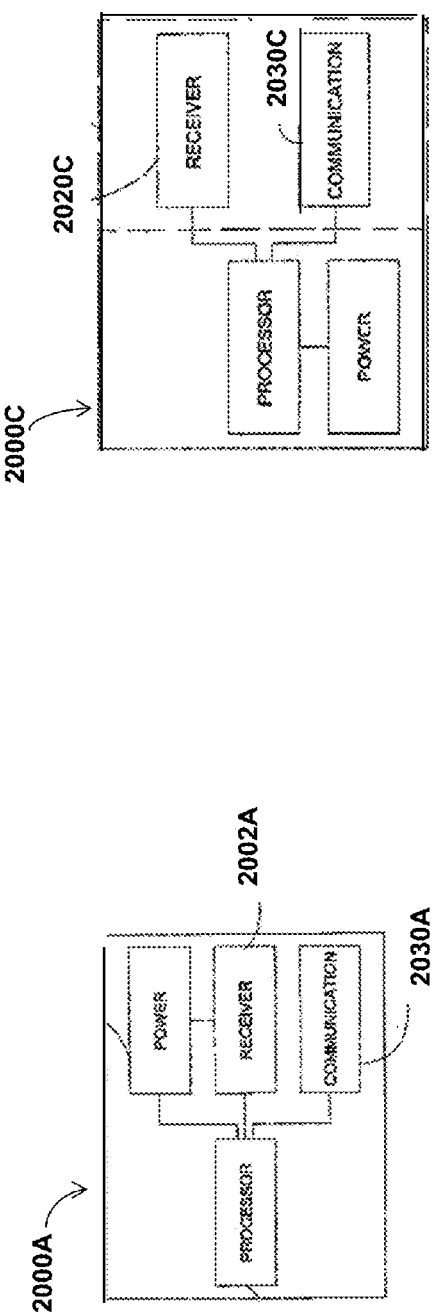
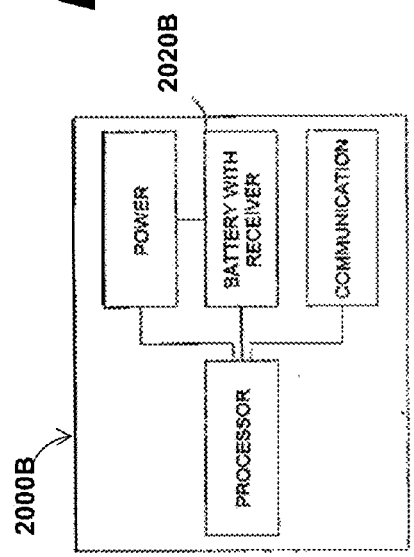
FIG. 20C
FIG. 20B
FIG. 20A

WIRELESS POWER RECEIVERS THAT COMMUNICATE STATUS DATA INDICATING WIRELESS POWER TRANSMISSION EFFECTIVENESS WITH A TRANSMITTER USING A BUILT-IN COMMUNICATIONS COMPONENT OF A MOBILE DEVICE, AND METHODS OF USE THEREOF

CROSS-REFERENCE TO RELATED APPLICATIONS

This application is a continuation-in-part of U.S. Non-Provisional patent application Ser. No. 14/173,936, entitled "External or Internal Receiver For Smart Mobile Devices," filed Feb. 6, 2014, which is hereby incorporated by reference in its entirety.

This application is related to U.S. Non-Provisional patent application Ser. No. 14/583,625, filed Dec. 27, 2014, entitled "Receivers for Wireless Power Transmission," U.S. Non-Provisional patent application Ser. No. 14/583,630, filed Dec. 27, 2014, entitled "Methodology for Pocket-Forming," U.S. Non-Provisional patent application Ser. No. 14/583, 634, filed Dec. 27, 2014, entitled "Transmitters for Wireless Power Transmission," U.S. Non-Provisional patent application Ser. No. 14/583,640, filed Dec. 27, 2014, entitled "Methodology for Multiple Pocket-Forming," U.S. Non-Provisional patent application Ser. No. 14/583,641, filed Dec. 27, 2014, entitled "Wireless Power Transmission with Selective Range," U.S. Non-Provisional patent application Ser. No. 14/583,643, filed Dec. 27, 2014, entitled "Method for 3 Dimensional Pocket-Forming"; U.S. Non-Provisional patent application Ser. No. 13/891,430, entitled "Methodology For Pocket-forming," filed May 10, 2013; U.S. Non-Provisional patent application Ser. No. 13/925,469, entitled "Methodology for Multiple Pocket-Forming," filed Jun. 24, 2013; U.S. Non-Provisional patent application Ser. No. 13/946,082, entitled "Method for 3 Dimensional Pocket-forming," filed Jul. 19, 2013; U.S. Non-Provisional patent application Ser. No. 13/891,399, entitled "Receivers for Wireless Power Transmission," filed May 10, 2013; U.S. Non-Provisional patent application Ser. No. 13/891,445, entitled "Transmitters for Wireless Power Transmission," filed May 10, 2013; and U.S. Non-Provisional patent application Ser. No. 13/926,020, entitled "Wireless Power Transmission with Selective Range," filed Jun. 25, 2013, all of which are incorporated herein by reference in their entirety.

TECHNICAL FIELD

The present disclosure relates generally to wireless power transmission, and more particularly, to configurations and methods of wireless power receipt by receivers.

BACKGROUND

Portable electronic devices such as smart phones, tablets, notebooks and other electronic devices have become an everyday need in the way we communicate and interact with others. The frequent use of these devices may require a significant amount of power, which may easily deplete the batteries attached to these devices. Therefore, a user is frequently needed to plug in the device to a power source, and recharge such device. This may require having to charge electronic equipment at least once a day, or in high-demand electronic devices more than once a day.

Such an activity may be tedious and may represent a burden to users. For example, a user may be required to carry chargers in case his electronic equipment is lacking power. In addition, users have to find available power sources to connect to. Lastly, users must plugin to a wall or other power supply to be able to charge his or her electronic device. However, such an activity may render electronic devices inoperable during charging.

Current solutions to this problem may include devices having rechargeable batteries. However, the aforementioned approach requires a user to carry around extra batteries, and also make sure that the extra set of batteries is charged. Solar-powered battery chargers are also known, however, solar cells are expensive, and a large array of solar cells may be required to charge a battery of any significant capacity. Other approaches involve a mat or pad that allows charging of a device without physically connecting a plug of the device to an electrical outlet, by using electromagnetic signals. In this case, the device still requires to be placed in a certain location for a period of time in order to be charged. Assuming a single source power transmission of electromagnetic (EM) signal, an EM signal gets reduced by a factor proportional to 1/r2 in magnitude over a distance r, in other words, it is attenuated proportional to the square of the distance. Thus, the received power at a large distance from the EM transmitter is a small fraction of the power transmitted. To increase the power of the received signal, the transmission power would have to be boosted. Assuming that the transmitted signal has an efficient reception at three centimeters from the EM transmitter, receiving the same signal power over a useful distance of three meters would entail boosting the transmitted power by 10,000 times. Such power transmission is wasteful, as most of the energy would be transmitted and not received by the intended devices, it could be hazardous to living tissue, it would most likely interfere with most electronic devices in the immediate vicinity, and it may be dissipated as heat.

In yet another approach such as directional power transmission, it would generally require knowing the location of the device to be able to point the signal in the right direction to enhance the power transmission efficiency. However, even when the device is located, efficient transmission is not guaranteed due to reflections and interference of objects in the path or vicinity of the receiving device.

For the foregoing reasons, there is a need for a wireless power transmission system where electronic devices may be powered without requiring extra chargers or plugs, and where the mobility and portability of electronic devices may not be compromised. Therefore, a wireless power transmission method solving the aforementioned problems is desired.

SUMMARY

In one embodiment, a mobile device comprises a first antenna element configured to interface with a pocket of energy formed from a plurality of constructive interference patterns based on a plurality of wireless power transmission waves emitted from a transmitter, wherein the first antenna element is configured to transform the pocket of energy into an AC voltage; a rectifier coupled to the first antenna element, wherein the rectifier is configured to convert the AC voltage into a DC voltage; a power converter coupled to the rectifier, wherein the converter is configured to change the DC voltage into a constant DC voltage to provide electrical energy to the electronic device; and a second antenna element coupled to a Bluetooth processor and configured to transmit to the transmitter one or more communication signals containing status data indicating the amount of energy received by the receiver, wherein the Bluetooth® processor is integrated with the electronic device and is further utilized by the electronic device to communicate data packets with a plurality of electronic devices other than the transmitter.

In another embodiment, a mobile device, comprises a receiver coupled to the mobile device, the receiver comprises a first antenna element configured to interface with a pocket of energy formed from a plurality of constructive interference patterns based on a plurality of wireless power transmission waves emitted from a transmitter, wherein the first antenna element is configured to transform the pocket of energy into an AC voltage; a rectifier coupled to the first antenna element, wherein the rectifier is configured to convert the AC Voltage into a DC voltage; a power converter coupled to the rectifier, wherein the converter is configured to change the DC voltage into a constant DC voltage to provide electrical energy to the mobile device; a second antenna element coupled to a communications circuitry and configured to transmit to the transmitter one or more communication signals containing status data indicating the amount of energy received by the receiver, wherein the communications circuitry is integrated with the mobile device and is further utilized by the mobile device to communicate data packets with a plurality of electronic devices other than the transmitter; and a power management integrated circuit configured to manage wireless power received by the receiver and power requirements of the mobile device.

In another embodiment, a method for communication with a transmitter for charging a mobile device, the method comprising establishing, by a transmitter, a communication connection with a Bluetooth® component integrated with an mobile device; receiving, by a transmitter, a communication signal containing status data about location and electric energy consumption of the mobile device from the Bluetooth® component; generating, by the transmitter, a plurality of power transmission waves in response to the received communication signal; controlling, by the transmitter, the generated power transmission waves, wherein the transmitter shifts a phase and a gain of a power transmission wave with respect to other power transmission waves based on the communication signal; and transmitting, by the transmitter, the power transmission waves through at least two antennas coupled to the transmitter, the power transmission waves configured to converge in three-dimensional space to produce a pocket of energy for charging the mobile device.

Certain embodiments of the apparatus include a receiver coupled to an electronic device and capable of receiving wireless power from a transmitter. The receiver includes a first antenna element configured to interface with a pocket of energy formed from a plurality of constructive interference patterns based on a plurality of wireless power transmission waves emitted from a transmitter, wherein the first antenna element is configured to transform the pocket of energy into an AC voltage. The receiver further includes a rectifier coupled to the first antenna element, wherein the rectifier is configured to convert the AC Voltage into a DC voltage, and a power converter coupled to the rectifier, wherein the converter is configured to change the DC voltage into a constant DC voltage to provide electrical energy to the electronic device. The receiver further includes a second antenna element coupled to a Bluetooth® processor and configured to transmit to the transmitter one or more communication signals containing status data indicating the amount of energy received by the receiver. The Bluetooth® processor may be integrated with the electronic device and further utilized by the electronic device to communicate data packets with a plurality of electronic devices other than the transmitter.

Certain embodiments of the apparatus include a receiver coupled to an electronic device and capable of receiving wireless power from a transmitter. The receiver includes a first antenna element configured to interface with a pocket of energy formed from a plurality of constructive interference patterns based on a plurality of wireless power transmission waves emitted from a transmitter, wherein the first antenna element is configured to transform the pocket of energy into an AC voltage. The receiver further includes a rectifier coupled to the first antenna element, wherein the rectifier is configured to convert the AC Voltage into a DC voltage, and a power converter coupled to the rectifier, wherein the converter is configured to change the DC voltage into a constant DC voltage to provide electrical energy to the electronic device. The receiver further includes a second antenna element coupled to a communications circuitry and configured to transmit to the transmitter one or more communication signals containing status data indicating the amount of energy received by the receiver. The receiver can share the power management integrated circuit with the electronic device and the PMIC is configured to manage wireless power received by the receiver and power requirements of the electronic device. The communication circuitry may communicate with the transmitter over a wireless communications protocol selected from the group consisting of: Bluetooth®, Bluetooth Low Energy (BLE), Wi-Fi, NFC and ZigBee®.

The electronic device can be any mobile device such as a smartphone, a tablet, a music player, a laptop computer, a toy, or a gaming controller. The electronic device can be a wearable device monitoring one or more physiological functions of the individual wearing the wearable device.

Certain embodiments of the method include utilizing a transmitter for wirelessly charging a mobile device. The method includes establishing, by a transmitter, a communication connection with a Bluetooth® component integrated with a mobile device and receiving, by the transmitter, a communication signal containing status data about location and electric energy consumption of the mobile device from the Bluetooth® component. The method further includes generating, by the transmitter, a plurality of power transmission waves in response to the received communication signal, controlling the generated power transmission waves; and transmitting the power transmission waves through at least two antennas coupled to the transmitter. The power transmission waves converge in three-dimensional space to produce a pocket of energy for charging the mobile device. The communication connection with the Bluetooth® component is established in response to recognition by the transmitter of predetermined identifiers associated with the mobile device, such as a device identifier, a user identifier, and a receiver identifier.

The embodiments described herein include a transmitter that transmits a power transmission signal (e.g., radio frequency (RF) signal waves) to create a three-dimensional pocket of energy. At least one receiver can be connected to or integrated into electronic devices and receive power from the pocket of energy. The transmitter can locate the at least one receiver in a three-dimensional space using a communication medium (e.g., Bluetooth technology). The transmitter generates a waveform to create a pocket of energy around each of the at least one receiver. The transmitter uses an algorithm to direct, focus, and control the waveform in three dimensions. The receiver can convert the transmission signals (e.g., RF signals) into electricity for powering an electronic device. Accordingly, the embodiments for wireless power transmission can allow powering and charging a plurality of electrical devices without wires.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 6A illustrates waveforms for wireless power transmission with selective range, which may get unified in single waveform.

FIG. 6B illustrates waveforms for wireless power transmission with selective range, which may get unified in single waveform.

FIGS. 9A and 9B illustrate a diagram of an architecture for wirelessly charging client computing platform, according to an exemplary embodiment

FIG. 19A illustrates multiple antenna elements outputs combined and connected to parallel rectifiers, according to an exemplary embodiment.

FIG. 19B illustrates groups of antenna elements connected to different rectifiers, according to an exemplary embodiment.

FIG. 20A illustrates a device with an embedded receiver, according to an exemplary embodiment.

FIG. 20B illustrates a battery with an embedded receiver, according to an exemplary embodiment.

FIG. 20C illustrates external hardware that may be attached to a device, according to an exemplary embodiment.

DETAILED DESCRIPTION

Figure 1:
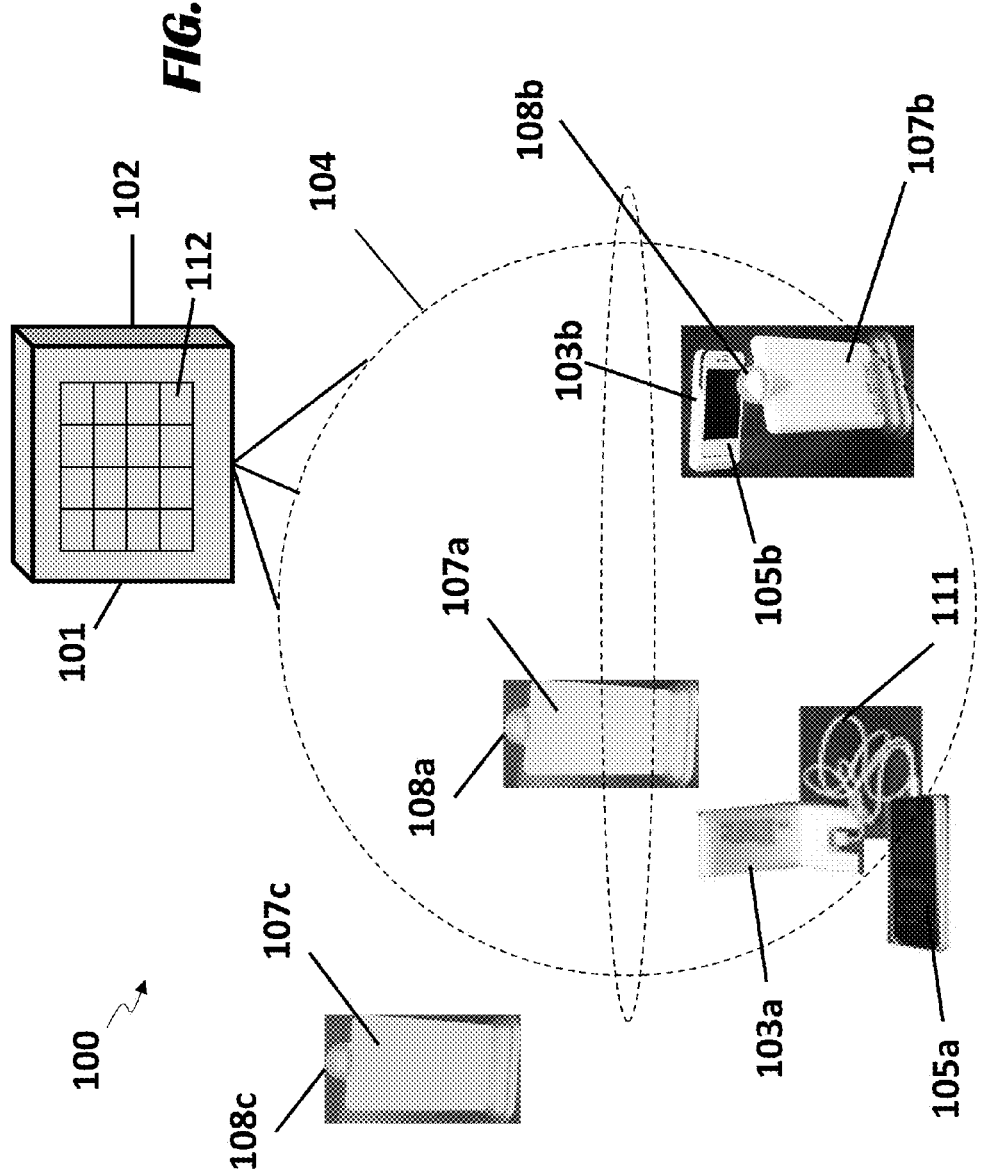
FIG. 1 illustrates a system overview, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Furthermore, the various components and embodiments described herein may be combined to form additional embodiments not expressly described, without departing from the spirit or scope of the invention.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

I. Systems and Methods for Wireless Power Transmissions

A. Components System Embodiment

FIG. 1 shows a system 100 for wireless power transmission by forming pockets of energy 104. The system 100 may comprise transmitters 101, receivers 103, client devices 105, and pocket detectors 107. Transmitters 101 may transmit power transmission signals comprising power transmission waves, which may be captured by receivers 103. The receivers 103 may comprise antennas, antenna elements, and other circuitry (detailed later), which may convert the captured waves into a useable source of electrical energy on behalf of client devices 105 associated with the receivers 103. In some embodiments, transmitters 101 may transmit power transmission signals, made up of power transmission waves, in one or more trajectories by manipulating the phase, gain, and/or other waveform features of the power transmission waves, and/or by selecting different transmit antennas. In such embodiments, the transmitters 101 may manipulate the trajectories of the power transmission signals so that the underlying power transmission waves converge at a location in space, resulting in certain forms of interference. One type of interference generated at the convergence of the power transmission waves, "constructive interference," may be a field of energy caused by the convergence of the power transmission waves such that they add together and strengthen the energy concentrated at that location—in contrast to adding together in a way to subtract from each other and diminish the energy concentrated at that location, which is called "destructive interference". The accumulation of sufficient energy at the constructive interference may establish a field of energy, or "pocket of energy" 104, which may be harvested by the antennas of a receiver 103, provided the antennas are configured to operate on the frequency of the power transmission signals. Accordingly, the power transmission waves establish pockets of energy 104 at the location in space where the receivers 103 may receive, harvest, and convert the power transmission waves into useable electrical energy, which may power or charge associated electrical client devices 105. Detectors 107 may be devices comprising a receiver 103 that are capable of producing a notification or alert in response to receiving power transmission signals. As an example, a user searching for the optimal placement of a receiver 103 to charge the user's client device 105 may use a detector 107 that comprises an LED light 108, which may brighten when the detector 107 captures the power transmission signals from a single beam or a pocket of energy 104.

1. Transmitters

The transmitter 101 may transmit or broadcast power transmission signals to a receiver 103 associated with a device 105. Although several of the embodiments mentioned below describe the power transmission signals as radio frequency (RF) waves, it should be appreciated that the power transmission may be physical media that is capable of being propagated through space, and that is capable of being converted into a source of electrical energy 103. The transmitter 101 may transmit the power transmission signals as a single beam directed at the receivers 103. In some cases, one or more transmitters 101 may transmit a plurality of power transmission signals that are propagated in a multiple directions and may deflect off of physical obstructions (e.g., walls). The plurality of power transmission signals may converge at a location in a three-dimensional space, forming a pocket of energy 104. Receivers 103 within the boundaries of an energy pocket 104 may capture and covert the power transmission signals into a useable source of energy. The transmitter 101 may control pocket-forming based on phase and/or relative amplitude adjustments of power transmission signals, to form constructive interference patterns.

Although the exemplary embodiment recites the use of RF wave transmission techniques, the wireless charging techniques should not be limited to RF wave transmission techniques. Rather, it should be appreciated that possible wireless charging techniques may include any number of alternative or additional techniques for transmitting energy to a receiver converting the transmitted energy to electrical power. Non-limiting exemplary transmission techniques for energy that can be converted by a receiving device into electrical power may include: ultrasound, microwave, resonant and inductive magnetic fields, laser light, infrared, or other forms of electromagnetic energy. In the case of ultrasound, for example, one or more transducer elements may be disposed so as to form a transducer array that transmits ultrasound waves toward a receiving device that receives the ultrasound waves and converts them to electrical power. In the case of resonant or inductive magnetic fields, magnetic fields are created in a transmitter coil and converted by a receiver coil into electrical power. In addition, although the exemplary transmitter 101 is shown as a single unit comprising potentially multiple transmitters (transmit array), both for RF transmission of power and for other power transmission methods mentioned in this paragraph, the transmit arrays can comprise multiple transmitters that are physically spread around a room rather than being in a compact regular structure.

The transmitter includes an antenna array where the antennas are used for sending the power transmission signal. Each antenna sends power transmission waves where the transmitter applies a different phase and amplitude to the signal transmitted from different antennas. Similar to the formation of pockets of energy, the transmitter can form a phased array of delayed versions of the signal to be transmitted, then applies different amplitudes to the delayed versions of the signal, and then sends the signals from appropriate antennas. For a sinusoidal waveform, such as an RF signal, ultrasound, microwave, or others, delaying the signal is similar to applying a phase shift to the signal.

2. Pockets of Energy

A pocket of energy 104 may be formed at locations of constructive interference patterns of power transmission signals transmitted by the transmitter 101. The pockets of energy 104 may manifest as a three-dimensional field where energy may be harvested by receivers 103 located within the pocket of energy 104. The pocket of energy 104 produced by transmitters 101 during pocket-forming may be harvested by a receiver 103, converted to an electrical charge, and then provided to electronic client device 105 associated with the receiver 103 (e.g., laptop computer, smartphone, rechargeable battery). In some embodiments, there may be multiple transmitters 101 and/or multiple receivers 103 powering various client devices 105. In some embodiments, adaptive pocket-forming may adjust transmission of the power transmission signals in order to regulate power levels and/or identify movement of the devices 105.

3. Receivers

A receiver 103 may be used for powering or charging an associated client device 105, which may be an electrical device coupled to or integrated with the receiver 103. The receiver 103 may receive power transmission waves from one or more power transmission signals originating from one or more transmitters 101. The receiver 103 may receive the power transmission signals as a single beam produced by the transmitter 101, or the receiver 103 may harvest power transmission waves from a pocket of energy 104, which may be a three-dimensional field in space resulting from the convergence of a plurality of power transmission waves produced by one or more transmitters 101. The receiver 103 may comprise an array of antennas 112 configured to receive power transmission waves from a power transmission signal and harvest the energy from the power transmission signals of the single beam or pocket of energy 104. The receiver 103 may comprise circuitry that then converts the energy of the power transmission signals (e.g., the radio frequency electromagnetic radiation) to electrical energy. A rectifier of the receiver 103 may translate the electrical energy from AC to DC. Other types of conditioning may be applied, as well. For example, a voltage conditioning circuit may increase or decrease the voltage of the electrical energy as required by the client device 105. An electrical relay may then convey the electrical energy from the receiver 103 to the client device 105.

In some embodiments, the receiver 103 may comprise a communications component that transmits control signals to the transmitter 101 in order to exchange data in real-time or near real-time. The control signals may contain status information about the client device 105, the receiver 103, or the power transmission signals. Status information may include, for example, present location information of the device 105, amount of charge received, amount of charged used, and user account information, among other types of information. Further, in some applications, the receiver 103 including the rectifier that it contains may be integrated into the client device 105. For practical purposes, the receiver 103, wire 111, and client device 105 may be a single unit contained in a single packaging.

4. Control Signals

In some embodiments, control signals may serve as data inputs used by the various antenna elements responsible for controlling production of power transmission signals and/or pocket-forming. Control signals may be produced by the receiver 103 or the transmitter 101 using an external power supply (not shown) and a local oscillator chip (not shown), which in some cases may include using a piezoelectric material. Control signals may be RF waves or any other communication medium or protocol capable of communicating data between processors, such as Bluetooth®, RFID, infrared, near-field communication (NFC). As detailed later, control signals may be used to convey information between the transmitter 101 and the receiver 103 used to adjust the power transmission signals, as well as contain information related to status, efficiency, user data, power consumption, billing, geo-location, and other types of information.

5. Detectors

A detector 107 may comprise hardware similar to receivers 103, which may allow the detector 107 to receive power transmission signals originating from one or more transmitters 101. The detector 107 may be used by users to identify the location of pockets of energy 104, so that users may determine the preferable placement of a receiver 103. In some embodiments, the detector 107 may comprise an indicator light 108 that indicates when the detector is placed within the pocket of energy 104. As an example, in FIG. 1, detectors 107a, 107b are located within the pocket of energy 104 generated by the transmitter 101, which may trigger the detectors 107a, 107b to turn on their respective indicator lights 108a, 108b, because the detectors 107a, 107b are receiving power transmission signals of the pocket of energy 104; whereas, the indicator light 108c of a third detector 107c located outside of the pockets of energy 104, is turned off, because the third detector 107c is not receiving the power transmission signals from the transmitter 101. It should be appreciated that the functions of a detector, such as the indicator light, may be integrated into a receiver or into a client device in alternative embodiments as well.

6. Client Device

A client device 105 may be any electrical device that requires continuous electrical energy or that requires power from a battery. Non-limiting examples of client devices 105 may include laptops, mobile phones, smartphones, tablets, music players, toys, batteries, flashlights, lamps, electronic watches, cameras, gaming consoles, appliances, GPS devices, and wearable devices or so-called "wearables" (e.g., fitness bracelets, pedometers, smartwatch), among other types of electrical devices.

In some embodiments, the client device 105a may be a physical device distinct from the receiver 103a associated with the client device 105a. In such embodiments, the client device 105a may be connected to the receiver over a wire 111 that conveys converted electrical energy from the receiver 103a to the client device 105a. In some cases, other types of data may be transported over the wire 111, such as power consumption status, power usage metrics, device identifiers, and other types of data.

In some embodiments, the client device 105b may be permanently integrated or detachably coupled to the receiver 103b, thereby forming a single integrated product or unit. As an example, the client device 105b may be placed into a sleeve that has embedded receivers 103b and that may detachably couple to the device's 105b power supply input, which may be typically used to charge the device's 105b battery. In this example, the device 105b may be decoupled from the receiver, but may remain in the sleeve regardless of whether or not the device 105b requires an electrical charge or is being used. In another example, in lieu of having a battery that holds a charge for the device 105b, the device 105b may comprise an integrated receiver 105b, which may be permanently integrated into the device 105b so as to form an indistinct product, device, or unit. In this example, the device 105b may rely almost entirely on the integrated receiver 103b to produce electrical energy by harvesting pockets of energy 104. It should be clear to someone skilled in the art that the connection between the receiver 103 and the client device 105 may be a wire 111 or may be an electrical connection on a circuit board or an integrated circuit, or even a wireless connection, such as inductive or magnetic.

B. Method of Wireless Power Transmission

Figure 2:
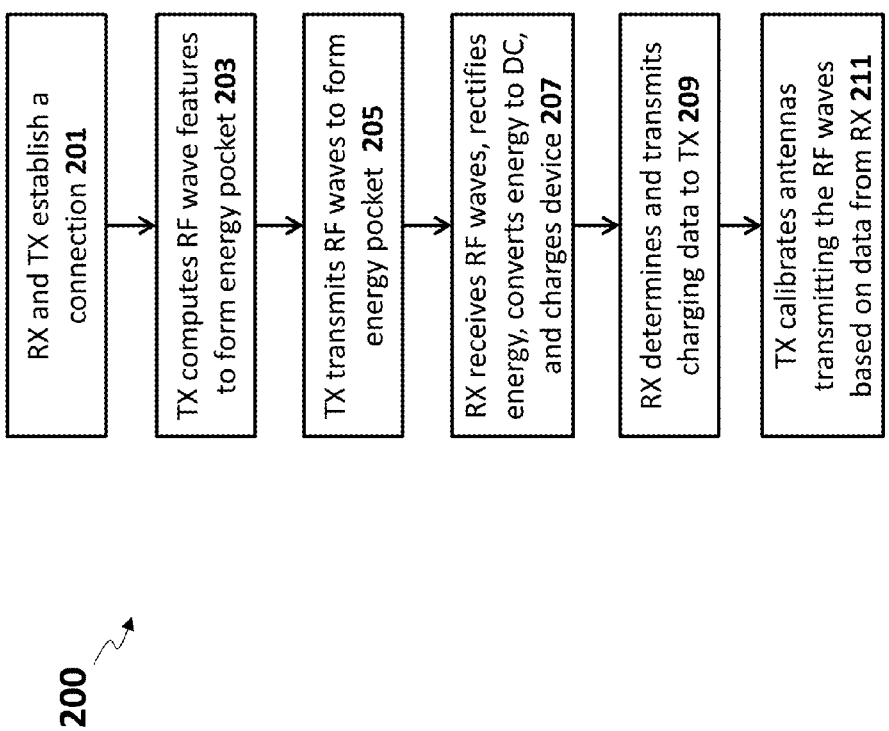
FIG. 2 illustrates steps of wireless power transmission, according to an exemplary embodiment.

FIG. 2 shows steps of wireless power transmission, according to an exemplary method 200 embodiment.

In a first step 201, a transmitter (TX) establishes a connection or otherwise associates with a receiver (RX). That is, in some embodiments, transmitters and receivers may communicate control data over using a wireless communication protocol capable of transmitting information between two processors of electrical devices (e.g., Bluetooth®, Bluetooth Low Energy (BLE), Wi-Fi, NFC, ZigBee®). For example, in embodiments implementing Bluetooth® or Bluetooth® variants, the transmitter may scan for receiver's broadcasting advertisement signals or a receiver may transmit an advertisement signal to the transmitter. The advertisement signal may announce the receiver's presence to the transmitter, and may trigger an association between the transmitter and the receiver. As described herein, in some embodiments, the advertisement signal may communicate information that may be used by various devices (e.g., transmitters, client devices, sever computers, other receivers) to execute and manage pocket-forming procedures. Information contained within the advertisement signal may include a device identifier (e.g., MAC address, IP address, UUID), the voltage of electrical energy received, client device power consumption, and other types of data related to power transmission. The transmitter may use the advertisement signal transmitted to identify the receiver and, in some cases, locate the receiver in a two-dimensional space or in a three-dimensional space. Once the transmitter identifies the receiver, the transmitter may establish the connection associated in the transmitter with the receiver, allowing the transmitter and receiver to communicate control signals over a second channel.

In a next step 203, the transmitter may use the advertisement signal to determine a set of power transmission signal features for transmitting the power transmission signals, to then establish the pockets of energy. Non-limiting examples of features of power transmission signals may include phase, gain, amplitude, magnitude, and direction among others. The transmitter may use information contained in the receiver's advertisement signal, or in subsequent control signals received from the receiver, to determine how to produce and transmit the power transmission signals so that the receiver may receive the power transmission signals. In some cases, the transmitter may transmit power transmission signals in a way that establishes a pocket of energy, from which the receiver may harvest electrical energy. In some embodiments, the transmitter may comprise a processor executing software modules capable of automatically identifying the power transmission signal features needed to establish a pocket of energy based on information received from the receiver, such as the voltage of the electrical energy harvested by the receiver from the power transmission signals. It should be appreciated that in some embodiments, the functions of the processor and/or the software modules may be implemented in an Application Specific Integrated Circuit (ASIC).

Additionally or alternatively, in some embodiments, the advertisement signal or subsequent signal transmitted by the receiver over a second communications channel may indicate one or more power transmission signals features, which the transmitter may then use to produce and transmit power transmission signals to establish a pocket of energy. For example, in some cases the transmitter may automatically identify the phase and gain necessary for transmitting the power transmission signals based on the location of the device and the type of device or receiver; and, in some cases, the receiver may inform the transmitter the phase and gain for effectively transmitting the power transmission signals.

In a next step 205, after the transmitter determines the appropriate features to use when transmitting the power transmission signals, the transmitter may begin transmitting power transmission signals, over a separate channel from the control signals. Power transmission signals may be transmitted to establish a pocket of energy. The transmitter's antenna elements may transmit the power transmission signals such that the power transmission signals converge in a two-dimensional or three-dimensional space around the receiver. The resulting field around the receiver forms a pocket of energy from which the receiver may harvest electrical energy. One antenna element may be used to transmit power transmission signals to establish two-dimensional energy transmissions; and in some cases, a second or additional antenna element may be used to transmit power transmission signals in order to establish a three-dimensional pocket of energy. In some cases, a plurality of antenna elements may be used to transmit power transmission signals in order to establish the pocket of energy. Moreover, in some cases, the plurality of antennas may include all of the antennas in the transmitter; and, in some cases, the plurality of antennas may include a number of the antennas in the transmitter, but fewer than all of the antennas of the transmitter.

As previously mentioned, the transmitter may produce and transmit power transmission signals, according to a determined set of power transmission signal features, which may be produced and transmitted using an external power source and a local oscillator chip comprising a piezoelectric material. The transmitter may comprise an RFIC that controls production and transmission of the power transmission signals based on information related to power transmission and pocket-forming received from the receiver. This control data may be communicated over a different channel from the power transmission signals, using wireless communications protocols, such as BLE, NFC, or ZigBee®. The RFIC of the transmitter may automatically adjust the phase and/or relative magnitudes of the power transmission signals as needed. Pocket-forming is accomplished by the transmitter transmitting the power transmission signals in a manner that forms constructive interference patterns.

Antenna elements of the transmitter may use concepts of wave interference to determine certain power transmission signals features (e.g., direction of transmission, phase of power transmission signal wave), when transmitting the power transmission signals during pocket-forming. The antenna elements may also use concepts of constructive interference to generate a pocket of energy, but may also utilize concepts of deconstructive interference to generate a transmission null in a particular physical location.

In some embodiments, the transmitter may provide power to a plurality of receivers using pocket-forming, which may require the transmitter to execute a procedure for multiple pocket-forming. A transmitter comprising a plurality of antenna elements may accomplish multiple pocket-forming by automatically computing the phase and gain of power transmission signal waves, for each antenna element of the transmitter tasked with transmitting power transmission signals the respective receivers. The transmitter may compute the phase and gains independently, because multiple wave paths for each power transmission signal may be generated by the transmitter's antenna elements to transmit the power transmission signals to the respective antenna elements of the receiver.

As an example of the computation of phase/gain adjustments for two antenna elements of the transmitter transmitting two signals, say X and Y where Y is 180 degree phase shifted version of X (Y=−X). At a physical location where the cumulative received waveform is X−Y, a receiver receives X−Y=X+X=2X, whereas at a physical location where the cumulative received waveform is X+Y, a receiver receives X+Y=X−X=0.

In a next step 207, the receiver may harvest or otherwise receive electrical energy from power transmission signals of a single beam or a pocket of energy. The receiver may comprise a rectifier and AC/DC converter, which may convert the electrical energy from AC current to DC current, and a rectifier of the receiver may then rectify the electrical energy, resulting in useable electrical energy for a client device associated with the receiver, such as a laptop computer, smartphone, battery, toy, or other electrical device.

The receiver may utilize the pocket of energy produced by the transmitter during pocket-forming to charge or otherwise power the electronic device.

In next step 209, the receiver may generate control data containing information indicating the effectiveness of the single beam or energy pockets providing the receiver power transmission signals. The receiver may then transmit control signals containing the control data, to the transmitter. The control signals may be transmitted intermittently, depending on whether the transmitter and receiver are communicating synchronously (i.e., the transmitter is expecting to receive control data from the receiver). Additionally, the transmitter may continuously transmit the power transmission signals to the receiver, irrespective of whether the transmitter and receiver are communicating control signals. The control data may contain information related to transmitting power transmission signals and/or establishing effective pockets of energy. Some of the information in the control data may inform the transmitter how to effectively produce and transmit, and in some cases adjust, the features of the power transmission signals. Control signals may be transmitted and received over a second channel, independent from the power transmission signals, using a wireless protocol capable of transmitting control data related to power transmission signals and/or pocket-forming, such as BLE, NFC, Wi-Fi, or the like.

As mentioned, the control data may contain information indicating the effectiveness of the power transmission signals of the single beam or establishing the pocket of energy. The control data may be generated by a processor of the receiver monitoring various aspects of receiver and/or the client device associated with the receiver. The control data may be based on various types of information, such as the voltage of electrical energy received from the power transmission signals, the quality of the power transmission signals reception, the quality of the battery charge or quality of the power reception, and location or motion of the receiver, among other types of information useful for adjusting the power transmission signals and/or pocket-forming.

In some embodiments, a receiver may determine the amount of power being received from power transmission signals transmitted from the transmitter and may then indicate that the transmitter should "split" or segment the power transmission signals into less-powerful power transmission signals. The less-powerful power transmission signals may be bounced off objects or walls nearby the device, thereby reducing the amount of power being transmitted directly from the transmitter to the receiver.

In a next step 211, the transmitter may calibrate the antennas transmitting the power transmission signals, so that the antennas transmit power transmission signals having a more effective set of feature (e.g., direction, phase, gain, amplitude). In some embodiments, a processor of the transmitter may automatically determine more effective features for producing and transmitting the power transmission signals based on a control signal received from the receiver. The control signal may contain control data, and may be transmitted by the receiver using any number of wireless communication protocols (e.g., BLE, Wi-Fi, ZigBee®). The control data may contain information expressly indicating the more effective features for the power transmission waves; or the transmitter may automatically determine the more effective features based on the waveform features of the control signal (e.g., shape, frequency, amplitude). The transmitter may then automatically reconfigure the antennas to transmit recalibrated power transmission signals according to the newly determined more-effective features. For example, the processor of the transmitter may adjust gain and/or phase of the power transmission signals, among other features of power transmission feature, to adjust for a change in location of the receiver, after a user moved the receiver outside of the three-dimensional space where the pocket of energy is established.

C. System Architecture of Power Transmission System

Figure 3:
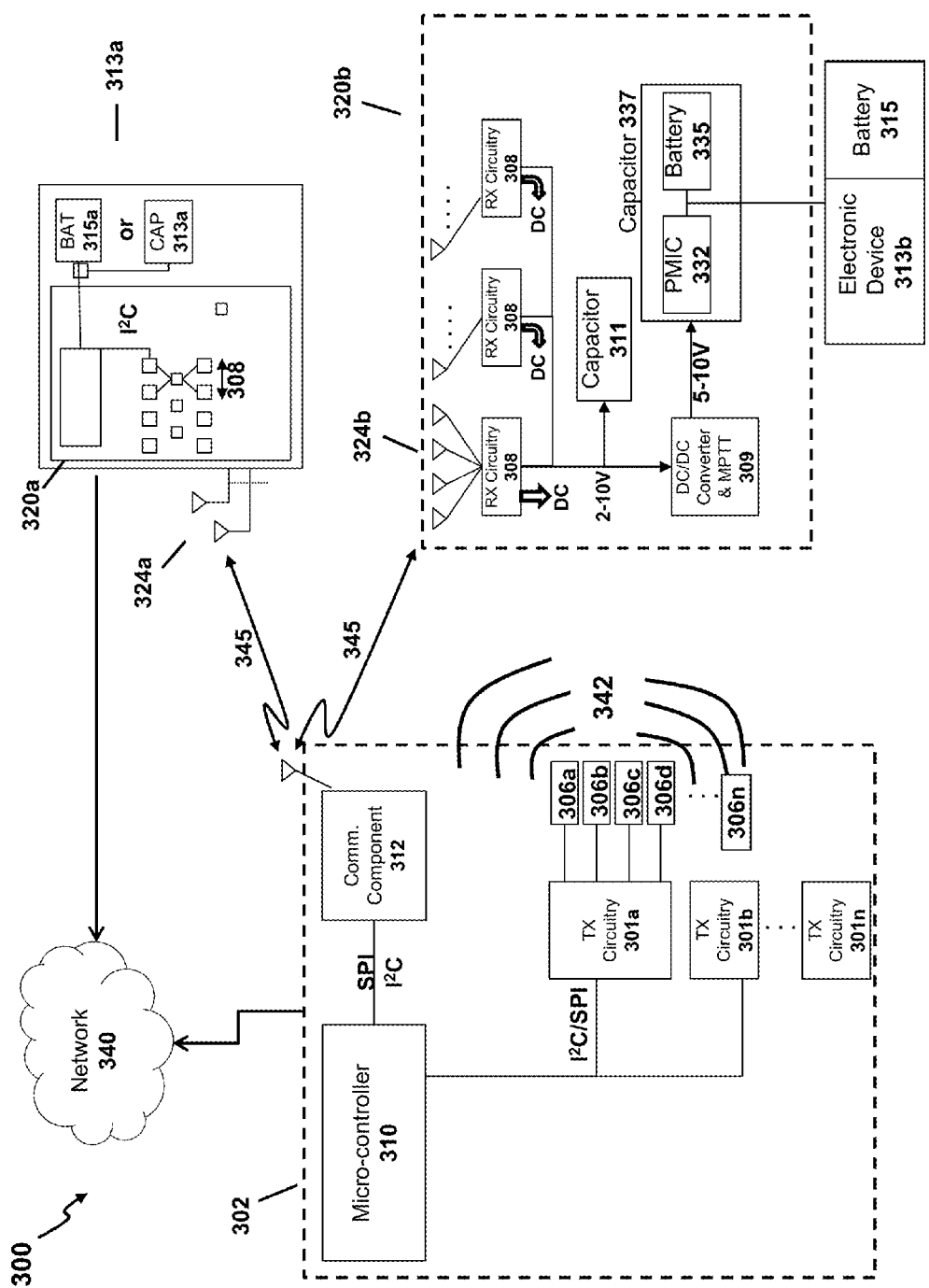
FIG. 3 illustrates an architecture for wireless power transmission, according to an exemplary embodiment.

FIG. 3 illustrates an architecture 300 for wireless power transmission using pocket-forming, according to an exemplary embodiment. "Pocket-forming" may refer to generating two or more power transmission waves 342 that converge at a location in three-dimensional space, resulting in constructive interference patterns at that location. A transmitter 302 may transmit and/or broadcast controlled power transmission waves 342 (e.g., microwaves, radio waves, ultrasound waves) that may converge in three-dimensional space. These power transmission waves 342 may be controlled through phase and/or relative amplitude adjustments to form constructive interference patterns (pocket-forming) in locations where a pocket of energy is intended. It should be understood also that the transmitter can use the same principles to create destructive interference in a location thereby creating a transmission null—a location where transmitted power transmission waves cancel each other out substantially and no significant energy can be collected by a receiver. In typical use cases the aiming of a power transmission signal at the location of the receiver is the objective; and in other cases it may be desirable to specifically avoid power transmission to a particular location; and in other cases it may be desirable to aim power transmission signal at a location while specifically avoiding transmission to a second location at the same time. The transmitter takes the use case into account when calibrating antennas for power transmission.

Antenna elements 306 of the transmitter 302 may operate in single array, pair array, quad array, or any other suitable arrangement that may be designed in accordance with the desired application. Pockets of energy may be formed at constructive interference patterns where the power transmission waves 342 accumulate to form a three-dimensional field of energy, around which one or more corresponding transmission null in a particular physical location may be generated by destructive interference patterns. Transmission null in a particular physical location-may refer to areas or regions of space where pockets of energy do not form because of destructive interference patterns of power transmission waves 342.

A receiver 320 may then utilize power transmission waves 342 emitted by the transmitter 302 to establish a pocket of energy, for charging or powering an electronic device 313, thus effectively providing wireless power transmission. Pockets of energy may refer to areas or regions of space where energy or power may accumulate in the form of constructive interference patterns of power transmission waves 342. In other situations there can be multiple transmitters 302 and/or multiple receivers 320 for powering various electronic equipment for example smartphones, tablets, music players, toys and others at the same time. In other embodiments, adaptive pocket-forming may be used to regulate power on electronic devices. Adaptive pocket-forming may refer to dynamically adjusting pocket-forming to regulate power on one or more targeted receivers.

Receiver 320 may communicate with transmitter 302 by generating a short signal through antenna elements 324 in order to indicate its position with respect to the transmitter 302. In some embodiments, receiver 320 may additionally utilize a network interface card (not shown) or similar computer networking component to communicate through a network 340 with other devices or components of the system 300, such as a cloud computing service that manages several collections of transmitters 302. The receiver 320 may comprise circuitry 308 for converting the power transmission signals 342 captured by the antenna elements 324, into electrical energy that may be provided to and electric device 313 and/or a battery of the device 315. In some embodiments, the circuitry may provide electrical energy to a battery of receiver 335, which may store energy without the electrical device 313 being communicatively coupled to the receiver 320.

Communications components 324 may enable receiver 320 to communicate with the transmitter 302 by transmitting control signals 345 over a wireless protocol. The wireless protocol can be a proprietary protocol or use a conventional wireless protocol, such as Bluetooth®, BLE, Wi-Fi, NFC, ZigBee, and the like. Communications component 324 may then be used to transfer information, such as an identifier for the electronic device 313, as well as battery level information, geographic location data, or other information that may be of use for transmitter 302 in determining when to send power to receiver 320, as well as the location to deliver power transmission waves 342 creating pockets of energy. In other embodiments, adaptive pocket-forming may be used to regulate power provided to electronic devices 313. In such embodiments, the communications components 324 of the receiver may transmit voltage data indicating the amount of power received at the receiver 320, and/or the amount of voltage provided to an electronic device 313b or battery 315.

Once transmitter 302 identifies and locates receiver 320, a channel or path for the control signals 345 can be established, through which the transmitter 302 may know the gain and phases of the control signals 345 coming from receiver 320. Antenna elements 306 of the transmitter 302 may start to transmit or broadcast controlled power transmission waves 342 (e.g., radio frequency waves, ultrasound waves), which may converge in three-dimensional space by using at least two antenna elements 306 to manipulate the power transmission waves 342 emitted from the respective antenna element 306. These power transmission waves 342 may be produced by using an external power source and a local oscillator chip using a suitable piezoelectric material. The power transmission waves 342 may be controlled by transmitter circuitry 301, which may include a proprietary chip for adjusting phase and/or relative magnitudes of power transmission waves 342. The phase, gain, amplitude, and other waveform features of the power transmission waves 342 may serve as inputs for antenna element 306 to form constructive and destructive interference patterns (pocket-forming). In some implementations, a micro-controller 310 or other circuit of the transmitter 302 may produce a power transmission signal, which comprises power transmission waves 342, and that may be may split into multiple outputs by transmitter circuitry 301, depending on the number of antenna elements 306 connected to the transmitter circuitry 301. For example, if four antenna elements 306a-d are connected to one transmitter circuit 301a, the power transmission signal will be split into four different outputs each output going to an antenna element 306 to be transmitted as power transmission waves 342 originating from the respective antenna elements 306.

Pocket-forming may take advantage of interference to change the directionality of the antenna element 306 where constructive interference generates a pocket of energy and destructive interference generates a transmission null. Receiver 320 may then utilize pocket of energy produced by pocket-forming for charging or powering an electronic device and therefore effectively providing wireless power transmission.

Multiple pocket-forming may be achieved by computing the phase and gain from each antenna 306 of transmitter 302 to each receiver 320.

D. Components of Systems Forming Pockets of Energy

Figure 4:
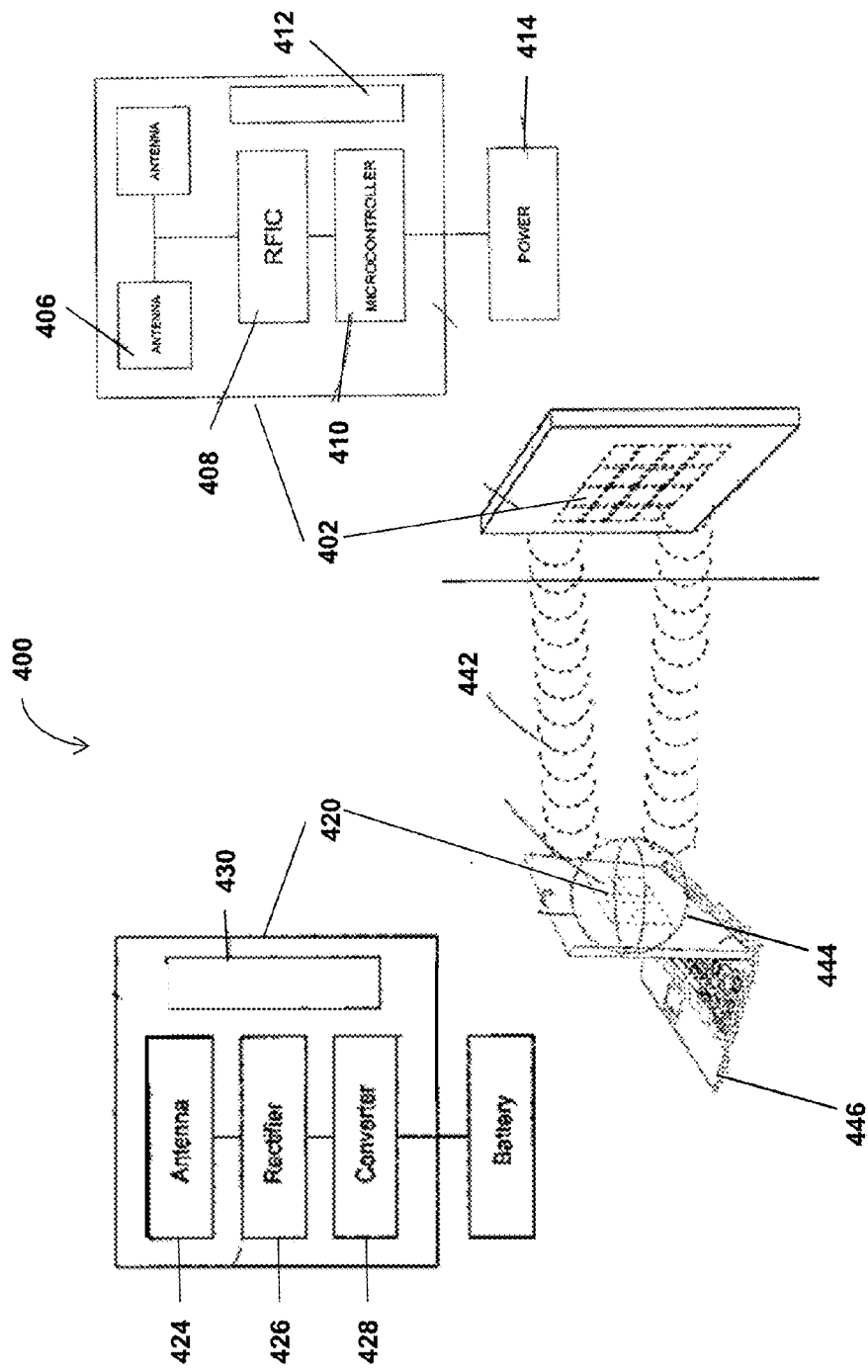
FIG. 4 illustrates components of a system of wireless power transmission using pocket-forming procedures, according to an exemplary embodiment.

FIG. 4 shows components of an exemplary system 400 of wireless power transmission using pocket-forming procedures. The system 400 may comprise one or more transmitters 402, one or more receivers 420, and one or more client devices 446.

1. Transmitters

Transmitters 402 may be any device capable of broadcasting wireless power transmission signals, which may be RF waves 442, for wireless power transmission, as described herein. Transmitters 402 may be responsible for performing tasks related to transmitting power transmission signals, which may include pocket-forming, adaptive pocket-forming, and multiple pocket-forming. In some implementations, transmitters 402 may transmit wireless power transmissions to receivers 420 in the form of RF waves, which may include any radio signal having any frequency or wavelength. A transmitter 402 may include one or more antenna elements 406, one or more RFICs 408, one or more microcontrollers 410, one or more communication components 412, a power source 414, and a housing that may allocate all the requested components for the transmitter 402. The various components of transmitters 402 may comprise, and/or may be manufactured using, meta-materials, micro-printing of circuits, nano-materials, and the like.

In the exemplary system 400, the transmitter 402 may transmit or otherwise broadcast controlled RF waves 442 that converge at a location in three-dimensional space, thereby forming a pocket of energy 444. These RF waves may be controlled through phase and/or relative amplitude adjustments to form constructive or destructive interference patterns (i.e., pocket-forming). Pockets of energy 444 may be fields formed at constructive interference patterns and may be three-dimensional in shape; whereas transmission null in a particular physical location may be generated at destructive interference patterns. Receivers 420 may harvest electrical energy from the pockets of energy 444 produced by pocket-forming for charging or powering an electronic client device 446 (e.g., a laptop computer, a cell phone). In some embodiments, the system 400 may comprise multiple transmitters 402 and/or multiple receivers 420, for powering various electronic equipment. Non-limiting examples of client devices 446 may include: smartphones, tablets, music players, toys and others at the same time. In some embodiments, adaptive pocket-forming may be used to regulate power on electronic devices.

2. Receivers

Receivers 420 may include a housing where at least one antenna element 424, one rectifier 426, one power converter 428, and a communications component 430 may be included.

Housing of the receiver 420 can be made of any material capable of facilitating signal or wave transmission and/or reception, for example plastic or hard rubber. Housing may be an external hardware that may be added to different electronic equipment, for example in the form of cases, or can be embedded within electronic equipment as well.

3. Antenna Elements

Antenna elements 424 of the receiver 420 may comprise any type of antenna capable of transmitting and/or receiving signals in frequency bands used by the transmitter 402A.

Antenna elements 424 may include vertical or horizontal polarization, right hand or left hand polarization, elliptical polarization, or other polarizations, as well as any number of polarization combinations. Using multiple polarizations can be beneficial in devices where there may not be a preferred orientation during usage or whose orientation may vary continuously through time, for example a smartphone or portable gaming system. For devices having a well-defined expected orientation (e.g., a two-handed video game controller), there might be a preferred polarization for antennas, which may dictate a ratio for the number of antennas of a given polarization. Types of antennas in antenna elements 424 of the receiver 420, may include patch antennas, which may have heights from about ⅛ inch to about 6 inches and widths from about ⅛ inch to about 6 inches. Patch antennas may preferably have polarization that depends upon connectivity, i.e., the polarization may vary depending on from which side the patch is fed. In some embodiments, the type of antenna may be any type of antenna, such as patch antennas, capable of dynamically varying the antenna polarization to optimize wireless power transmission.

4. Rectifier

Rectifiers 426 of the receiver 420 may include diodes, resistors, inductors, and/or capacitors to rectify alternating current (AC) voltage generated by antenna elements 424 to direct current (DC) voltage. Rectifiers 426 may be placed as close as is technically possible to antenna elements A24B to minimize losses in electrical energy gathered from power transmission signals. After rectifying AC voltage, the resulting DC voltage may be regulated using power converters 428. Power converters 428 can be a DC-to-DC converter that may help provide a constant voltage output, regardless of input, to an electronic device, or as in this exemplary system 400, to a battery. Typical voltage outputs can be from about 5 volts to about 10 volts. In some embodiments, power converter may include electronic switched mode DC-DC converters, which can provide high efficiency. In such embodiments, the receiver 420 may comprise a capacitor (not shown) that is situated to receive the electrical energy before power converters 428. The capacitor may ensure sufficient current is provided to an electronic switching device (e.g., switch mode DC-DC converter), so it may operate effectively. When charging an electronic device, for example a phone or laptop computer, initial high-currents that can exceed the minimum voltage needed to activate operation of an electronic switched mode DC-DC converter, may be required. In such a case, a capacitor (not shown) may be added at the output of receivers 420 to provide the extra energy required. Afterwards, lower power can be provided. For example, 1/80 of the total initial power that may be used while having the phone or laptop still build-up charge.

5. Communications Component

A communications component 430 of a receiver 420 may communicate with one or more other devices of the system 400, such as other receivers 420, client devices, and/or transmitters 402. Different antenna, rectifier or power converter arrangements are possible for a receiver as will be explained in following embodiments.

E. Methods of Pocket Forming for a Plurality of Devices

Figure 5:
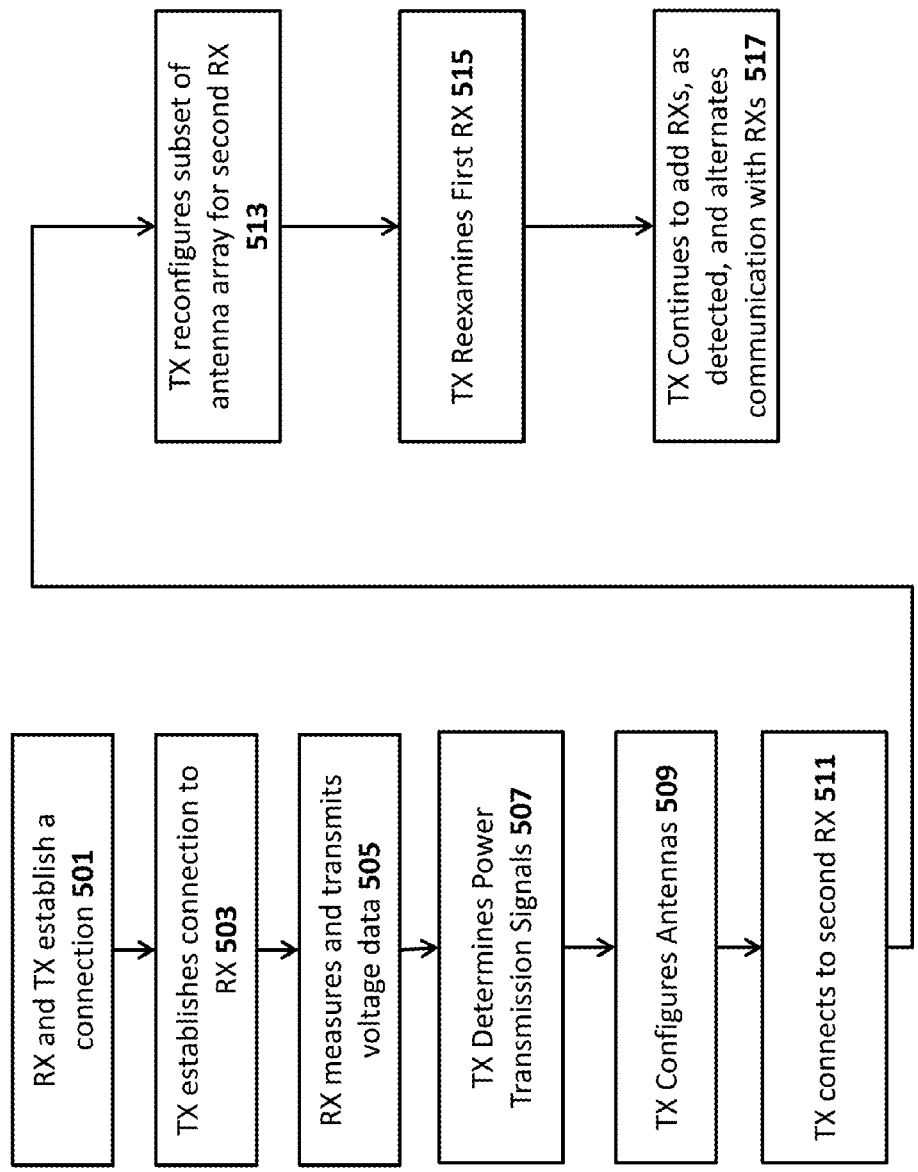
FIG. 5 illustrates steps of powering a plurality of receiver devices, according to an exemplary embodiment.

FIG. 5 shows steps of powering a plurality of receiver devices, according to an exemplary embodiment.

In a first step 501, a transmitter (TX) establishes a connection or otherwise associates with a receiver (RX). That is, in some embodiments, transmitters and receivers may communicate control data over using a wireless communication protocol capable of transmitting information between two processors of electrical devices (e.g., Bluetooth®, BLE, Wi-Fi, NFC, ZigBee®). For example, in embodiments implement Bluetooth® or Bluetooth® variants, the transmitter may scan for receiver's broadcasting advertisement signals or a receiver may transmit an advertisement signal to the transmitter. The advertisement signal may announce the receiver's presence to the transmitter, and may trigger an association between the transmitter and the receiver. As described later, in some embodiments, the advertisement signal may communicate information that may be used by various devices (e.g., transmitters, client devices, sever computers, other receivers) to execute and manage pocket-forming procedures. Information contained within the advertisement signal may include a device identifier (e.g., MAC address, IP address, UUID), the voltage of electrical energy received, client device power consumption, and other types of data related to power transmission waves. The transmitter may use the advertisement signal transmitted to identify the receiver and, in some cases, locate the receiver in a two-dimensional space or in a three-dimensional space. Once the transmitter identifies the receiver, the transmitter may establish the connection associated in the transmitter with the receiver, allowing the transmitter and receiver to communicate control signals over a second channel.

As an example, when a receiver comprising a Bluetooth® processor is powered-up or is brought within a detection range of the transmitter, the Bluetooth processor may begin advertising the receiver according to Bluetooth® standards. The transmitter may recognize the advertisement and begin establishing connection for communicating control signals and power transmission signals. In some embodiments, the advertisement signal may contain unique identifiers so that the transmitter may distinguish that advertisement and ultimately that receiver from all the other Bluetooth® devices nearby within range.

In a next step 503, when the transmitter detects the advertisement signal, the transmitter may automatically form a communication connection with that receiver, which may allow the transmitter and receiver to communicate control signals and power transmission signals. The transmitter may then command that receiver to begin transmitting real-time sample data or control data. The transmitter may also begin transmitting power transmission signals from antennas of the transmitter's antenna array.

In a next step 505, the receiver may then measure the voltage, among other metrics related to effectiveness of the power transmission signals, based on the electrical energy received by the receiver's antennas. The receiver may generate control data containing the measured information, and then transmit control signals containing the control data to the transmitter. For example, the receiver may sample the voltage measurements of received electrical energy, for example, at a rate of 100 times per second. The receiver may transmit the voltage sample measurement back to the transmitter, 100 times a second, in the form of control signals.

In a next step 507, the transmitter may execute one or more software modules monitoring the metrics, such as voltage measurements, received from the receiver. Algorithms may vary production and transmission of power transmission signals by the transmitter's antennas, to maximize the effectiveness of the pockets of energy around the receiver. For example, the transmitter may adjust the phase at which the transmitter's antenna transmit the power transmission signals, until that power received by the receiver indicates an effectively established pocket energy around the receiver. When an optimal configuration for the antennas is identified, memory of the transmitter may store the configurations to keep the transmitter broadcasting at that highest level.

In a next step 509, algorithms of the transmitter may determine when it is necessary to adjust the power transmission signals and may also vary the configuration of the transmit antennas, in response to determining such adjustments are necessary. For example, the transmitter may determine the power received at a receiver is less than maximal, based on the data received from the receiver. The transmitter may then automatically adjust the phase of the power transmission signals, but may also simultaneously continues to receive and monitor the voltage being reported back from receiver.

In a next step 511, after a determined period of time for communicating with a particular receiver, the transmitter may scan and/or automatically detect advertisements from other receivers that may be in range of the transmitter. The transmitters may establish a connection to the second receiver responsive to Bluetooth® advertisements from a second receiver.

In a next step 513, after establishing a second communication connection with the second receiver, the transmitter may proceed to adjust one or more antennas in the transmitter's antenna array. In some embodiments, the transmitter may identify a subset of antennas to service the second receiver, thereby parsing the array into subsets of arrays that are associated with a receiver. In some embodiments, the entire antenna array may service a first receiver for a given period of time, and then the entire array may service the second receiver for that period of time.

Manual or automated processes performed by the transmitter may select a subset of arrays to service the second receiver. In this example, the transmitter's array may be split in half, forming two subsets. As a result, half of the antennas may be configured to transmit power transmission signals to the first receiver, and half of the antennas may be configured for the second receiver. In the current step 513, the transmitter may apply similar techniques discussed above to configure or optimize the subset of antennas for the second receiver. While selecting a subset of an array for transmitting power transmission signals, the transmitter and second receiver may be communicating control data. As a result, by the time that the transmitter alternates back to communicating with the first receiver and/or scan for new receivers, the transmitter has already received a sufficient amount of sample data to adjust the phases of the waves transmitted by second subset of the transmitter's antenna array, to transmit power transmission waves to the second receiver effectively.

In a next step 515, after adjusting the second subset to transmit power transmission signals to the second receiver, the transmitter may alternate back to communicating control data with the first receiver, or scanning for additional receivers. The transmitter may reconfigure the antennas of the first subset, and then alternate between the first and second receivers at a predetermined interval.

In a next step 517, the transmitter may continue to alternate between receivers and scanning for new receivers, at a predetermined interval. As each new receiver is detected, the transmitter may establish a connection and begin transmitting power transmission signals, accordingly.

In one exemplary embodiment, the receiver may be electrically connected to a device like a smart phone. The transmitter's processor would scan for any Bluetooth devices. The receiver may begin advertising that it's a Bluetooth device through the Bluetooth chip. Inside the advertisement, there may be unique identifiers so that the transmitter, when it scanned that advertisement, could distinguish that advertisement and ultimately that receiver from all the other Bluetooth devices nearby within range. When the transmitter detects that advertisement and notices it is a receiver, then the transmitter may immediately form a communication connection with that receiver and command that receiver to begin sending real time sample data.

The receiver would then measure the voltage at its receiving antennas, send that voltage sample measurement back to the transmitter (e.g., 100 times a second). The transmitter may start to vary the configuration of the transmit antennas by adjusting the phase. As the transmitter adjusts the phase, the transmitter monitors the voltage being sent back from the receiver. In some implementations, the higher the voltage, the more energy may be in the pocket. The antenna phases may be altered until the voltage is at the highest level and there is a maximum pocket of energy around the receiver. The transmitter may keep the antennas at the particular phase so the voltage is at the highest level.

The transmitter may vary each individual antenna, one at a time. For example, if there are 32 antennas in the transmitter, and each antenna has 8 phases, the transmitter may begin with the first antenna and would step the first antenna through all 8 phases. The receiver may then send back the power level for each of the 8 phases of the first antenna. The transmitter may then store the highest phase for the first antenna. The transmitter may repeat this process for the second antenna, and step it through 8 phases. The receiver may again send back the power levels from each phase, and the transmitter may store the highest level. Next the transmitter may repeat the process for the third antenna and continue to repeat the process until all 32 antennas have stepped through the 8 phases. At the end of the process, the transmitter may transmit the maximum voltage in the most efficient manner to the receiver.

In another exemplary embodiment, the transmitter may detect a second receiver's advertisement and form a communication connection with the second receiver. When the transmitter forms the communication with the second receiver, the transmitter may aim the original 32 antennas towards the second receiver and repeat the phase process for each of the 32 antennas aimed at the second receiver. Once the process is completed, the second receiver may getting as much power as possible from the transmitter. The transmitter may communicate with the second receiver for a second, and then alternate back to the first receiver for a predetermined period of time (e.g., a second), and the transmitter may continue to alternate back and forth between the first receiver and the second receiver at the predetermined time intervals.

In yet another implementation, the transmitter may detect a second receiver's advertisement and form a communication connection with the second receiver. First, the transmitter may communicate with the first receiver and re-assign half of the exemplary 32 the antennas aimed at the first receiver, dedicating only 16 towards the first receiver. The transmitter may then assign the second half of the antennas to the second receiver, dedicating 16 antennas to the second receiver. The transmitter may adjust the phases for the second half of the antennas. Once the 16 antennas have gone through each of the 8 phases, the second receiver may be obtaining the maximum voltage in the most efficient manner to the receiver.

F. Wireless Power Transmission with Selective Range

1. Constructive Interference

FIG. 6A and FIG. 6B show an exemplary system 600 implementing wireless power transmission principles that may be implemented during exemplary pocket-forming processes. A transmitter 601 comprising a plurality of antennas in an antenna array, may adjust the phase and amplitude, among other possible attributes, of power transmission waves 607, being transmitted from antennas of the transmitter 601. As shown in FIG. 6A, in the absence of any phase or amplitude adjustment, power transmission waves 607a may be transmitted from each of the antennas will arrive at different locations and have different phases. These differences are often due to the different distances from each antenna element of the transmitter 601a to a receiver 605a or receivers 605a, located at the respective locations.

Continuing with FIG. 6A, a receiver 605a may receive multiple power transmission signals, each comprising power transmission waves 607a, from multiple antenna elements of a transmitter 601a; the composite of these power transmission signals may be essentially zero, because in this example, the power transmission waves add together destructively. That is, antenna elements of the transmitter 601a may transmit the exact same power transmission signal (i.e., comprising power transmission waves 607a having the same features, such as phase and amplitude), and as such, when the power transmission waves 607a of the respective power transmission signals arrive at the receiver 605a, they are offset from each other by 180 degrees. Consequently, the power transmission waves 607a of these power transmission signals "cancel" one another. Generally, signals offsetting one another in this way may be referred to as "destructive," and thus result in "destructive interference."

In contrast, as shown in FIG. 6B, for so-called "constructive interference," signals comprising power transmission waves 607b that arrive at the receiver exactly "in phase" with one another, combine to increase the amplitude of the each signal, resulting in a composite that is stronger than each of the constituent signals. In the illustrative example in FIG. 6A, note that the phase of the power transmission waves 607a in the transmit signals are the same at the location of transmission, and then eventually add up destructively at the location of the receiver 605a. In contrast, in FIG. 6B, the phase of the power transmission waves 607b of the transmit signals are adjusted at the location of transmission, such that they arrive at the receiver 605b in phase alignment, and consequently they add constructively. In this illustrative example, there will be a resulting pocket of energy located around the receiver 605b in FIG. 6B; and there will be a transmission null located around receiver in FIG. 6A.

Figure 7:
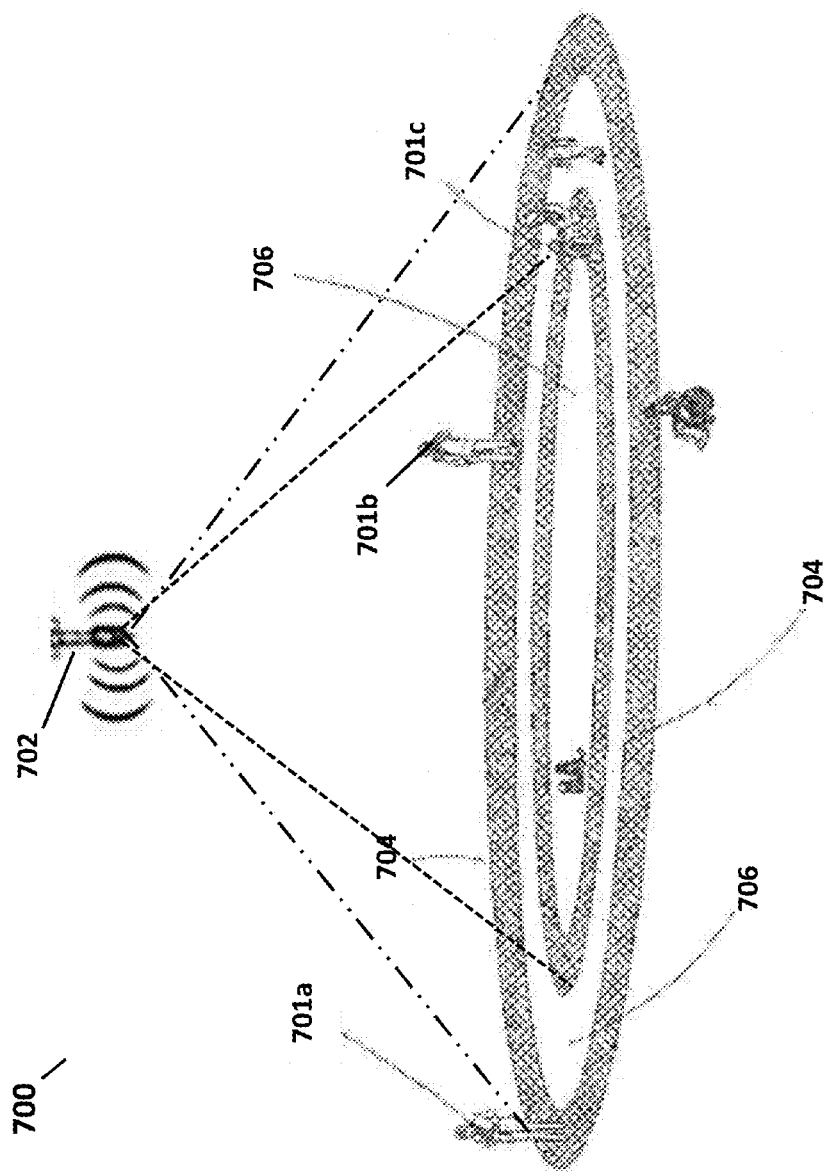
FIG. 7 illustrates wireless power transmission with selective range, where a plurality of pockets of energy may be generated along various radii from transmitter.

FIG. 7 depicts wireless power transmission with selective range 700, where a transmitter 702 may produce pocket-forming for a plurality of receivers associated with electrical devices 701. Transmitter 702 may generate pocket-forming through wireless power transmission with selective range 700, which may include one or more wireless charging radii 704 and one or more radii of a transmission null at a particular physical location 706. A plurality of electronic devices 701 may be charged or powered in wireless charging radii 704. Thus, several spots of energy may be created, such spots may be employed for enabling restrictions for powering and charging electronic devices 701. As an example, the restrictions may include operating specific electronics in a specific or limited spot, contained within wireless charging radii 704. Furthermore, safety restrictions may be implemented by the use of wireless power transmission with selective range 700, such safety restrictions may avoid pockets of energy over areas or zones where energy needs to be avoided, such areas may include areas including sensitive equipment to pockets of energy and/or people which do not want pockets of energy over and/or near them. In embodiments such as the one shown in FIG. 7, the transmitter 702 may comprise antenna elements found on a different plane than the receivers associated with electrical devices 701 in the served area. For example the receivers of electrical devices 701 may be in a room where a transmitter 702 may be mounted on the ceiling. Selective ranges for establishing pockets of energy using power transmission waves, which may be represented as concentric circles by placing an antenna array of the transmitter 702 on the ceiling or other elevated location, and the transmitter 702 may emit power transmission waves that will generate 'cones' of energy pockets. In some embodiments, the transmitter 701 may control the radius of each charging radii 704, thereby establishing intervals for service area to create pockets of energy that are pointed down to an area at a lower plane, which may adjust the width of the cone through appropriate selection of antenna phase and amplitudes.

Figure 8:
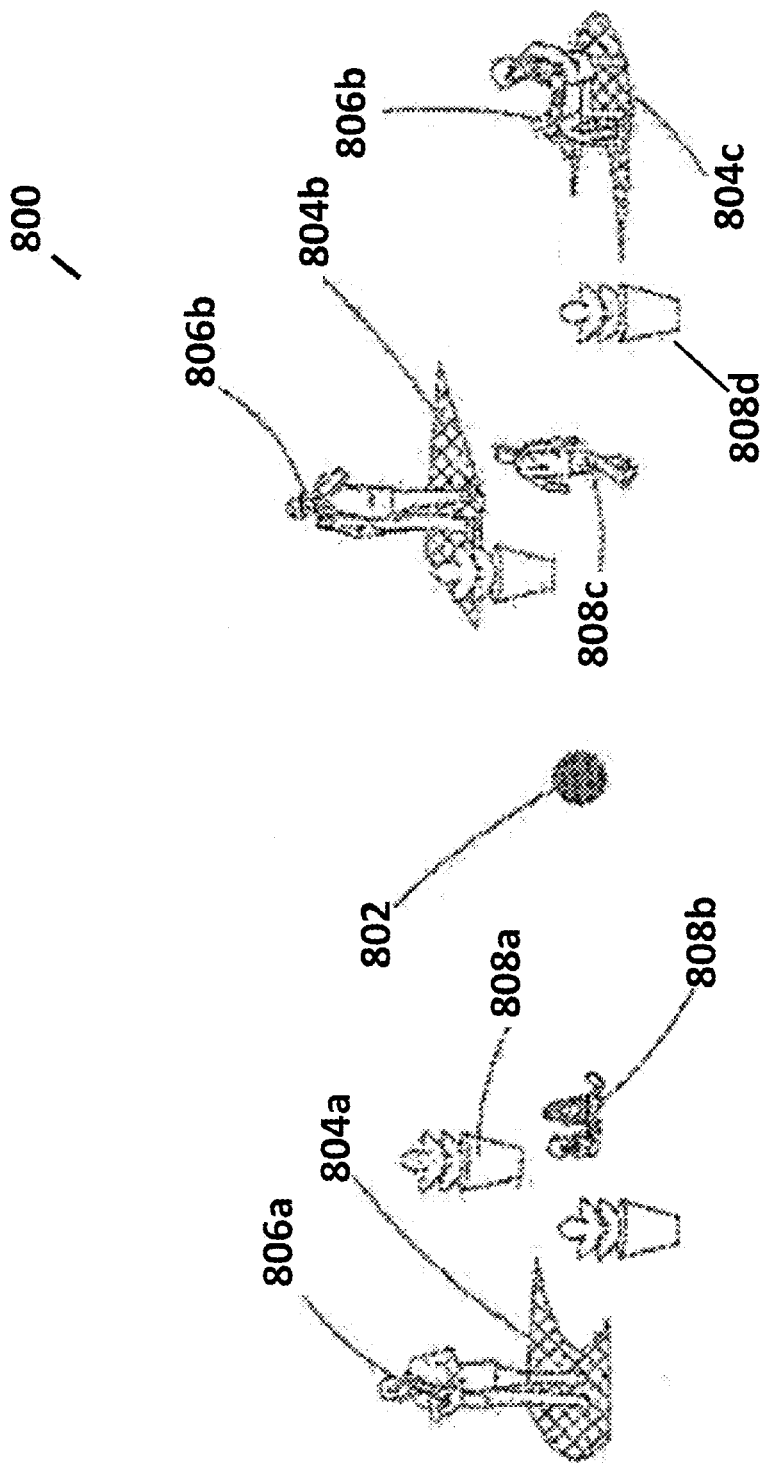
FIG. 8 illustrates wireless power transmission with selective range, where a plurality of pockets of energy may be generated along various radii from transmitter.

FIG. 8 depicts wireless power transmission with selective range 800, where a transmitter 802 may produce pocket-forming for a plurality of receivers 806. Transmitter 802 may generate pocket-forming through wireless power transmission with selective range 800, which may include one or more wireless charging spots 804. A plurality of electronic devices may be charged or powered in wireless charging spots 804. Pockets of energy may be generated over a plurality of receivers 806 regardless the obstacles 804 surrounding them. Pockets of energy may be generated by creating constructive interference, according to the principles described herein, in wireless charging spots 804. Location of pockets of energy may be performed by tacking receivers 806 and by enabling a plurality of communication protocols by a variety of communication systems such as, Bluetooth® technology, infrared communication, Wi-Fi, FM radio, among others.

G. Exemplary System Embodiment Using Heat Maps

FIGS. 9A and 9B illustrate a diagram of architecture 900A, 900B for a wirelessly charging client computing platform, according to an exemplary embodiment. In some implementations, a user may be inside a room and may hold on his hands an electronic device (e.g. a smartphone, tablet). In some implementations, electronic device may be on furniture inside the room. The electronic device may include a receiver 920A, 920B either embedded to the electronic device or as a separate adapter connected to electronic device. Receivers 920A, 920B may include all the components described in FIG. 11. A transmitter 902A, 902B may be hanging on one of the walls of the room right behind user. Transmitters 902A, 902B may also include all the components described in FIG. 11.

As user may seem to be obstructing the path between receivers 920A, 920B and transmitters 902A, 902B, RF waves may not be easily aimed to the receivers 920A, 920B in a linear direction. However, since the short signals generated from receivers 920A, 920B may be omni-directional for the type of antenna element used, these signals may bounce over the walls 944A, 944B until they reach transmitters 902A, 902B. A hot spot 944A, 944B may be any item in the room which will reflect the RF waves. For example, a large metal clock on the wall may be used to reflect the RF waves to a user's cell phone.

A micro controller in the transmitter adjusts the transmitted signal from each antenna based on the signal received from the receiver. Adjustment may include forming conjugates of the signal phases received from the receivers and further adjustment of transmit antenna phases taking into account the built-in phase of antenna elements. The antenna element may be controlled simultaneously to steer energy in a given direction. The transmitter 902A, 902B may scan the room, and look for hot spots 944A, 944B. Once calibration is performed, transmitters 902A, 902B may focus RF waves in a channel following a path that may be the most efficient paths. Subsequently, RF signals 942A, 942B may form a pocket of energy on a first electronic device and another pocket of energy in a second electronic device while avoiding obstacles such as user and furniture.

When scanning the service area, the room in FIGS. 9A and 9B, the transmitter 902A, 902B may employ different methods. As an illustrative example, but without limiting the possible methods that can be used, the transmitter 902A, 902B may detect the phases and magnitudes of the signal coming from the receiver and use those to form the set of transmit phases and magnitudes, for example by calculating conjugates of them and applying them at transmit. As another illustrative example, the transmitter may apply all possible phases of transmit antennas in subsequent transmissions, one at a time, and detect the strength of the pocket of energy formed by each combination by observing information related to the signal from the receiver 920A, 920B. Then the transmitter 902A, 902B repeats this calibration periodically. In some implementations, the transmitter 902A, 902B does not have to search through all possible phases, and can search through a set of phases that are more likely to result in strong pockets of energy based on prior calibration values. In yet another illustrative example, the transmitter 902A, 902B may use preset values of transmit phases for the antennas to form pockets of energy directed to different locations in the room. The transmitter may for example scan the physical space in the room from top to bottom and left to right by using preset phase values for antennas in subsequent transmissions. The transmitter 902A, 902B then detects the phase values that result in the strongest pocket of energy around the receiver 920a, 920b by observing the signal from the receiver 920a, 920b. It should be appreciated that there are other possible methods for scanning a service area for heat mapping that may be employed, without deviating from the scope or spirit of the embodiments described herein. The result of a scan, whichever method is used, is a heat-map of the service area (e.g., room, store) from which the transmitter 902A, 902B may identify the hot spots that indicate the best phase and magnitude values to use for transmit antennas in order to maximize the pocket of energy around the receiver.

The transmitters 902A, 902B, may use the Bluetooth connection to determine the location of the receivers 920A, 920B, and may use different non-overlapping parts of the RF band to channel the RF waves to different receivers 920A, 920B. In some implementations, the transmitters 902A, 902B, may conduct a scan of the room to determine the location of the receivers 920A, 920B and forms pockets of energy that are orthogonal to each other, by virtue of non-overlapping RF transmission bands. Using multiple pockets of energy to direct energy to receivers may inherently be safer than some alternative power transmission methods since no single transmission is very strong, while the aggregate power transmission signal received at the receiver is strong.

H. Exemplary System Embodiment

Figure 10A:
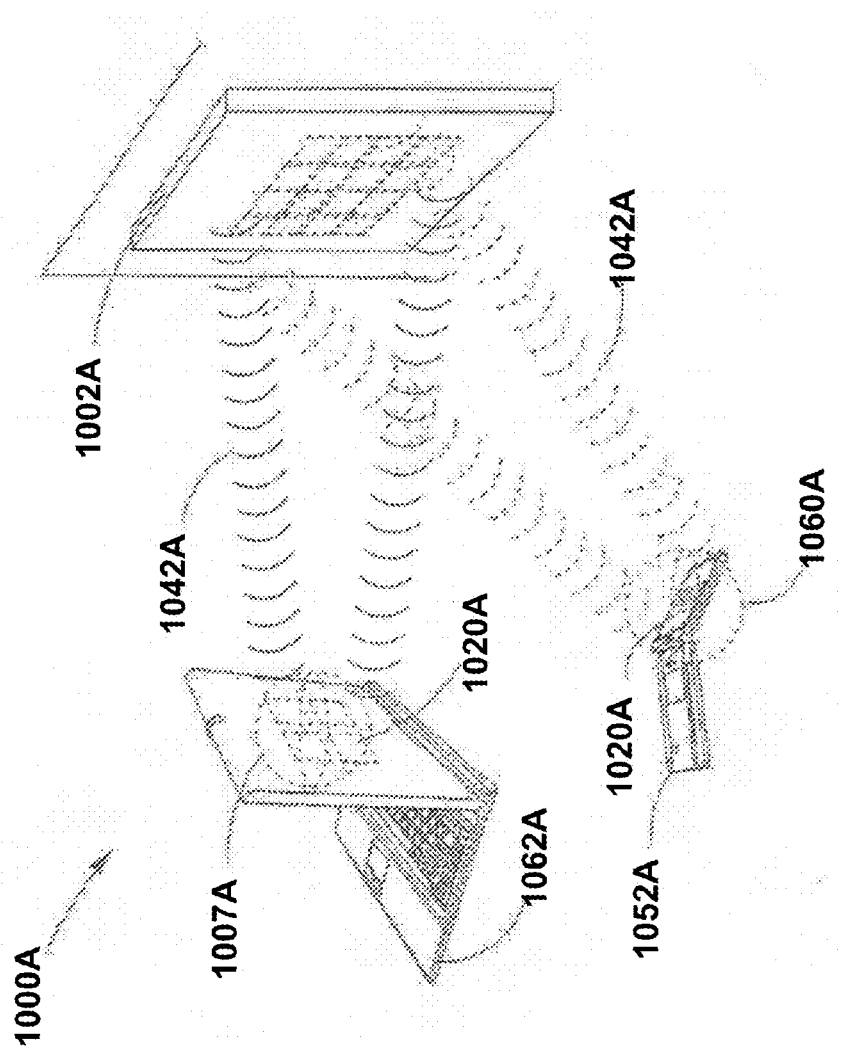
FIG. 10A illustrates wireless power transmission using multiple pocket-forming, according to an exemplary embodiment.

FIG. 10A illustrates wireless power transmission using multiple pocket-forming 1000A that may include one transmitter 1002A and at least two or more receivers 1020A. Receivers 1020A may communicate with transmitters 1002A, which is further described in FIG. 11. Once transmitter 1002A identifies and locates receivers 1020A, a channel or path can be established by knowing the gain and phases coming from receivers 1020A. Transmitter 1002A may start to transmit controlled RF waves 1042A which may converge in three-dimensional space by using a minimum of two antenna elements. These RF waves 1042A may be produced using an external power source and a local oscillator chip using a suitable piezoelectric material. RF waves 1042A may be controlled by RFIC, which may include a proprietary chip for adjusting phase and/or relative magnitudes of RF signals that may serve as inputs for antenna elements to form constructive and destructive interference patterns (pocket-forming). Pocket-forming may take advantage of interference to change the directionality of the antenna elements where constructive interference generates a pocket of energy 1060A and deconstructive interference generates a transmission null. Receivers 1020A may then utilize pocket of energy 1060A produced by pocket-forming for charging or powering an electronic device, for example, a laptop computer 1062A and a smartphone 1052A and thus effectively providing wireless power transmission.

Multiple pocket forming 1000A may be achieved by computing the phase and gain from each antenna of transmitter 1002A to each receiver 1020A. The computation may be calculated independently because multiple paths may be generated by antenna element from transmitter 1002A to antenna element from receivers 1020A.

I. Exemplary System Embodiment

Figure 10B:
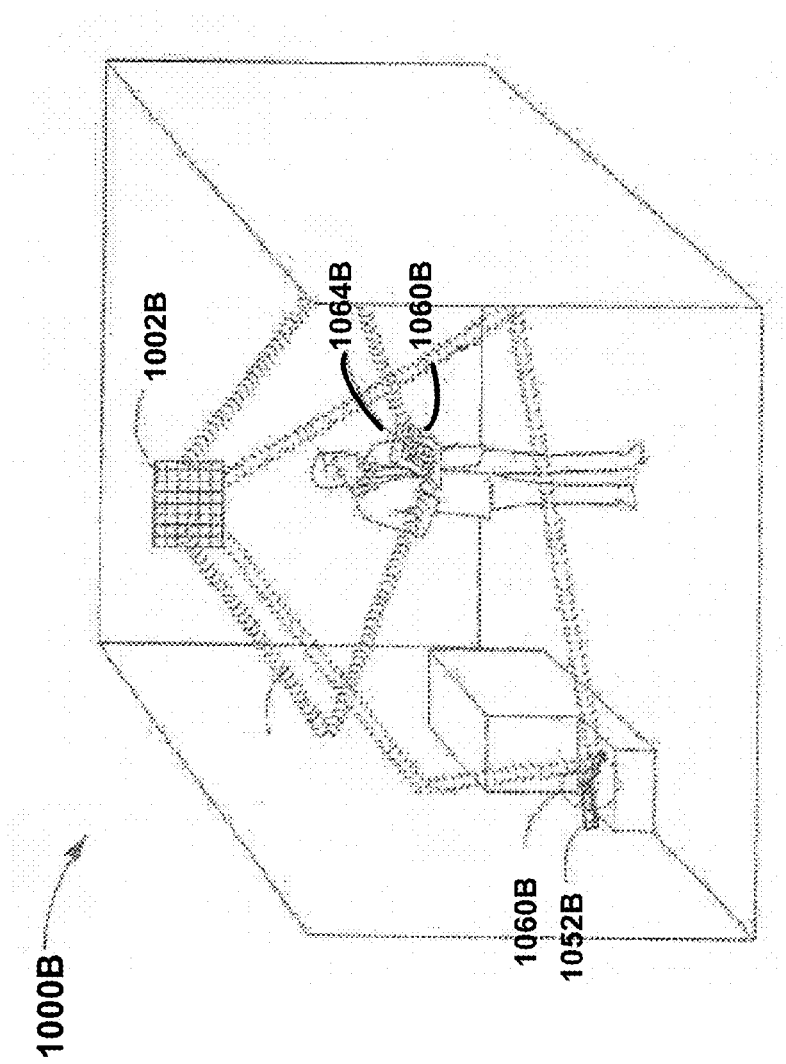
FIG. 10B illustrates multiple adaptive pocket-forming, according to an exemplary embodiment.

FIG. 10B is an exemplary illustration of multiple adaptive pocket-forming 1000B. In this embodiment, a user may be inside a room and may hold on his hands an electronic device, which in this case may be a tablet 1064B. In addition, smartphone 1052B may be on furniture inside the room. Tablet 1064B and smartphone 1052B may each include a receiver either embedded to each electronic device or as a separate adapter connected to tablet 1064B and smartphone 1052B. Receiver may include all the components described in FIG. 11. A transmitter 1002B may be hanging on one of the walls of the room right behind user. Transmitter 1002B may also include all the components described in FIG. 11. As user may seem to be obstructing the path between receiver and transmitter 1002B, RF waves 1042B may not be easily aimed to each receiver in a line of sight fashion. However, since the short signals generated from receivers may be omni-directional for the type of antenna elements used, these signals may bounce over the walls until they find transmitter 1002B. Almost instantly, a microcontroller which may reside in transmitter 1002B, may recalibrate the transmitted signals, based on the received signals sent by each receiver, by adjusting gain and phases and forming a convergence of the power transmission waves such that they add together and strengthen the energy concentrated at that location—in contrast to adding together in a way to subtract from each other and diminish the energy concentrated at that location, which is called "destructive interference" and conjugates of the signal phases received from the receivers and further adjustment of transmit antenna phases taking into account the built-in phase of antenna elements. Once calibration is performed, transmitter 1002B may focus RF waves following the most efficient paths. Subsequently, a pocket of energy 1060B may form on tablet 1064B and another pocket of energy 1060B in smartphone 1052B while taking into account obstacles such as user and furniture. The foregoing property may be beneficial in that wireless power transmission using multiple pocket-forming 1000B may inherently be safe as transmission along each pocket of energy is not very strong, and that RF transmissions generally reflect from living tissue and do not penetrate.

Once transmitter 1002B identities and locates receiver, a channel or path can be established by knowing the gain and phases coming from receiver. Transmitter 1002B may start to transmit controlled RF waves 1042B that may converge in three-dimensional space by using a minimum of two antenna elements. These RF waves 1042B may be produced using an external power source and a local oscillator chip using a suitable piezoelectric material. RF waves 1042B may be controlled by RFIC that may include a proprietary chip for adjusting phase and/or relative magnitudes of RF signals, which may serve as inputs for antenna elements to form constructive and destructive interference patterns (pocket-forming). Pocket-forming may take advantage of interference to change the directionality of the antenna elements where constructive interference generates a pocket of energy and deconstructive interference generates a null in a particular physical location. Receiver may then utilize pocket of energy produced by pocket-forming for charging or powering an electronic device, for example a laptop computer and a smartphone and thus effectively providing wireless power transmission.

Multiple pocket-forming 1000B may be achieved by computing the phase and gain from each antenna of transmitter to each receiver. The computation may be calculated independently because multiple paths may be generated by antenna elements from transmitter to antenna elements from receiver.

An example of the computation for at least two antenna elements may include determining the phase of the signal from the receiver and applying the conjugate of the receive parameters to the antenna elements for transmission.

In some embodiments, two or more receivers may operate at different frequencies to avoid power losses during wireless power transmission. This may be achieved by including an array of multiple embedded antenna elements in transmitter 1002B. In one embodiment, a single frequency may be transmitted by each antenna in the array. In other embodiments some of the antennas in the array may be used to transmit at a different frequency. For example, ½ of the antennas in the array may operate at 2.4 GHz while the other ½ may operate at 5.8 GHz. In another example, ⅓ of the antennas in the array may operate at 900 MHz, another ⅓ may operate at 2.4 GHz, and the remaining antennas in the array may operate at 5.8 GHz.

In another embodiment, each array of antenna elements may be virtually divided into one or more antenna elements during wireless power transmission, where each set of antenna elements in the array can transmit at a different frequency. For example, an antenna element of the transmitter may transmit power transmission signals at 2.4 GHz, but a corresponding antenna element of a receiver may be configured to receive power transmission signals at 5.8 GHz. In this example, a processor of the transmitter may adjust the antenna element of the transmitter to virtually or logically divide the antenna elements in the array into a plurality patches that may be fed independently. As a result, ¼ of the array of antenna elements may be able to transmit the 5.8 GHz needed for the receiver, while another set of antenna elements may transmit at 2.4 GHz. Therefore, by virtually dividing an array of antenna elements, electronic devices coupled to receivers can continue to receive wireless power transmission. The foregoing may be beneficial because, for example, one set of antenna elements may transmit at about 2.4 GHz and other antenna elements may transmit at 5.8 GHz, and thus, adjusting a number of antenna elements in a given array when working with receivers operating at different frequencies. In this example, the array is divided into equal sets of antenna elements (e.g., four antenna elements), but the array may be divided into sets of different amounts of antenna elements. In an alternative embodiment, each antenna element may alternate between select frequencies.

The efficiency of wireless power transmission as well as the amount of power that can be delivered (using pocket-forming) may be a function of the total number of antenna elements 1006 used in a given receivers and transmitters system. For example, for delivering about one watt at about 15 feet, a receiver may include about 80 antenna elements while a transmitter may include about 256 antenna elements. Another identical wireless power transmission system (about 1 watt at about 15 feet) may include a receiver with about 40 antenna elements, and a transmitter with about 512 antenna elements. Reducing in half the number of antenna elements in a receiver may require doubling the number of antenna elements in a transmitter. In some embodiments, it may be beneficial to put a greater number of antenna elements in transmitters than in a receivers because of cost, because there will be much fewer transmitters than receivers in a system-wide deployment. However, the opposite can be achieved, e.g., by placing more antenna elements on a receiver than on a transmitter as long as there are at least two antenna elements in a transmitter 1002B.

II. Transmitters—Systems and Methods for Wireless Power Transmissions

Transmitters may be responsible for the pocket-forming, adaptive pocket-forming and multiple pocket-forming using the components described below. Transmitters may transmit wireless power transmission signals to receivers in the form of any physical media capable of propagating through space and being converted into useable electrical energy; examples may include RF waves, infrared, acoustics, electromagnetic fields, and ultrasound. It should be appreciated by those skilled in the art that power transmission signals may be most any radio signal, having any frequency or wavelength. Transmitters are described within with reference to RF transmissions, only as an example, and not to limit the scope to RF transmission only.

Transmitters may be located in number of locations, surfaces, mountings, or embedded structures, such as, desks, tables, floors, walls, and the like. In some cases, transmitters may be located in a client computing platforms, which may be any computing device comprising processors and software modules capable of executing the processes and tasks described herein. Non-limiting examples of client computing platforms may include a desktop computer, a laptop computer, a handheld computer, a tablet computing platform, a netbook, a smartphone, a gaming console, and/or other computing platforms. In other embodiments, the client computing platforms may be a variety of electronic computing devices. In such embodiments, each of the client computing platforms may have distinct operating systems, and/or physical components. The client computing platforms may be executing the same operating system and/or the client computing platforms may be executing different operating systems. The client computing platforms and or devices may be capable of executing multiple operating systems. In addition, box transmitters may contain several arrangements of printed circuit board (PCB) layers, which may be oriented in X, Y, or Z axis, or in any combination of these.

It should be appreciated that wireless charging techniques are not limited to RF wave transmission techniques, but may include alternative or additional techniques for transmitting energy to a receiver converting the transmitted energy to electrical power. Non-limiting exemplary transmission techniques for energy that can be converted by a receiving device into electrical power may include: ultrasound, microwave, resonant and inductive magnetic fields, laser light, infrared, or other forms of electromagnetic energy. In the case of ultrasound, for example, one or more transducer elements may be disposed so as to form a transducer array that transmits ultrasound waves toward a receiving device that receives the ultrasound waves and converts them to electrical power. In the case of resonant or inductive magnetic fields, magnetic fields are created in a transmitter coil and converted by a receiver coil into electrical power.

A. Components of Transmitter Devices

Figure 11:
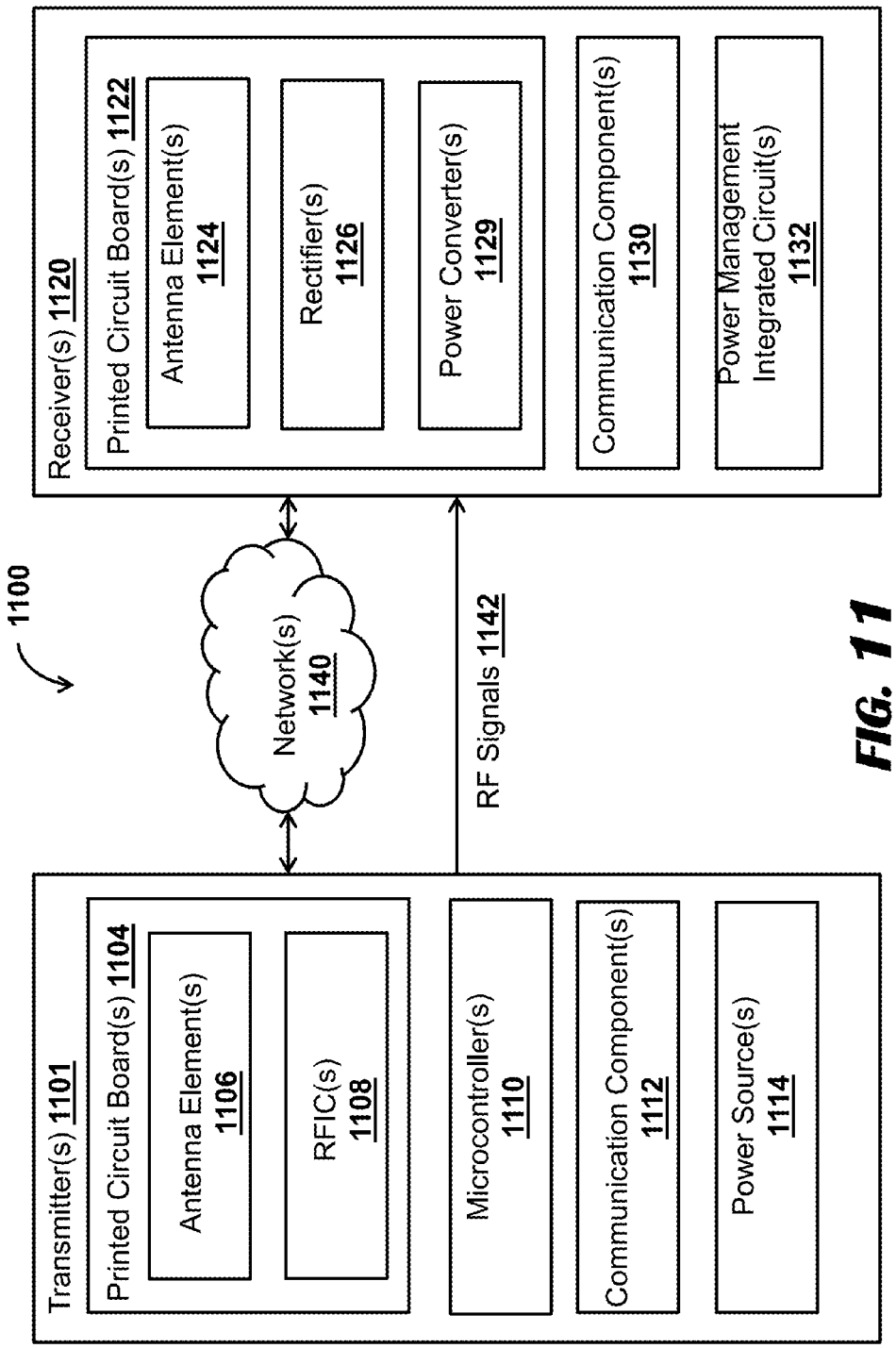
FIG. 11 illustrates a diagram of a system architecture for wirelessly charging client devices, according to an exemplary embodiment.

FIG. 11 illustrates a diagram of a system 1100 architecture for wirelessly charging client devices, according to an exemplary embodiment. The system 1100 may comprise a transmitter 1101 and a receiver 1120 that may each comprise an application-specific integrated circuit (ASIC). The transmitter 1101 ASIC may include one or more printed circuit boards (PCB) 1104, one or more antenna elements 1106, one or more radio frequency integrated circuits (RFIC) 1108, one or more microcontrollers (MCs) 1110, a communication component 1112, a power source 1114. The transmitter 1101 may be encased in a housing, which may allocate all the requested components for transmitter 1101. Components in transmitter 1101 may be manufactured using meta-materials, micro-printing of circuits, nano-materials, and/or any other materials. It should be obvious to someone skilled in the art that the entire transmitter or the entire receiver can be implemented on a single circuit board, as well as having one or more of the functional blocks implemented in separate circuit boards.

1. Printed Circuit Boards

In some implementations, the transmitter 1101 may include a plurality of PCB 1104 layers, which may include antenna element 1106 and/or RFIC 1108 for providing greater control over pocket-forming and may increase response for targeting receivers. The PCB 1104 may mechanically support and electrically connect the electronic component described herein using conductive tracks, pads and/or other features etched from copper sheets laminated onto a non-conductive substrate. PCBs may be single sided (one copper layer), double sided (two copper layers), and/or multi-layer. Multiple PCB 1104 layers may increase the range and the amount of power that could be transferred by transmitter 1101. PCB 1104 layers may be connected to a single MC 1110 and/or to dedicated MCs 1110. Similarly, RFIC 1108 may be connected to antenna element 1106 as depicted in the foregoing embodiments.

In some implementations, a box transmitter, including a plurality of PCB 1104 layers inside it may include antenna element 1108 for providing greater control over pocket-forming and may increase the response for targeting receivers. Furthermore, range of wireless power transmission may be increased by the box transmitter. Multiple PCB 1104 layers may increase the range and the amount of power waves (e.g., RF power waves, ultrasound waves) that could be transferred and/or broadcasted wirelessly by transmitter 1101 due the higher density of antenna element 1106. The PCB 1104 layers may be connected to a single microcontroller 1110 and/or to dedicated microcontroller 1110 for each antenna element 1106. Similarly, RFIC 1108 may control antenna element 1101 as depicted in the foregoing embodiments. Furthermore, box shape of transmitter 1101 may increase action ratio of wireless power transmission.

2. Antenna Elements

Antenna element 1106 may be directional and/or omnidirectional and include flat antenna elements, patch antenna elements, dipole antenna elements, and any other suitable antenna for wireless power transmission. Suitable antenna types may include, for example, patch antennas with heights from about ⅛ inch to about 6 inches and widths from about ⅛ inch to about 6 inches. The shape and orientation of antenna element 1106 may vary in dependency of the desired features of transmitter 1101; orientation may be flat in X, Y, and Z axis, as well as various orientation types and combinations in three dimensional arrangements. Antenna element 1106 materials may include any suitable material that may allow RF signal transmission with high efficiency, good heat dissipation and the like. The amount of antenna elements 1106 may vary in relation with the desired range and power transmission capability on transmitter 1101; the more antenna elements 1106, the wider range and higher power transmission capability.

Antenna element 1106 may include suitable antenna types for operating in frequency bands such as 900 MHz, 2.5 GHz or 5.8 GHz as these frequency bands conform to Federal Communications Commission (FCC) regulations part 18 (industrial, scientific, and medical equipment). Antenna element 1106 may operate in independent frequencies, allowing a multichannel operation of pocket-forming.

In addition, antenna element 1106 may have at least one polarization or a selection of polarizations. Such polarization may include vertical polarization, horizontal polarization, circularly polarized, left hand polarized, right hand polarized, or a combination of polarizations. The selection of polarizations may vary in dependency of transmitter 1101 characteristics. In addition, antenna element 1106 may be located in various surfaces of transmitter 1101. Antenna element 1106 may operate in single array, pair array, quad array and any other suitable arrangement that may be designed in accordance with the desired application.

In some implementations, the entire side of the printed circuit board PCB 1104 may be closely packed with antenna element 1106. The RFIC 1108 may connect to multiple antenna elements 1106. Multiple antenna elements 1106 may surround a single RFIC 1108.

3. Radio Frequency Integrated Circuits

The RFIC 1108 may receive an RF signal from the MC 1110, and split the RF signal into multiple outputs, each output linked to an antenna element 1106. For example, each RFIC 1108 may be connected to four antenna elements 1106. In some implementations, each RFIC 1108 may be connected to eight, sixteen, and/or multiple antenna elements 1106.

The RFIC 1104 may include a plurality of RF circuits that may include digital and/or analog components, such as, amplifiers, capacitors, oscillators, piezoelectric crystals and the like. RFIC 1104 may control features of antenna element 1106, such as gain and/or phase for pocket-forming and manage it through direction, power level, and the like. The phase and the amplitude of pocket-forming in each antenna element 1106 may be regulated by the corresponding RFIC 1108 in order to generate the desired pocket-forming and transmission null steering. In addition, RFIC 1108 may be connected to MC 1110, which may utilize digital signal processing (DSP), ARM, PIC-Class microprocessor, central processing unit, computer, and the like. The lower number of RFICs 1108 present in the transmitter 1101 may correspond to desired features such as lower control of multiple pocket-forming, lower levels of granularity, and a less expensive embodiment. In some implementations, RFIC 1108 may be coupled to one or more MCs 1110, and MC 1110 may be included into an independent base station or into the transmitter 1101.

In some implementations of transmitter 1101, the phase and the amplitude of each pocket-forming in each antenna element 1106 may be regulated by the corresponding RFIC 1108 in order to generate the desired pocket-forming and transmission null steering. RFIC 1108 singled coupled to each antenna element 1106 may reduce processing requirement and may increase control over pocket-forming, allowing multiple pocket-forming and a higher granular pocket-forming with less load over MC 1110, and a higher response of higher number of multiple pocket-forming may be allowed. Furthermore, multiple pocket-forming may charge a higher number of receivers and may allow a better trajectory to such receivers.

RFIC 1108 and antenna element 1106 may operate in any suitable arrangement that may be designed in accordance with the desired application. For example, transmitter 1101 may include antenna element 1106 and RFIC 1108 in a flat arrangement. A subset of 4, 8, 16, and/or any number of antenna elements 1106 may be connected to a single RFIC 1108. RFIC 1108 may be directly embedded behind each antenna element 1106; such integration may reduce losses due the shorter distance between components. In some implementations, a row or column of antenna elements 1106 may be connected to a single MC 1110. RFIC 1108 connected to each row or column may allow a less expensive transmitter 1101 that may produce pocket-forming by changing phase and gain between rows or columns. In some implementations, the RFIC 1108 may output between 2-8 volts of power for the receiver 1120 to obtain.

In some implementations, a cascade arrangement of RFICs 1108 may be implemented. A flat transmitter 1101 using a cascade arrangement of RFICs 1108 may provide greater control over pocket-forming and may increase response for targeting receivers 1106, as well as a higher reliability and accuracy may be achieved because multiple redundancy of RFICs 1108.

4. Microcontrollers

The MC 1110 may comprise a processor running ARM and/or DSP. ARM is a family of general purpose microprocessors based on a reduced instruction set computing (RISC). A DSP is a general purpose signal processing chip may provide a mathematical manipulation of an information signal to modify or improve it in some way, and can be characterized by the representation of discrete time, discrete frequency, and/or other discrete domain signals by a sequence of numbers or symbols and the processing of these signals. DSP may measure, filter, and/or compress continuous real-world analog signals. The first step may be conversion of the signal from an analog to a digital form, by sampling and then digitizing it using an analog-to-digital converter (ADC), which may convert the analog signal into a stream of discrete digital values. The MC 1110 may also run Linux and/or any other operating system. The MC 1110 may also be connected to Wi-Fi in order to provide information through a network 1140.

MC 1110 may control a variety of features of RFIC 1108 such as, time emission of pocket-forming, direction of the pocket-forming, bounce angle, power intensity and the like. Furthermore, MC 1110 may control multiple pocket-forming over multiple receivers or over a single receiver. Transmitter 1101 may allow distance discrimination of wireless power transmission. In addition, MC 1110 may manage and control communication protocols and signals by controlling communication component 1112. MC 1110 may process information received by communication component 1112 that may send and receive signals to and from a receiver in order to track it and concentrate radio frequency signals 1142 (i.e., pockets of energy) on it. Other information may be transmitted from and to receiver 1120; such information may include authentication protocols among others through a network 1140.

The MC 1110 may communicate with the communication component 1112 through serial peripheral interface (SPI) and/or inter-integrated circuit ($I^2C$) protocol. SPI communication may be used for short distance, single master communication, for example in embedded systems, sensors, and SD cards. Devices communicate in master/slave mode where the master device initiates the data frame. Multiple slave devices are allowed with individual slave select lines. $I^2C$ is a multi-master, multi-slave, single-ended, serial computer bus used for attaching low-speed peripherals to computer motherboards and embedded systems 5. Communications Component Communication component 1112 may include and combine Bluetooth technology, infrared communication, Wi-Fi, FM radio among others. MC 1110 may determine optimum times and locations for pocket-forming, including the most efficient trajectory to transmit pocket forming in order to reduce losses because obstacles. Such trajectory may include direct pocket-forming, bouncing, and distance discrimination of pocket-forming. In some implementations, the communication component 1112 may communicate with a plurality of devices, which may include receivers 1120, client devices, or other transmitters 1101.

6. Power Source

Transmitters 1101 may be fed by a power source 1114 that may include AC or DC power supply. Voltage, power, and current intensity provided by power source 1114 may vary in dependency with the required power to be transmitted. Conversion of power to radio signal may be managed by MC 1110 and carried out by RFIC 1108 that may utilize a plurality of methods and components to produce radio signals in a wide variety of frequencies, wavelength, intensities, and other features. As an exemplary use of a variety of methods and components for radio signal generation, oscillators and piezoelectric crystals may be used to create and change radio frequencies in different antenna elements 1106. In addition, a variety of filters may be used for smoothing signals as well as amplifiers for increasing power to be transmitted.

Transmitter 1101 may emit RF power waves that are pocket-forming with a power capability from few watts to a predetermined number of watts required by a particular chargeable electronic device. Each antenna may manage a certain power capacity. Such power capacity may be related with the application 7. Housing In addition to a housing, an independent base station may include MC 1110 and power source 1114, thus, several transmitters 1101 may be managed by a single base station and a single MC 1110. Such capability may allow the location of transmitters 1101 in a variety of strategic positions, such as ceiling, decorations, walls, and the like. Antenna elements 1106, RFIC 1108, MC 1110, communication component 1112, and power source 1114 may be connected in a plurality of arrangements and combinations, which may depend on the desired characteristics of transmitter 1101.

B. Exemplary Method of Transmitting Power

Figure 12:
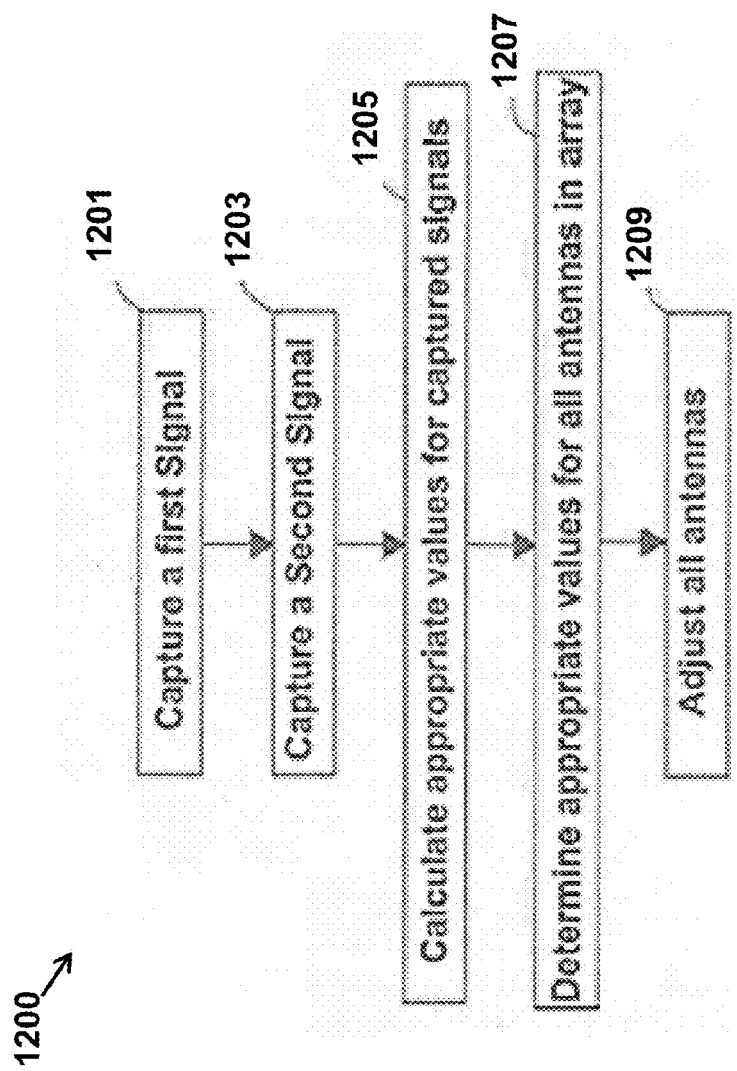
FIG. 12 illustrates a method for determining receiver location using antenna element, according to an exemplary embodiment.

FIG. 12 is a method for determining receiver location 1200 using antenna element. Method for determining receiver location 1200 may be a set of programmed rules or logic managed by MC. The process may begin step 1201 by capturing first signal with a first subset of antennas from the antenna array. The process may follow immediately by switching to a different subset of antenna element and capturing, at a next step 1203, a second signal with a second subset of antennas. For example, a first signal may be captured with a row of antennas and the second capturing may be done with a column of antennas. A row of antennas may provide a horizontal degree orientation such an azimuth in a spherical coordinate system. A column of antennas may provide a vertical degree orientation such as elevation. Antenna elements used for capturing first signal and capturing second signal may be aligned in straight, vertical, horizontal, or diagonal orientation. The first subset and second subset of antennas may be aligned in a cross like structure in order to cover degrees around transmitter.

Once both vertical and horizontal values have been measured, the MC may, in a next step 1205, determine the appropriate values of phase and gain for the vertical and horizontal antenna elements used to capture the signal. Appropriate values for phase and gain may be determined by the relationship of the position of the receiver to the antenna. The values may be used by MC in order to adjust antenna elements to form pockets of energy that may be used by a receiver in order to charge an electronic device.

Data pertaining to initial values of all antenna elements in transmitter may be calculated and stored previously for use by MC in order to assist in the calculation of appropriate values for antenna elements. In a next step, 1207, after the appropriate values for the vertical and horizontal antennas used for capturing the signal have been determined, the process may continue by using the stored data to determine appropriate values for all the antennas in the array. Stored data may contain initial test values of phase and gain for all antenna elements in the array at different frequencies. Different sets of data may be stored for different frequencies and MC may select the appropriate data set accordingly. In a next step 1209, MC may then adjust all antennas through RFIC in order to form pockets of energy at the appropriate locations.

C. Array Subset Configuration

Figures 13A, 13B:
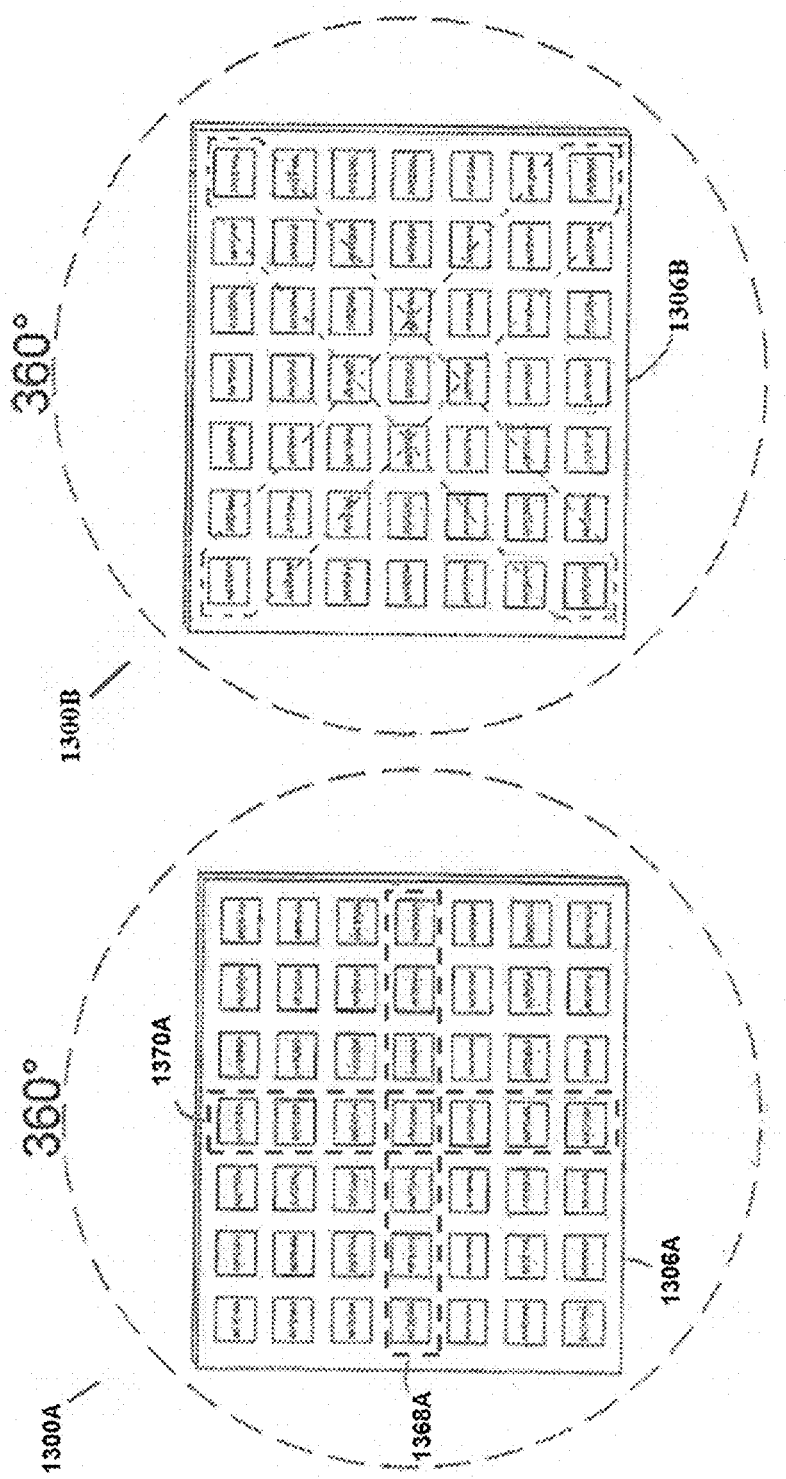
FIG. 13A illustrates an array subset configuration, according to an exemplary embodiment.
FIG. 13B illustrates an array subset configuration, according to an exemplary embodiment.

FIG. 13A illustrates an example embodiment of an array subset configuration 1300A that may be used in method for determining receiver location. Transmitter may include an array of antennas 1306A. A row of antennas 1368A may be used first for capturing a signal sent by a receiver. Row of antennas 1368A may then transfer the signal to the RFIC, where the signal may be converted from a radio signal to a digital signal and passed on to MC for processing. MC may then determine appropriate adjustments for phase and gain in row of antennas 1368A in order to form pockets of energy at the appropriate locations based on the receiver locations. A second signal may be captured by a column of antennas 1370A. Column of antennas 1370A may then transfer the signal to the RFIC, where the signal may be converted from a radio signal to a digital signal and passed on to MC for processing. MC may then determine appropriate adjustments for phase and gain in column of antennas 1370A in order to form pockets of energy at the appropriate locations based on the receiver locations. Once the appropriate adjustments have been determined for row of antennas 1368A and column of antennas 1370A MC may determine the appropriate values for the rest of antenna elements 1306A in array of antennas 1368A by using previously stored data about the antennas and adjusting accordingly with the results from row of antennas 1368A and column of antennas 1370A.

D. Configurations for Transmitters, Transmitter Components, Antenna Tiles, and Systems Related to Transmitters 1. Exemplary System FIG. 13B illustrates another example embodiment of an array subset configuration 1300B. In array subset configuration 1300B, both initial signals are captured by two diagonal subsets of antennas. The process follows the same path, such that each subset is adjusted accordingly. Based on adjustments made and the previously stored data, the rest of antenna elements 1306B in array of antennas are adjusted.

2. Flat Transmitter

Figure 14:
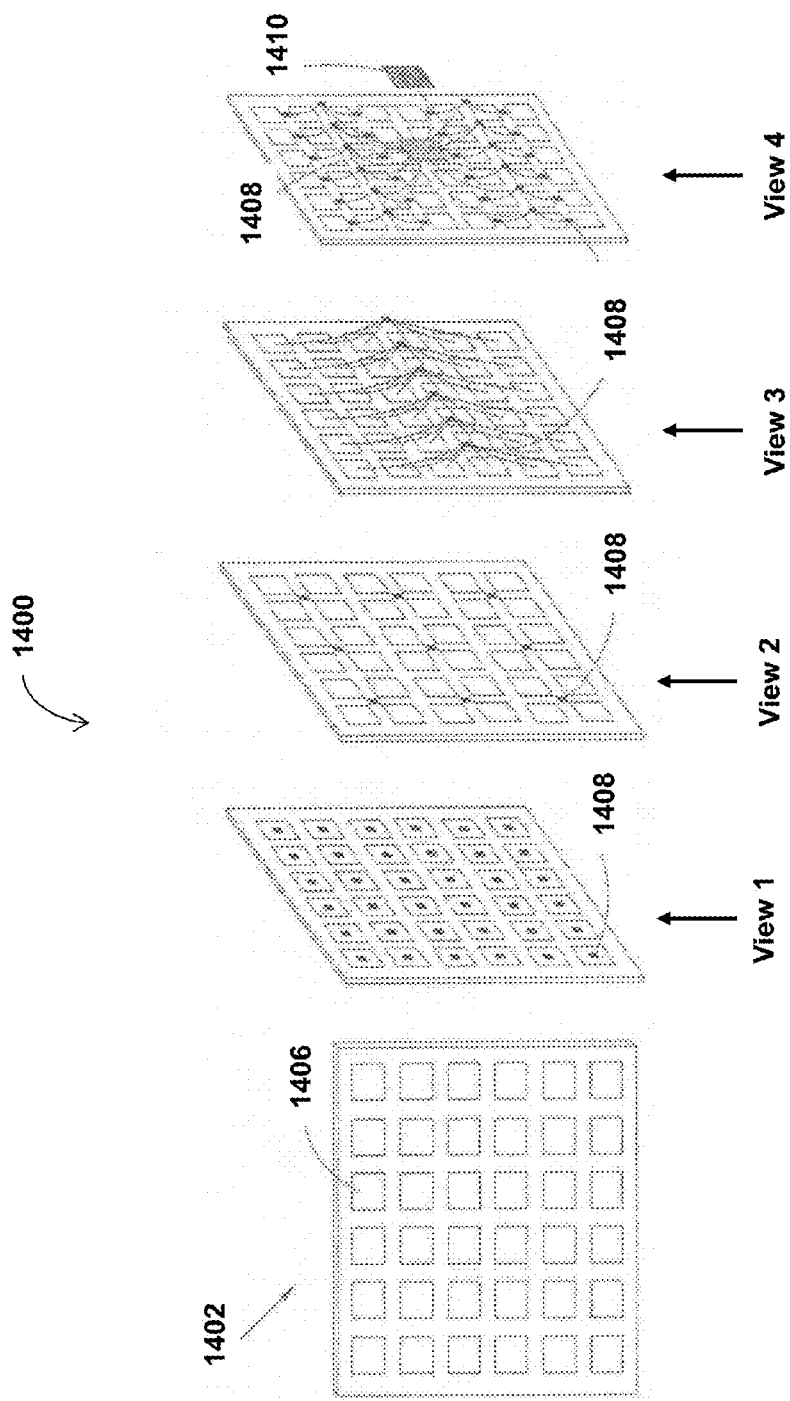
FIG. 14 illustrates a flat transmitter, according to an exemplary embodiment.

FIG. 14 depicts a flat transmitter 1402 in a front view and a several embodiments of rear views. Transmitter 1402 may include antenna element 1406 and RFIC 1408 in a flat arrangement. RFIC 1408 may be directly embedded behind each antenna element 1406; such integration may reduce losses due the shorter distance between components.

In one embodiment (i.e., View 1) in transmitter 1402, the phase and the amplitude of the pocket-forming for each antenna element 1406 may be regulated by the corresponding RFIC 1408 in order to generate the desired pocket-forming and transmission null steering. RFIC 1408 singled coupled to each antenna element 1406 may reduce processing requirement and may increase control over pocket-forming, allowing multiple pocket-forming and a higher granular pocket-forming with less load over MC 1410; thus, a higher response of higher number of multiple pocket-forming may be allowed. Furthermore, multiple pocket-forming may charge a higher number of receivers and may allow a better trajectory to such receivers. As described in the embodiment of FIG. 11, RFIC 1408 may be coupled to one or more MCs 1410, and microcontroller 1410 may be included into an independent base station or into the transmitter 1402.

In another embodiment (i.e., View 2), a subset of 4 antenna elements 1406 may be connected to a single RFIC 1408. The lower number of RFICs 1408 present in the transmitter 1402 may correspond to desired features such as: lower control of multiple pocket-forming, lower levels of granularity and a. less expensive embodiment. As described in the embodiment of FIG. 11, RFIC 1408 may be coupled to one or more MCs 1410, and microcontroller 1410 may be included into an independent base station or into the transmitter 1402.

In yet another embodiment (i.e., View 3), transmitter 1402 may include antenna element 1406 and RFIC 1408 in a flat arrangement. A row or column of antenna elements 1406 may be connected to a single MC 1410. The lower number of RFICs 1408 present in the transmitter 1402 may correspond to desired features such as: lower control of multiple pocket-forming, lower levels of granularity and a less expensive embodiment. RFIC 1408 connected to each row or column may allow a less expensive transmitter 1402, which may produce pocket-forming by changing phase and gain between rows or columns. As described in the embodiment of FIG. 11, RFIC 1408 may be coupled to one or more MCs 1410, and microcontroller 1410 may be included into an independent base station or into the transmitter 1402.

In some embodiments (i.e., View 4), transmitter 1402 may include antenna element 1406 and RFIC 1408 in a flat arrangement. A cascade arrangement is depicted in this exemplary embodiment. Two antenna elements 1406 may be connected to a single RFIC 1408 and this in turn to a single RFIC 1408, which may be connected to a final RFIC 1408 and this in turn to one or more MCs 1410. Flat transmitter 1402 using a cascade arrangement of RFICs 1408 may provide greater control over pocket-forming and may increase response for targeting receivers. Furthermore, a higher reliability and accuracy may be achieved because multiple redundancy of RFICs 1408. As described in the embodiment of FIG. 11, RFIC 1408 may be coupled to one or more MCs 1410, and microcontroller 1410 may be included into an independent base station or into the transmitter 1402.

3. Multiple Printed Circuit Board Layers

Figure 15B:
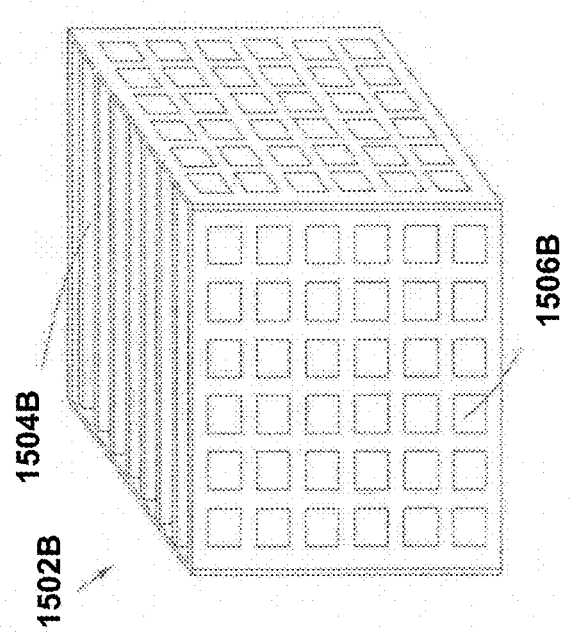
FIG. 15B illustrates a box transmitter, according to an exemplary embodiment.
Figure 15A:
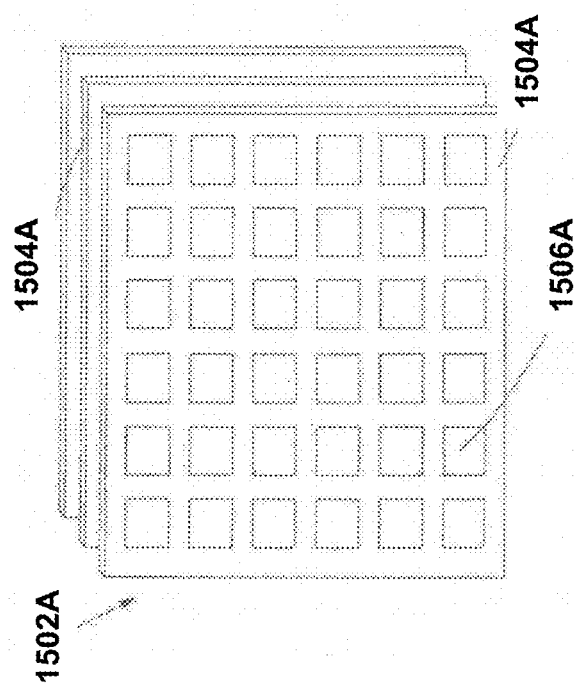
FIG. 15A illustrates a transmitter, according to an exemplary embodiment.

FIG. 15A depicts a transmitter 1502A, which may include a plurality of PCB layers 1204A that may include antenna element 1506A for providing greater control over pocket-forming and may increase response for targeting receivers. Multiple PCB layers 1504A may increase the range and the amount of power that could be transferred by transmitter 1502A. PCB layers 1504A may he connected to a single MC or to dedicated MC. Similarly, RFIC may be connected antenna element 1506A as depicted in the foregoing embodiments. RFIC may be coupled to one or more MCs. Furthermore, MCs may be included into an independent base station or into the transmitter 1502A.

4. Box Transmitter

FIG. 15B depicts a box transmitter 1502B, which may include a plurality of PCB layers 1504B inside it, which may include antenna element 1506B for providing greater control over pocket-forming and may increase response for targeting receivers. Furthermore, range of wireless power transmission may be increased by the box transmitter 1502B. Multiple PCB layers 1504B may increase the range and the amount of RF power waves that could be transferred or broadcasted wirelessly by transmitter 1502B due the higher density of antenna element 1506B. PCB layers 1504B may be connected to a single MC or to dedicated MC for each antenna element 1506B. Similarly, RFIC may control antenna element 1506B as depicted in the foregoing embodiments. Furthermore, box shape of transmitter 800 may increase action ratio of wireless power transmission; thus, box transmitter 1502B may be located on a plurality of surfaces such as, desks, tables, floors, and the like. In addition, box transmitter 1502B may comprise several arrangements of PCB layers 1504B, which may be oriented in X, Y, and Z axis, or any combination these. The RFIC may, be coupled to one or more MCs. Furthermore, MCs may be included into an independent base station or into the transmitter 1502B.

5. Irregular Arrays for Various Types of Products

Figure 16:
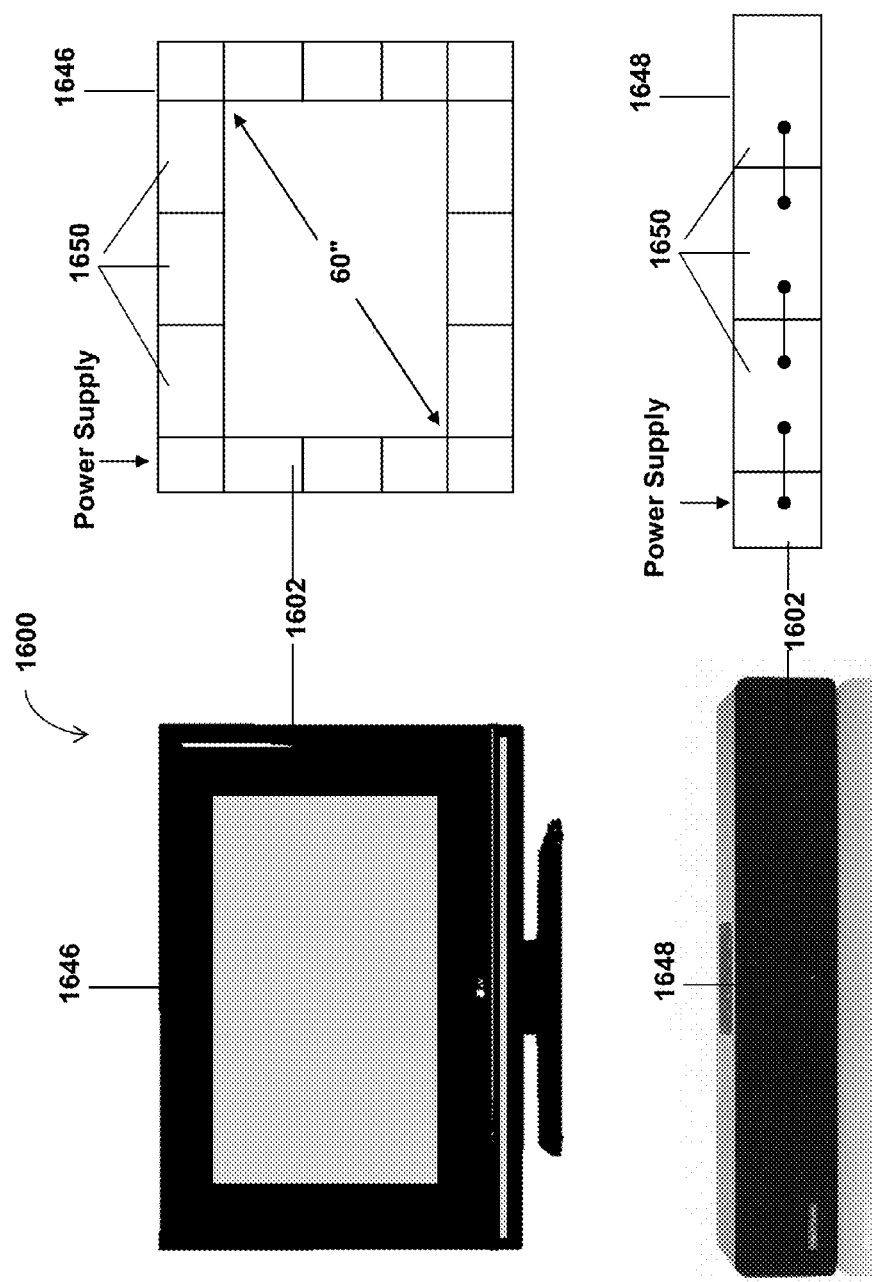
FIG. 16 illustrates a diagram of an architecture for incorporating transmitter into different devices, according to an exemplary embodiment.

FIG. 16 depicts a diagram of architecture 1600 for incorporating transmitter 1602 into different devices. For example, the flat transmitter 1602 may be applied to the frame of a television 1646 or across the frame of a sound bar 1648. Transmitter 1602 may include multiple tiles 1650 with antenna elements and RFICs in a flat arrangement. The RFIC may be directly embedded behind each antenna elements; such integration may reduce losses due the shorter distance between components.

For example, a television 1646 may have a bezel around a television 1646, comprising multiple tiles 1650, each tile comprising of a certain number of antenna elements. For example, if there are 20 tiles 1650 around the bezel of the television 1646, each tile 1650 may have 24 antenna elements and/or any number of antenna elements.

In tile 1650, the phase and the amplitude of each pocket-forming in each antenna element may be regulated by the corresponding RFIC in order to generate the desired pocket-forming and transmission null steering. RFIC singled coupled to each antenna element may reduce processing requirement and may increase control over pocket-forming, allowing multiple pocket-forming and a higher granular pocket-forming with less load over microcontroller, thus, a higher response of higher number of multiple pocket-forming may be allowed. Furthermore, multiple pocket-forming may charge a higher number of receivers and may allow a better trajectory to such receivers.

RFIC may be coupled to one or more microcontrollers, and the microcontrollers may be included into an independent base station or into the tiles 1650 in the transmitter 1602. A row or column of antenna elements may be connected to a single microcontroller. In some implementations, the lower number of RFICs present in the transmitters 1602 may correspond to desired features such as: lower control of multiple pocket-forming, lower levels of granularity and a less expensive embodiment. RFICs connected to each row or column may allow reduce costs by having fewer components because fewer RFICs are required to control each of the transmitters 1602. The RFICs may produce pocket-forming power transmission waves by changing phase and gain, between rows or columns.

In some implementations, the transmitter 1602 may use a cascade arrangement of tiles 1650 comprising RFICs that may provide greater control over pocket-forming and may increase response for targeting receivers. Furthermore, a higher reliability and accuracy may be achieved from multiple redundancies of RFICs.

In one embodiment, a plurality of PCB layers, including antenna elements, may provide greater control over pocket-forming and may increase response for targeting receivers. Multiple PCB layers may increase the range and the amount of power that could be transferred by transmitter 1602. PCB layers may be connected to a single microcontroller or to dedicated microcontrollers. Similarly, RFIC may be connected to antenna elements.

A box transmitter 1602 may include a plurality of PCB layers inside it, which may include antenna elements for providing greater control over pocket-forming and may increase response for targeting receivers. Furthermore, range of wireless power transmission may be increased by the box transmitter 1602. Multiple PCB layers may increase the range and the amount of RF power waves that could be transferred or broadcasted wirelessly by transmitter 1602 due the higher density of antenna elements. PCB layers may be connected to a single microcontroller or to dedicated microcontrollers for each antenna element. Similarly, RFIC may control antenna elements. The box shape of transmitter 1602 may increase action ratio of wireless power transmission. Thus, box transmitter 1602 may be located on a plurality of surfaces such as, desks, tables, floors, and the like. In addition, box transmitter may comprise several arrangements of PCB layers, which may be oriented in X, Y, and Z axis, or any combination these.

6. Plurality of Antenna Elements

Figure 17:
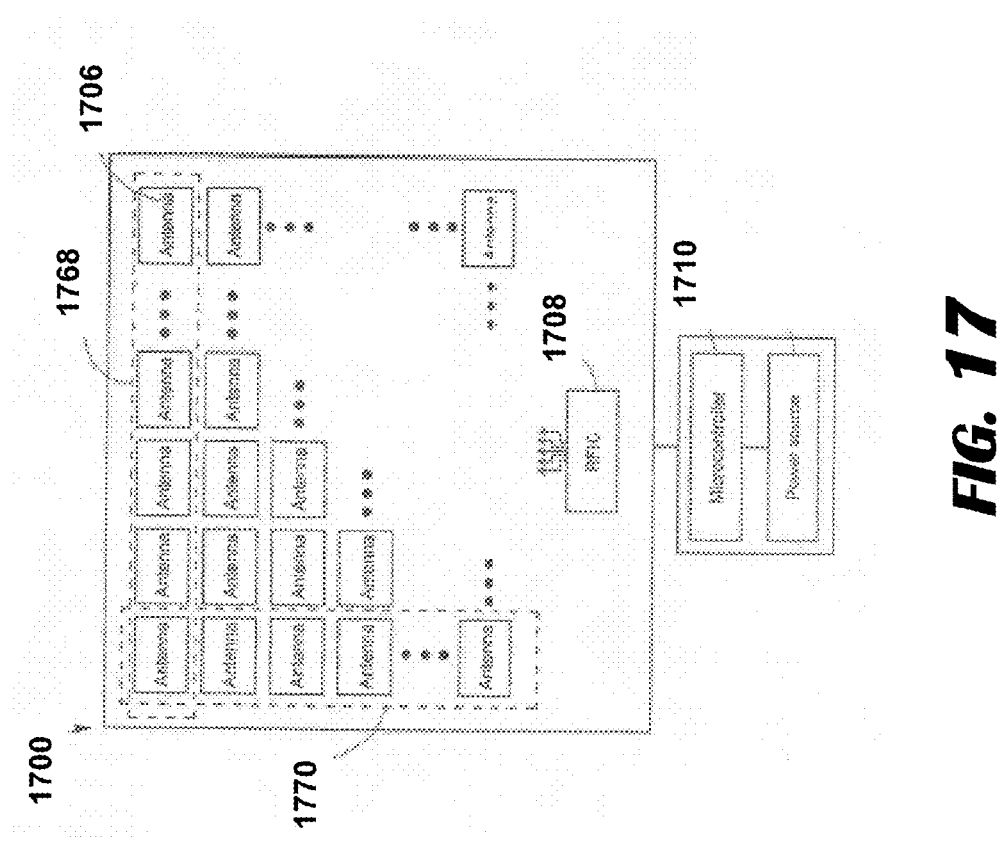
FIG. 17 illustrates a transmitter configuration according to an exemplary embodiment.

FIG. 17 is an example of a transmitter configuration 1700 that includes a plurality of antenna elements 1706. Antenna element 1706 may form an array by arranging rows of antennas 1768 and columns of antennas 1770. Transmitter configuration may include at least one RFIC 1708 to control features of antenna element 1706, such as gain and/or phase for pocket-forming and manage it through direction, power level, and the like. The array of antenna elements 1706 may be connected to a MC 1710, which may determine optimum times and locations for pocket-forming, including the most efficient trajectory to transmit pocket forming in order to reduce losses because of obstacles. Such trajectory may include direct pocket-forming, bouncing, and distance discrimination of pocket-forming.

A transmitter device may utilize antenna element 1706 to determine the location of a receiver in order to determine how to adjust antenna element 1706 to form pockets of energy in the appropriate location. A receiver may send a train signal to transmitter in order to provide information. The train signal may be any conventional know signals that may be detected by antenna element 1706. The signal sent by receiver may contain information such as phase and gain.

III. Receivers—Systems and Methods for Receiving and Utilizing Wireless Power Transmissions A. Components of Receiver Devices Returning to FIG. 11, which illustrates a diagram of a system 1100 architecture for wirelessly charging client devices, according to an exemplary embodiment, the system 1100 may comprise transmitter 1101 and receivers 1120 that may each comprise an application-specific integrated circuit (ASIC). The ASIC of the receivers 1120 may include a printed circuit board 1122, an antenna element 1124, a rectifier 1126, a power converter 1129, a communications component 1130, and/or a power management integrated circuit (PMIC) 1132. Receivers 1120 may also comprise a housing that may allocate all the requested components. The various components of receivers 1120 may comprise, or may be manufactured using, meta-materials, micro-printing of circuits, nano-materials, and the like.

1. Antenna Elements

Antenna elements 1124 may include suitable antenna types for operating in frequency bands similar to the bands described for antenna elements 1106 of a transmitter 1101. Antenna element 1124 may include vertical or horizontal polarization, right hand or left hand polarization, elliptical polarization, or other suitable polarizations as well as suitable polarization combinations. Using multiple polarizations can be beneficial in devices where there may not be a preferred orientation during usage or whose orientation may vary continuously through time, for example a smartphone or portable gaming system. On the contrary, for devices with well-defined orientations, for example a two-handed video game controller, there might be a preferred polarization for antennas, which may dictate a ratio for the number of antennas of a given polarization. Suitable antenna types may include patch antennas with heights from about 1⁄18 inch to about 6 inches and widths from about 1⁄8 inch to about 6 inches. Patch antennas may have the advantage that polarization may depend on connectivity, i.e., depending on which side the patch is fed, the polarization may change. This may further prove advantageous as a receiver, such as receiver 1120, may dynamically modify its antenna polarization to optimize wireless power transmission. Different antenna, rectifier, or power converter arrangements are possible for a receiver, as is described in the embodiments herein.

2. Rectifiers

A rectifier 1126 may convert alternating current (AC), which periodically reverses direction, to direct current (DC), which takes non-negative values. Because of the alternating nature of the input AC sine wave, the process of rectification alone produces a DC current that, though non-negative, consists of pulses of current. The output of the rectifier may be smoothed by an electronic filter to produce a steady current. The rectifier 1126 may include diodes and/or resistors, inductors and/or capacitors to rectify the alternating current (AC) voltage generated by antenna element 1124 to direct current (DC) voltage.

In some implementations, the rectifier 1126 may be a full-wave rectifier. A full-wave rectifier may convert the whole of the input waveform to one of constant polarity (positive or negative) at its output. Full-wave rectification may convert both polarities of the input waveform to pulsating DC (direct current), and yield a higher average output voltage. Two diodes and a center tapped transformer and/or four diodes in a bridge configuration and any AC source (including a transformer without center tap) may be utilized for a full-wave rectifier. For single-phase AC, if the transformer is center-tapped, then two diodes back-to-back (cathode-to-cathode or anode-to-anode, depending upon output polarity required) may be utilized to form a full-wave rectifier. Twice as many turns may be required on the transformer secondary to obtain the same output voltage than for a bridge rectifier, but the power rating is unchanged. Rectifier 1126 may be placed as close as is technically possible to antenna element 1124 to minimize losses. After rectifying AC voltage, DC voltage may be regulated using power converter 1129.

3. Power Converters

Power converter 1129 can be a DC-to-DC converter that may help provide a constant voltage output and/or to help boost the voltage to the receiver 1120. In some implementations, the DC-to-DC converter may be a maximum power point tracker (MPPT). A MPPT is an electronic DC-to-DC converter that converts a higher voltage DC output down to the lower voltage needed to charge batteries. Typical voltage outputs can be from about 5 volts to about 10 volts. In some embodiments, power converter 1129 may include electronic switched mode DC-to-DC converters, which can provide high efficiency. In such a case, a capacitor may be included before power converter 1129 to ensure sufficient current is provided for the switching device to operate. When charging an electronic device, for example a phone or laptop computer, initial high-currents that can exceed the minimum level of power needed to activate the operation of an electronic switched mode DC-to-DC converter, may be required. In such a case, a capacitor may be added at the output of receiver 1120 to provide the extra energy required. Afterwards, lower power can be provided, as required to provide the appropriate amount electric current; for example, 1⁄80 of the total initial power used while having the phone or laptop still building-up charge.

In one embodiment, multiple rectifiers 1126 can be connected in parallel to antenna element 1124. For example, four rectifiers 1126 may be connected in parallel to antenna element 1124. However, several more rectifiers 1126 can be used. This arrangement may be advantageous because each rectifier 1126 may only need to handle 1⁄4 of the total power. If one watt is to be delivered to an electronic device, then each rectifier 1126 may only need to handle a quarter of a watt. The arrangement may greatly diminish cost because using a plurality of low-power rectifiers 1126 can be cheaper than utilizing one high-power rectifier 1126 while handling the same amount of power. In some embodiments, the total power handled by rectifier 1126 can be combined into a power converter 1129. In other embodiments, there may a power converter 1129 per each rectifier 1126.

In other embodiments, multiple antenna elements 1124 may be connected in parallel to a rectifier 1126, after which DC voltage may be regulated through a power converter 1129. In this example, four antenna elements 1124 may be connected in parallel to a single rectifier 1126. This arrangement may be advantageous because each antenna element 1124 may only handle 1⁄4 of the total power. In addition, the arrangement may enable usage of antenna element 1124 of different polarizations with a single rectifier 1126 because signals may not cancel each other. Because of the foregoing property, the arrangement may be suitable for electronic client devices with an orientation that is not well-defined or otherwise varies over time. Lastly, the arrangement may be beneficial when using antenna element 1124 of equal polarization and configured for phases that do not differ greatly. In some embodiments, however, there can be a rectifier 1126 per antenna element 1124 and/or multiple rectifiers 1126 per antenna element 1124.

In an exemplary implementation, an arrangement where multiple antenna elements 1124 outputs can be combined and connected to parallel rectifiers 1126 whose output may further be combined in one power converter 1129 may be implemented. There may be 16 antenna elements 1124 whose output may be combined at four parallel rectifiers 1126. In other embodiments, antenna elements 1124 may be subdivided into groups (of four for example) and may connect to independent rectifiers 1126.

In yet another embodiment, an arrangement where groups of antenna elements 1124 may be connected to different rectifiers 1126 which may in turn also be connected to different power converters 1129 may be implemented. In this embodiment, four groups of antenna elements 1124 (each containing four antenna elements 1124 in parallel) may each connect independently to four rectifiers 1126. In this embodiment, the output of each rectifier 1126 may connect directly to a power converter 1129 (four in total). In other embodiments, the output of all four rectifiers 1126 can be combined before each power converter 1129 to handle the total power in parallel. In some embodiments, the combined outputs of each rectifier 1126 may connect to a single power converter 1129. This arrangement may be beneficial in that it allows great proximity between rectifier 1126 and antenna element 1124. This property may be desirable as it may keep losses at a minimum.

4. Communications Component

A communications component 1130, similar to that of transmitter 1101, may be included in receiver 1120 to communicate with a transmitter or to other electronic equipment. In some implementations, receiver 1120 can use a built-in communications component of the device (for example, Bluetooth) for communicating to a given transmitter 1120 based on requirements provided by processor such as battery level, user predefined charging profile or others transmitters 1101 may include one or more printed circuit boards (PCB) 1104, one or more antenna elements 1106, one or more radio frequency integrated circuits (RFIC) 1108, one or more microcontrollers (MCs) 1110, a communication component 1112, and a power source 1114. The transmitter 1101 may be encased in a housing, which may allocate all the requested components for transmitter 1101. Components in transmitter 1101 may be manufactured using meta-materials, micro-printing of circuits, nano-materials, and/or any other materials. The types of information communicated by the communications components between the receiver and the transmitter include but not limited to the present power levels in the batteries, signal strength and power level being received at the receiver, timing information, phase and gain information, user identification, client device privileges, security related signaling, emergency signaling, and authentication exchanges, among other things.

5. PMICs

A power management integrated circuit (PMIC) 1132 is an integrated circuit and/or a system block in a system-on-a-chip device for managing power requirements of the host system. The PMIC 1132 may include battery management, voltage regulation, and charging functions. It may include a DC-to-DC converter to allow dynamic voltage scaling. In some implementations, the PMIC 1132 may provide up to a 95% power conversion efficiency. In some implementations, the PMIC 1132 may integrate with dynamic frequency scaling in a combination. The PMIC 1132 may be implemented in a battery-operated device such as mobile phones and/or portable media players. In some implementations, the battery may be replaced with an input capacitor and an output capacitor. The PMIC 1132 may be directly connected to the battery and/or capacitors. When the battery is being charged directly, a capacitor may not be implemented. In some implementations, the PMIC 1132 may be coiled around the battery. The PMIC 1132 may comprise a power management chip (PMC) that acts as a battery charger, and is connected to the battery. The PMIC 1132 can use pulse-frequency modulation (PFM) and pulse-width modulation (PWM). It can use switching amplifier (Class-D electronic amplifier). In some implementations, an output converter, a rectifier, and/or a BLE may also be included in the PMIC 1132.

6. Housing

Housing can be made of any suitable material that may allow for signal or wave transmission and/or reception, for example plastic or hard rubber. Housing may be an external hardware that may be added to different electronic equipment, for example in the form of cases, or can be embedded within electronic equipment as well.

7. Network

The network 1140 may comprise any common communication architecture that facilitates communication between transmitter 1101 and the receiver 1120. One having ordinary skill in the art would appreciate that the network 1140 may be the Internet, a private intranet, or some hybrid of the two. It should also be obvious to one skilled in the art that the network components may be implemented in dedicated processing equipment, or alternatively in a cloud processing network.

Figures 18A, 18B:
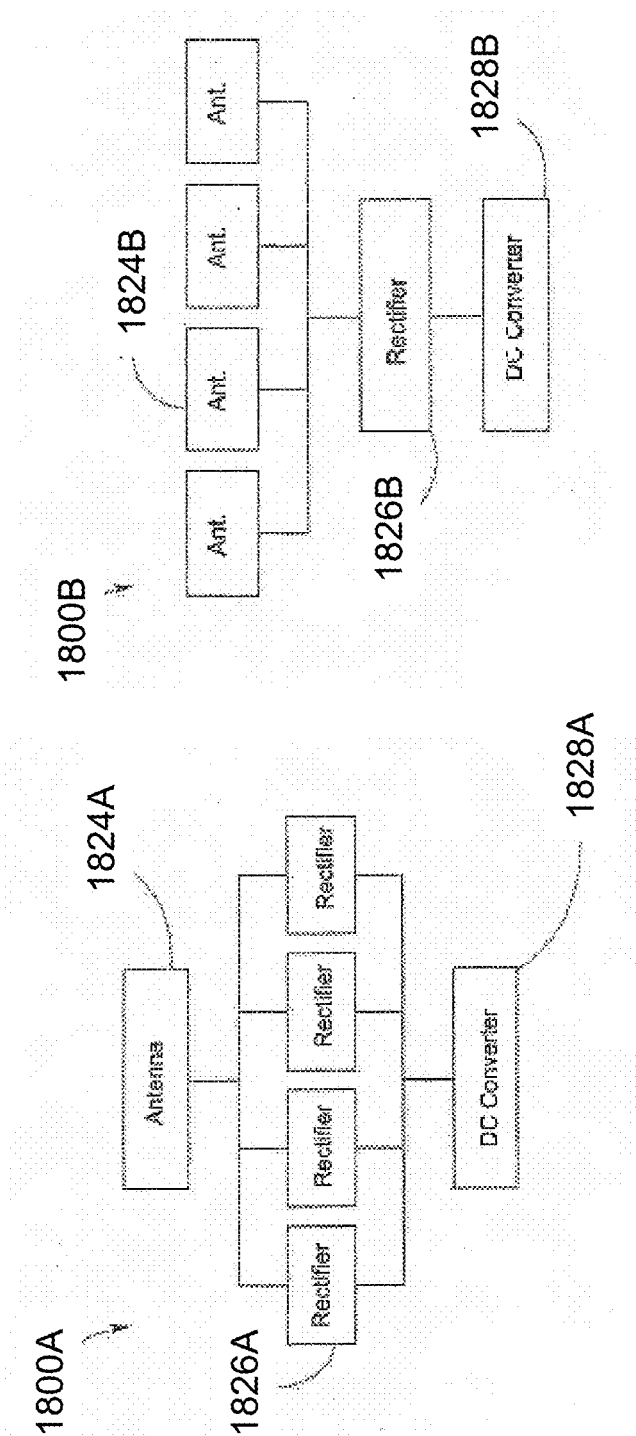
FIG. 18A illustrates multiple rectifiers connected in parallel to an antenna element, according to an exemplary embodiment.
FIG. 18B illustrates multiple antenna elements connected in parallel to a rectifier, according to an exemplary embodiment.

B. Configurations for Receivers, Receiver Components, and Systems Related to Receivers 1. Multiple Rectifiers Connected in Parallel to an Antenna Element FIG. 18A illustrates an arrangement 1800A where multiple rectifiers 1826A can be connected in parallel to an antenna element 1824A. In this example, four rectifiers 1826A may be connected in parallel to an antenna elements 1824A. However, several more rectifiers 1826A may be used. Arrangement 1800A may be advantageous because each rectifier 1826A may only need to handle ¼ of the total power. If one watt is to be delivered to an electronic device, then each rectifier 1826F may only need to handle a quarter of a watt. Arrangement 1800A may greatly diminish cost because using a plurality of low-power rectifiers 1826A can be cheaper than utilizing one high-power rectifier 1826A while handling the same amount of power. In some embodiments, the total power handled by rectifier 1826A can be combined into one DC-DC converter 1828A. In other embodiments, there may a DC-DC converter 1828A per rectifier 1826A.

2. Multiple Antenna Elements Connected in Parallel to a Rectifier

FIG. 18B illustrates an arrangement 1800B where multiple antenna elements 1824B may be connected in parallel to a rectifier 1826B, after which DC voltage may be regulated through a DC-DC converter 1828B. In this example, four antenna elements 1824B may be connected in parallel to a single rectifier 1826B. Arrangement 1800B may be advantageous because each antenna element 1824B may only handle ¼ of the total power. In addition, arrangement 1800B may enable usage of antenna element 1824B of different polarizations with a single rectifier 1826B because signals may not cancel each other. Because of the foregoing property, arrangement 1800B may be suitable for electronic devices with an orientation that is not well-defined or otherwise varies over time. Lastly, arrangement 1800B may be beneficial when using antenna element 1824B of equal polarization and configured for phases that do not differ greatly. In some embodiments, however, there can be a rectifier 1826B per antenna element 1824B or multiple rectifiers 1826B (as described in FIG. 18A) per antenna element 1824B.

3. Multiple Antenna Elements Connected in Parallel to Multiple Rectifiers

FIG. 19A illustrates an arrangement 1900A where multiple antenna elements 1924A outputs can be combined and connected to parallel rectifier 1926A whose output may further be combined in one DC converter 1928A. Arrangement 1900A shows, by way of exemplification, 16 antenna elements 1924A whose output may be combined at four parallel rectifiers 1926A. In other embodiments, antenna elements 1924A may be subdivided in groups (e.g., four groups) and may connect to independent rectifiers as shown in FIG. 19B below.

4. Permutations of Groupings

FIG. 19B illustrates an arrangement 1900B where groups of antenna elements 1624B may be connected to different rectifiers 1926B, which may in turn also be connected to different DC converters 1928B. In arrangement 1900B, four groups of antenna elements 1924B (each containing four antenna elements 1924B in parallel) may each connect independently to four rectifiers 1926B. In this embodiment, the output of each rectifiers 1926B may connect directly to a DC converter 1928B (four in total). In other embodiments, the output of all four rectifiers 1926B can be combined, before each DC converter 1928B, to handle the total power in parallel. In other embodiments, the combined outputs of each rectifier 1926B may connect to a single DC converter 1928B. Arrangement 1900B may be beneficial in that it allows great proximity between rectifier 1926B and antenna element 1924B. This property may be desirable as it may keep losses at a minimum.

A receiver may be implemented on, connected to or embedded in electronic devices or equipment that may rely on power for performing its intended functions, for example a phone, laptop computer, a television remote, a children's toys or any other such devices. A receiver utilizing pocket-forming can be used to fully charge a device's battery while being "On" or "Off," or while being used or not. In addition, battery lifetime can be greatly enhanced. For example, a device operating on two watts utilizing a receiver that may deliver one watt may increase its battery duration up to about 50%. Lastly, some devices currently running on batteries can fully be powered using a receiver after which a battery may no longer be required. This last property may be beneficial for devices where replacing batteries can be tedious or hard to accomplish such as in wall-clocks. Embodiments below provide some examples of how integration of receivers may be carried out on electronic devices.

5. Embedded Receiver

FIG. 20A illustrates an implementation scheme where a device 2000A that may represent a typical phone, computer or other electronic device may include an embedded receiver 2020A. Device 2000A may also include a power source, a communications component 2030A, and a processor. Receiver 2020A way utilize pocket-forming for providing power to power source from device 2000A. In addition, receiver 2020A can use built-in communications component 2030A of device 2000A (for example, Bluetooth) for communicating to a given transmitter based on requirements provided by processor such as battery level, user predefined charging profile or others.

6. Battery with an Embedded Receiver

FIG. 20B illustrates another implementation scheme where a device 2000B may include a battery with an embedded receiver 2020B. Battery may receive power wirelessly through pocket-forming and may charge through its embedded receiver 2020B. Battery may function as a supply for power source, or may function as back-up supply. This configuration may be advantageous in that battery may not need to be removed for charging. This may particularly be helpful in gaming controllers, or gaming devices where batteries, typically AA or AAA may be continuously replaced.

7. External Communication Component

FIG. 20C illustrates an alternate implementation scheme 2000C where receiver 2020C and a communications component 2030C may be included in an external hardware that may be attached to a device. Hardware can take appropriate forms such as cases that may be placed on phones, computers, remote controllers and others, which may connect thorough suitable interfaces such as Universal Serial Bus (USB). In other embodiments, hardware may be printed on flexible films, which may then be pasted or otherwise attached to electronic equipment. This option may be advantageous as it may be produced at low cost and can easily be integrated into various devices. As in previous embodiments, a communications component 2030C may be included in hardware that may provide communication to a transmitter or to electronic equipment in general.

8. Casing or Housing of Receiver Connecting to USB

Figure 21B:
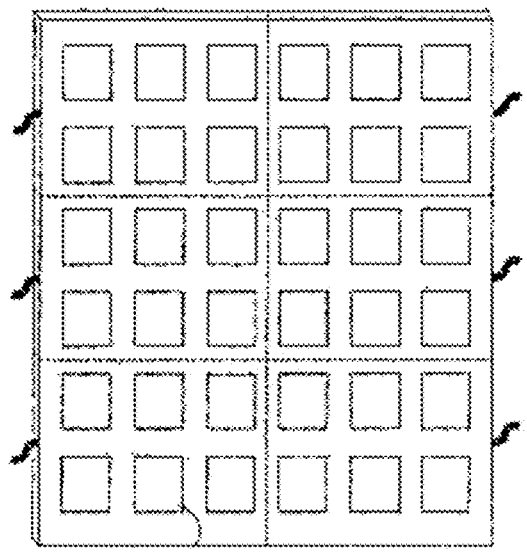
FIG. 21B illustrates hardware in the form of a printed film or flexible printed circuit board, according to an exemplary embodiment.
Figure 21A:
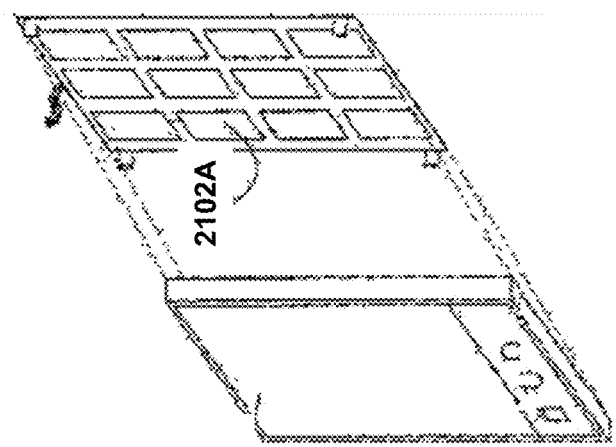
FIG. 21A illustrates hardware in the form of case, according to an exemplary embodiment.

FIG. 21A illustrates hardware in the form of case including a receiver 2102A that may connect through flex cables or USB to a smartphone and/or any other electronic device. In other embodiments, the housing or case can be a computer case, phone case, and/or camera case among other such options.

9. PCB on Printed Film

FIG. 21B illustrates hardware in the form of a printed film or flexible printed circuit board (PCB) which may include a plurality of printed receivers 2102B. Printed film can be pasted or otherwise attached to electronic devices and can connect trough suitable interfaces such as USB. Printed film may he advantageous in that sections can be cut from it to meet specific electronic device sizes and/or requirements. The efficiency of wireless power transmission as well as the amount of power that can be delivered (using pocket-forming) may be a function of the total number of antenna elements used in a given receiver and transmitter system. For example, for delivering about one watt at about 15 feet, a receiver may include about 80 antenna elements while a transmitter may include about 256 antenna elements. Another identical wireless power transmission system (about 1 watt, at about 15 feet) may include a receiver with about 40 antenna elements, and a transmitter with about 512 antenna elements. Reducing in half the number of antenna elements in a receiver may require doubling the number of antenna elements in a transmitter. In some cases, it may be cost-effective to put a greater number of antenna elements in a transmitter than in a receiver. However, the opposite can be achieved by placing more antenna elements on a receiver than on a transmitter, as long as there are at least two antenna elements in a transmitter.

IV. Antenna Hardware and Functionality

A. Spacing Configuration

Figure 22:
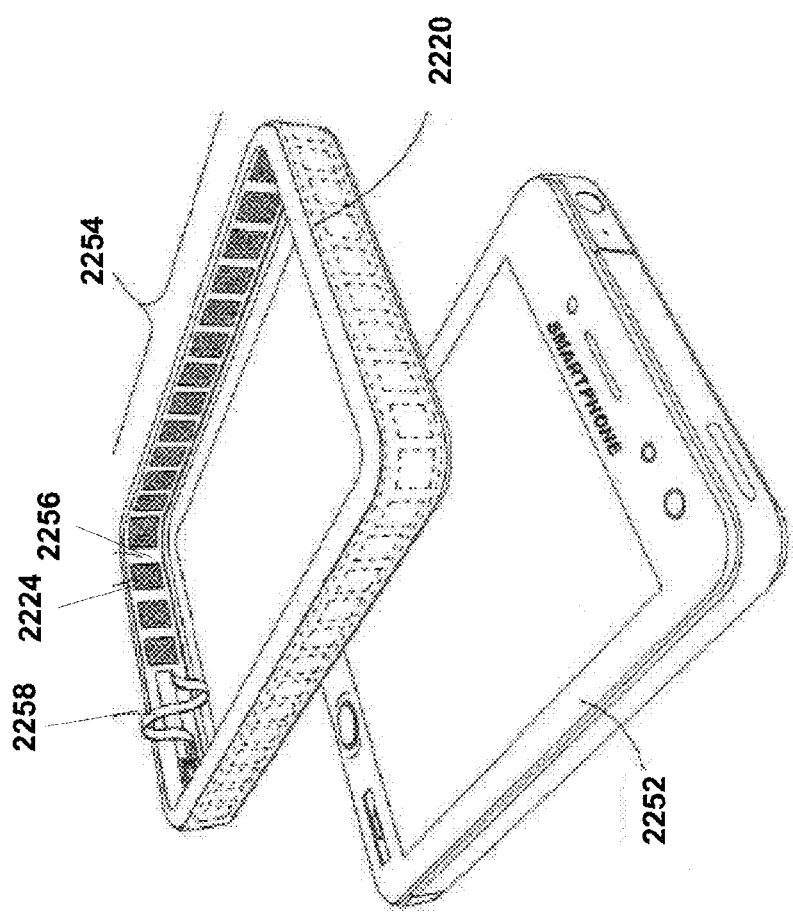
FIG. 22 illustrates internal hardware according to an exemplary embodiment.

FIG. 22 illustrates internal hardware, where receiver 2220 may be used for receiving wireless power transmission in an electronic device 2252 (e.g., smartphone). In some implementations, the electronic device 2252 may include receiver 2220, which may be embedded around the internal edge of the case 2254 (e.g., smartphone case) of the electronic device 2252. In other embodiments, the receiver 2220 may be implemented covering the back side of the case 2254. The case 2254 may be one or more of: a smartphone cover, a laptop cover, camera cover, GPS cover, a game controller cover and/or tablet cover, among other such options. The case 2254 may be made out of plastic, rubber and/or any other suitable material.

Receiver 2220 may include an array of antenna elements 2224 strategically distributed on the grid area shown in FIG. 22. The case 2254 may include an array of antenna elements 2224 located around the edges and/or along the backside of case 2254 for optimal reception. The number, spacing, and type of antenna elements 2224 may be calculated according to the design, size, and/or type of electronic device 2252. In some embodiments, there may be a spacing (e.g., 1 mm-4 mm) and/or a meta-material between the case 2254 containing the antenna element 2224 and the electronic device 2252. The spacing and/or meta-material may provide additional gain for RF signals. In some implementations, the meta-materials may be used in creating a multi-layer PCB to implement into the case 2254.

B. Metamaterial

The internal hardware may be in the form of a printed film 2256 and/or flexible PCB may include different components, such as a plurality of printed antenna elements 2224 (connected with each other in serial, parallel, or combined), rectifier, and power converter elements. Printed film 2256 may be pasted or otherwise attached to any suitable electronic devices, such as electronic device 2252 and/or tablets. Printed film 2256 may be connected through any suitable interfaces such as flexible cables 2258. Printed film 2256 may exhibit some benefits; one of those benefits may be that sections can be cut from it to meet specific smart mobile device sizes and/or requirements. According to one embodiment, the spacing between antenna elements 2224 for receiver 2220 may range from about 2 nm to about 12 nm, being most suitable about 7 nm.

Additionally, in some implementations, the optimal amount of antenna elements 2224 that may be used in receiver 2220 for an electronic device 2252 such as a smartphone may range from about 20 to about 30. However, the amount of antenna elements 2224 within receiver 2220 may vary according to electronic device 2252 design and size. Antenna element 2224 may be made of different conductive materials such as cooper, gold, and silver, among others. Furthermore, antenna element 2224 may be printed, etched, or laminated onto any suitable non-conductive flexible substrate, such as flexible PCB, among others. The disclosed configuration and orientation of antenna element 2224 may exhibit a better reception, efficiency, and performance of wireless charging.

Additionally, in some implementations, the optimal amount of antenna elements 2224 that may be used in receiver 2220 for an electronic device 2252 such as a smartphone may range from about 20 to about 30. However, the amount of antenna elements 2224 within receiver 2220 may vary according to electronic device 2252 design and size. Antenna element 2224 may be made of different conductive materials such as copper, gold, and silver, among others. Furthermore, antenna element 2224 may be printed, etched, or laminated onto any suitable non-conductive flexible substrate, such as flexible PCB, among others. The disclosed configuration and orientation of antenna element 2224 may exhibit a better reception, efficiency, and performance of wireless charging.

C. Alternative Configuration

Figure 23:
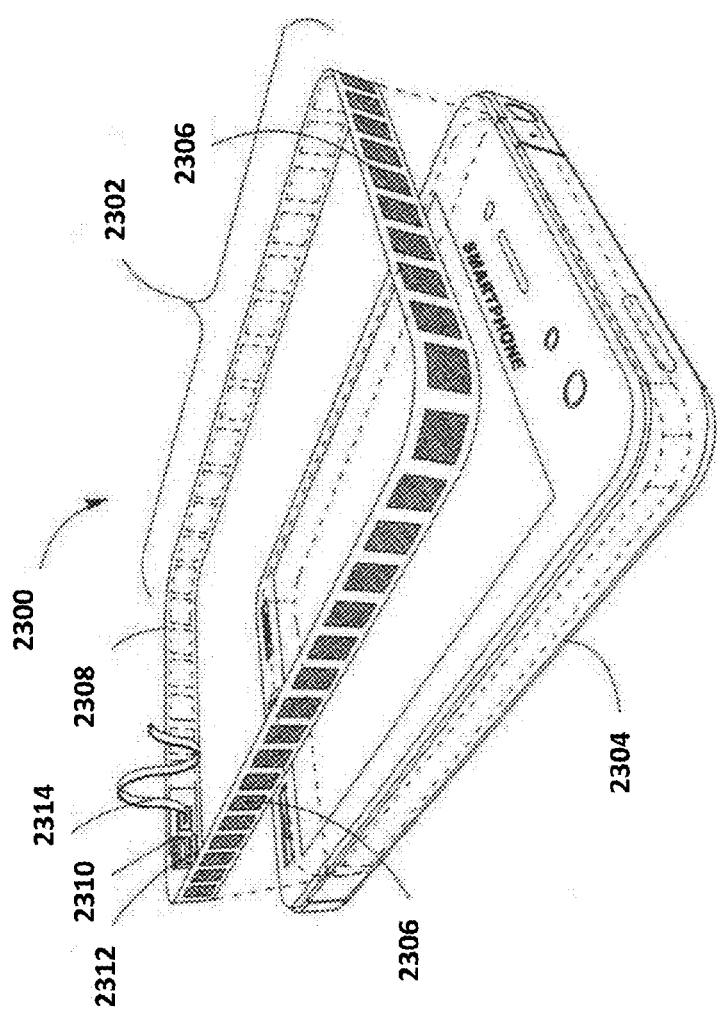
FIG. 23 illustrates hardware according to an exemplary embodiment.

FIG. 23 illustrates hardware 2300, where the receiver 2302 may be used for wireless power transmission in smartphones 2304. In this embodiment, the smartphone 2304 includes at least one receiver 2302, with exemplary components as described herein. Receiver 2302 may include an array of antenna elements 2306 strategically distributed on the grid area on the periphery of the smartphone housing as illustrated in FIG. 23. In certain embodiments, the antenna elements may be part of the internal edge of the smartphone 2304. The number and type of antenna elements 2306 may be calculated according to the design, size and/or type of the smartphone 2304.

Particularly, internal hardware in the form of a printed film 2308 or flexible printed circuit board (PCB) may include different components, such as a plurality of printed antenna elements 2306 (connected with each other in serial, parallel, or combined), rectifier 2310, and power converter 2312 elements, as shown in FIG. 23. Printed film 2308 may be pasted or otherwise attached to any suitable electronic devices, such as smartphones 2304 or tablets and may be connected through any suitable interfaces such as flexible cables 2314. Printed film 2308 may exhibit some benefits; one of those benefits may be that sections can be cut from it to meet specific smart mobile device sizes and/or requirements.

According to one embodiment, the spacing between antenna elements 2306 for receivers 2302 may range from about 5 nm to about 12 nm, being most suitable about 7 nm. Additionally, the amount of antenna elements 2306 that may be used in receivers 2302 for smartphones 2304 may be ranging from about 20 to about 30, and one configuration has about 25; however, the amount of antennas within receivers 2302 may vary according to smartphone 2304's design and size. Antenna elements 2306 may be made of different conductive materials such as copper, gold, and silver, among others. Furthermore, antenna elements 2306 may be printed, etched, or laminated onto any suitable non-conductive flexible substrate, such as flexible printed circuit board (PCB), among others. The disclosed configuration and orientation of antenna elements 2306 may exhibit a better reception, efficiency, and performance of wireless charging.

D. Antennas Coupled to External Battery

The wireless power receiving system may include a receiver coupled to an external battery system. Antenna elements as described above may be present as part of this receiver coupled to the external battery. The wireless power receiving system may include a receiver embedded in an external battery pack. Antenna elements as described above may be present as part of this receiver integrated into the external battery. In all these instances, wireless power transmission signals form pockets of energy that are then received by the antennas of the receivers coupled to the external battery. The battery can function as a power source to any compatible electronic device. The external battery can either be directly connected to serve power to an electronic device or can serve as a charging station where one or more batteries can be charged or can be equipped to do both. The external battery can also be adapted to power several electronic devices at the same time.

Figure 24:
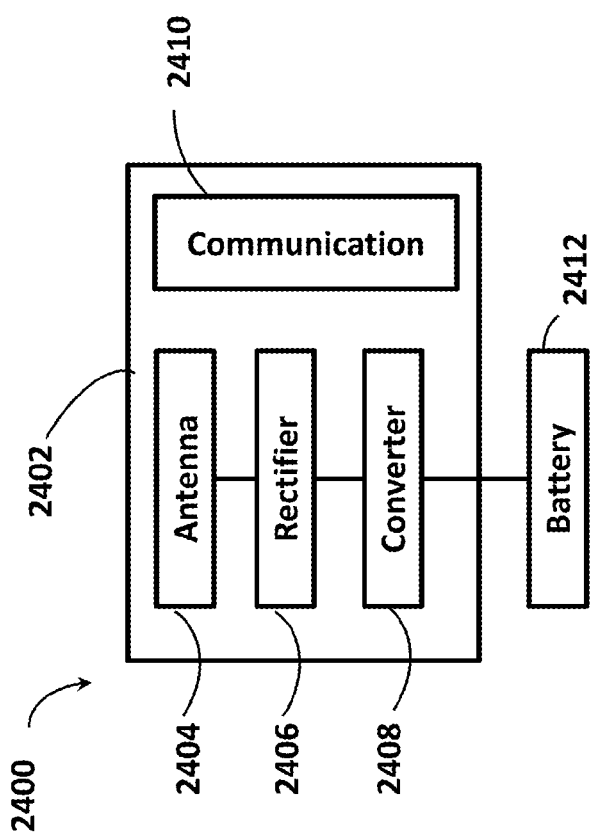
FIG. 24 illustrates a receiver configuration according to an exemplary embodiment.

FIG. 24 illustrates an exemplary embodiment of a battery 2412 coupled to a receiver, where receiver 2402 may be used for receiving wireless power transmission from a transmitter. In some implementations, the receiver 2402 may include one or more antenna elements 2404. The number, spacing and type of antenna elements 2404 may be calculated according to the design, size and/or type of external battery. The receiver 2402 also includes other components such as a rectifier 2406, an electric current converter 2408, and a communications component 2410 including a communication circuit associated with a communication antenna.

Receiver 2400 may include housing made of any suitable material which may allow for signal or wave transmission and/or reception, for example plastic or hard rubber. The receiver 2400 can exist separately or as part of the battery 2412. Suitable antenna types may include patch antennas with heights from about 1/24 inches to about 1 inch and widths from about 1/24 inches to about 1 inch. Patch antennas may have the advantage that polarization may depend on connectivity, i.e., depending on which side the patch is fed, the polarization may change.

V. Sharing Technologies

In certain implementations, the wireless power receiving system may include a receiver that shares either its communication circuitry, or its power management circuitry, or both or components thereof with other technologies that are part of the electronic device, for example Bluetooth®, Bluetooth Low Energy (BLE), Wi-Fi, NFC, and ZigBee®. Similarly in other embodiments, the transmitter generating the power transmission waves may share either its communication circuitry, or its power management circuitry, or both or components thereof with other technologies that are part of the electronic device, for example Bluetooth®, Bluetooth Low Energy (BLE), Wi-Fi, NFC, and ZigBee®.

Figure 25A:
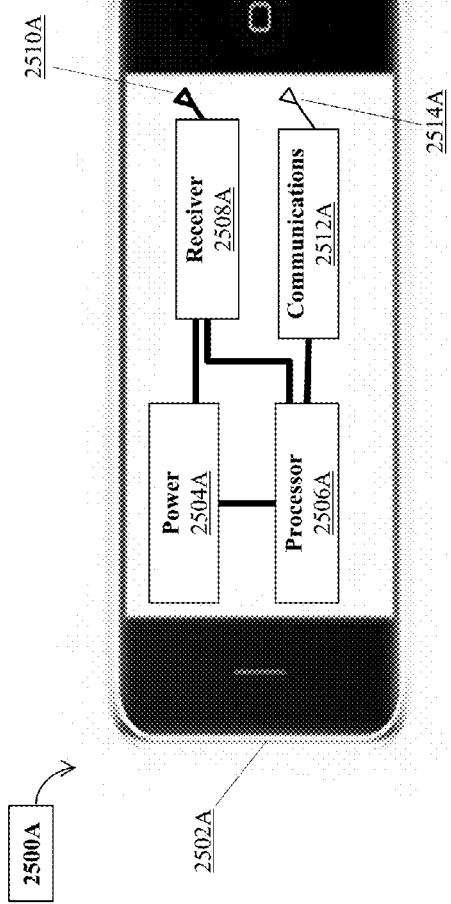
FIG. 25A illustrates a mobile device with an embedded receiver, according to an exemplary embodiment.

FIG. 25A illustrates an implementation 2500A of a mobile device 2502A that includes a power source 2504A, a processor 2506A, a receiver 2508A, and. a communications component 2512A. The receiver 2508A shares components with the mobile device 2502A, such as the communications component 2512A with its antenna 2514A. In certain implementations, a receiver may include only one or more of: a rectifier, a power converter, and an antenna 2510A interfacing with a pocket of energy formed from wireless power transmission waves generated by a transmitter. The pocket of energy is transformed by the antenna 2510A into an AC voltage that is then rectified into a DC voltage by the rectifier. A power converter coupled to the rectifier converts the DC voltage into a constant DC voltage to provide electrical energy to the electronic device. Unlike the receiver systems described in some previous embodiments, the receiver here communicates with transmitter using one or more Bluetooth® components, such as the processor, already present in the electronic device. These one or more Bluetooth® components are utilized by the electronic device and its applications to interact with other electronic devices. The receiver that functions in the wireless power receipt system can also utilize the communication antennas 2514A of built-in Bluetooth® component to communicate with the transmitter. The receiver 2508A uses the Bluetooth® components to transmit information such as the location of the receiver relative to the transmitter and the power level information of the electronic device associated with the receiver. Other information such as the power consumption history of the electronic device may also be transmitted to determine how long the power in the electronic device will last or the priority in the receipt of wireless power transmission when the transmitter is supplying power to several electronic devices. Electronic devices such as a tablet, an audio player, a laptop computer, a gaming controller may implement an embodiment involving sharing of components between the receiver and the device.

Figure 25B:
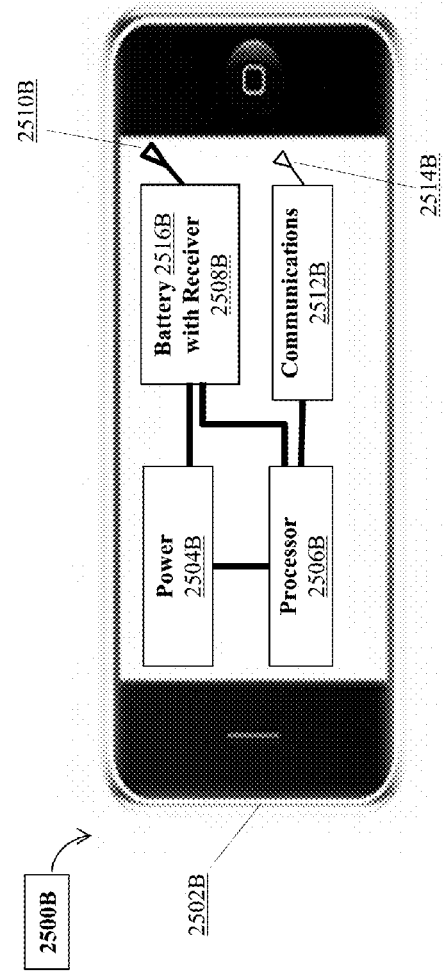
FIG. 25B illustrates a mobile device and a battery with an embedded receiver, according to an exemplary embodiment.

FIG. 25B illustrates another implementation scheme where a mobile device 2502B may include a power source 2504B, a processor 2506B, a battery 2516B with an embedded receiver 2508B, and. a communications component 2512B. Battery may receive power wirelessly through pocket-forming by the antenna 2510B and may charge through its embedded receiver 2508B. The receiver 2508B here communicates with transmitter using one or more communication components 2512B, such as a Bluetooth® or a Wi-Fi processor, already present in the electronic device. The receiver that functions in the wireless power receipt system can also utilize the communication antennas 2514B of built-in Bluetooth® or Wi-Fi component to communicate with the transmitter.

Certain systems for wireless power receipt may include a receiver coupled to an electronic device, whose communication components interact with either the transmitter or the receiver or both. For example, the transmitter, generating the power transmission waves to form pockets of energy at a location of the receiver 2508B, may establish a communication connection with a wireless fidelity (Wi-Fi) component 2512B integrated with an electronic device 2502B. This Wi-Fi component 2512B may monitor the voltage of the electronic device 2502B and transmit this information to the transmitter. Depending on the power levels available to the battery, the transmitter may generate and transmit power transmission waves through at least two antennas coupled to the transmitter, such that the power transmission waves configured to converge in three-dimensional space to produce a pocket of energy for charging the electronic device. Other information such as the power consumption history of the electronic device may also be transmitted to determine how long the power in the electronic device will last or to determine the priority in the receipt of wireless power transmission when the transmitter is supplying power to several electronic devices. Electronic devices such as a smartphone, an audio device, and a wearable device may implement an embodiment involving sharing of communication components between the receiver and the device. Other devices include wearable devices that monitor one or more physiological functions of the individual wearing the wearable device. Information from the Wi-Fi may also be transmitted to a cloud-based service.

Other instances may include the transmitter establishing a communication connection with a wireless fidelity (Wi-Fi) component integrated with an electronic device, only upon recognition of predetermined identifiers associated with the electronic device. These predetermined identifiers may include one or more of: a device identifier, a user identifier, and a receiver identifier. In some instances, the user initiates the interaction between the electronic device and the transmitter regarding the location and the power requirements of the electronic device. For example, the user may notice that the battery level on his wearable is at 20% of its full capacity, and may choose to connect his wearable to the wireless power transmitter. In other instances, the electronic device through its Wi-Fi component detects the power and may automatically transmit a request for wireless power if the power available to the electronic device drops below a predetermined level. For example, if the battery level on the electronic device is at 5% of its full capacity, the Wi-Fi component of the device can be configured to establish a connection with the wireless power transmitter and initiate receipt of the pockets of energy at the receiver.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," and the like, are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module that may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A mobile device, comprising:
  a built-in wireless communications component; and
  a receiver detachably coupled to the mobile device and configured to control the built-in wireless communications component of the mobile device, the receiver comprising:
    a first radio frequency (RF) antenna element configured to interface with a constructive interference formed by a plurality of wireless RF power transmission waves emitted from a far-field transmitter, wherein the first RF antenna element is configured to transform energy from the constructive interference into an alternating current (AC) voltage;
    a rectifier coupled to the first RF antenna element, wherein the rectifier is configured to convert the AC voltage into a DC voltage; and
    a power converter coupled to the rectifier, wherein the power converter is configured to change the DC voltage into a constant DC voltage to provide electrical energy to the mobile device;
  wherein:
    the receiver controls via a processor of the mobile device the built-in wireless communications component of the mobile device to transmit to the far-field transmitter one or more communication signals containing status data indicating a power transmission effectiveness of at least some of the plurality of wireless RF power transmission waves, and the receiver does not include a wireless transmitter, and the built-in wireless communications component is integrated with the mobile device and is further utilized by the mobile device to communicate data packets with a plurality of electronic devices other than the far-field transmitter.

2. The mobile device of claim 1, wherein the status data includes data indicating a location of the first RF antenna element relative to the far-field transmitter.

3. The mobile device of claim 1, wherein the status data includes one or more of: a device identifier associated with the mobile device, a user identifier associated with a user of the mobile device, and a receiver identifier associated with the receiver, and a history of power consumption by the mobile device.

4. The mobile device of claim 1, wherein the mobile device is a wearable device monitoring one or more physiological functions of the individual wearing the wearable device.

5. The mobile device of claim 1, wherein the mobile device is selected from the group consisting of: a smartphone, a tablet, a music player, a laptop computer, a toy, a gaming controller, and a wearable device.

6. The mobile device of claim 1, wherein the first RF antenna element is selected from the group consisting of: a flat antenna, a patch antenna, a normal-mode helix antenna, a planar inverted-F antenna (PIFA), a meandered line antenna, and a microstrip patch antenna.

7. The mobile device of claim 1, wherein:
a communication connection between the far-field transmitter and the built-in wireless communications component is established in response to recognition by the transmitter of predetermined identifiers associated with the mobile device.

8. The mobile device of claim 1, wherein:
the predetermined identifiers associated with the mobile device include one or more of: a device identifier associated with the mobile device, a user identifier associated with a user of the mobile device, and a receiver identifier associated with the receiver.

9. The mobile device of claim 1, wherein:
the far-field transmitter is configured to adjust transmission of the plurality of wireless RF power transmission waves based on the status data indicating the power transmission effectiveness of the at least some of the wireless RF power transmission waves, and
the first RF antenna element is further configured to receive energy from an adjusted plurality of wireless RF power transmission waves that is transmitted by the far-field transmitter after adjusting transmission of the wireless RF power transmission waves.

10. The mobile device of claim 1, wherein the status data indicating the power transmission effectiveness of the at least some of the wireless RF power transmission waves includes data indicating one or more of: (i) a level of power present in the constructive interference; (ii) a voltage of electrical energy received from the at least some of the plurality of wireless RF power transmission waves; (iii) a quality of reception by the first RF antenna element of the at least some of the plurality of RF power transmission waves; (iv) a more effective set of features to use for transmitting the plurality of RF power transmission waves, as compared to a current set of features used by the far-field transmitter to transmit the plurality of RF power transmission waves.

11. The mobile device of claim 1, wherein the receiver is detachably coupled with the mobile device by way of a case that surrounds the mobile device.

12. The mobile device of claim 11, wherein an array of RF antenna elements that includes the first RF antenna element is distributed along the case.

13. A method for communication with a far-field transmitter for charging a mobile device, the method comprising:
receiving, by a first radio frequency (RF) antenna element of a receiver detachably coupled to the mobile device, a plurality of wireless RF power transmission waves emitted from the far-field transmitter, wherein the first RF antenna element is configured to:
transform energy from the constructive interference into an AC voltage, and
control a built-in wireless communications component of the mobile device;
transmitting, by the receiver controlling via a processor of the mobile device the built-in wireless communications component of the mobile device, one or more communication signals to the far-field transmitter, the one or more communication signals containing status data indicating a power transmission effectiveness of at least some of the plurality of wireless RF power transmission waves, wherein the built-in wireless communications component is integrated with the mobile device and is further utilized by the mobile device to communicate data packets with a plurality of electronic devices other than the far-field transmitter, and the receiver does not include a wireless transmitter;
rectifying, by a rectifier of the receiver coupled to the first RF antenna element, the AC voltage into a DC voltage; and
generating, by a power converter of the receiver coupled to the rectifier, a constant DC voltage from the DC voltage to provide electrical energy to the mobile device.

14. The method according to claim 13, wherein the status data includes data indicating a history of power consumption of the mobile device.

15. The method according to claim 13, wherein the mobile device is selected from the group consisting of: a smartphone, an audio device, and a wearable device.

16. The method according to claim 13, wherein the mobile device is a wearable device monitoring one or more physiological functions of the individual wearing the wearable device.

17. The method according to claim 13, wherein a communication connection between the far-field transmitter and the built-in wireless communications component is established in response to recognition by the far-field transmitter of predetermined identifiers associated with the mobile device.

18. The method according to claim 17, wherein the predetermined identifiers associated with the mobile device include one or more of: a device identifier associated with the mobile device, a user identifier associated with a user of the mobile device, and a receiver identifier associated with the receiver.

19. The method of claim 13, wherein:
the far-field transmitter is configured to adjust transmission of the plurality of wireless RF power transmission waves based on the status data indicating the power transmission effectiveness of the at least some of the wireless RF power transmission waves, and
the first RF antenna element is further configured to receive energy from an adjusted plurality of wireless RF power transmission waves that is transmitted by the far-field transmitter after adjusting transmission of the wireless RF power transmission waves.

20. The method of claim 13, wherein the status data indicating the power transmission effectiveness of the at least some of the wireless RF power transmission waves includes data indicating one or more of: (i) a level of power present in the constructive interference; (ii) a voltage of electrical energy received from the at least some of the plurality of wireless RF power transmission waves; (iii) a quality of reception by the first RF antenna element of the at least some of the plurality of RF power transmission waves; (iv) a more effective set of features to use for transmitting the plurality of RF power transmission waves, as compared to a current set of features used by the far-field transmitter to transmit the plurality of RF power transmission waves.

21. The method of claim 13, wherein the status data includes data indicating a location of the first RF antenna element relative to the far-field transmitter.

22. The method of claim 13, wherein the first RF antenna element is selected from the group consisting of: a flat antenna, a patch antenna, a normal-mode helix antenna, a planar inverted-F antenna (PIFA), a meandered line antenna, and a microstrip patch antenna.

* * * * *

UNITED STATES PATENT AND TRADEMARK OFFICE
CERTIFICATE OF CORRECTION

PATENT NO. : 10,230,266 B1
APPLICATION NO. : 14/587367
DATED : March 12, 2019
INVENTOR(S) : Leabman et al.

Page 1 of 1

It is certified that error appears in the above-identified patent and that said Letters Patent is hereby corrected as shown below:

In the Claims

Claim 4, Column 47, Line 17, please delete "of the individual" and insert --of an individual--;

Claim 10, Column 47, Lines 59-60, please delete "waves; (iv)" and insert --waves; and (iv)--;

Claim 13, Column 48, Line 11, please delete "from the constructive" and insert --from a constructive--;

Claim 16, Column 48, Line 43, please delete "of the individual" and insert --of an individual--;

Claim 20, Column 49, Lines 9-10, please delete "waves; (iv)" and insert --waves; and (iv)--.

Signed and Sealed this
Fourteenth Day of May, 2019

Andrei Iancu
*Director of the United States Patent and Trademark Office*